United States Patent
Ogawa et al.

(10) Patent No.: US 9,910,412 B2
(45) Date of Patent: Mar. 6, 2018

(54) STATE CONTROL DEVICE, CONTROL METHOD, AND PROGRAM

(71) Applicants: NEC CORPORATION, Minato-ku, Tokyo (JP); Masafumi Yano, Sendai-shi, Miyagi (JP)

(72) Inventors: Masatsugu Ogawa, Minato-Ku (JP); Masafumi Yano, Sendai (JP)

(73) Assignees: NEC Corporation, Tokyo (JP); Masafumi Yano, Sendai-shi (JP)

( * ) Notice: Subject to any disclaimer, the term of this patent is extended or adjusted under 35 U.S.C. 154(b) by 338 days.

(21) Appl. No.: 14/387,337

(22) PCT Filed: Mar. 12, 2013

(86) PCT No.: PCT/JP2013/057573
§ 371 (c)(1),
(2) Date: Sep. 23, 2014

(87) PCT Pub. No.: WO2013/146395
PCT Pub. Date: Oct. 3, 2013

(65) Prior Publication Data
US 2015/0045912 A1    Feb. 12, 2015

(30) Foreign Application Priority Data
Mar. 29, 2012 (JP) .................. 2012-075657

(51) Int. Cl.
G05B 13/02 (2006.01)
(52) U.S. Cl.
CPC .................. G05B 13/02 (2013.01)
(58) Field of Classification Search
CPC ..................... G05B 13/02; G05B 19/4148
(Continued)

(56) References Cited

U.S. PATENT DOCUMENTS

2004/0049299 A1 * 3/2004 Wojsznis ............... G05B 11/32
700/29
2004/0268186 A1 12/2004 Maturana et al.
(Continued)

FOREIGN PATENT DOCUMENTS

CN    102169342 A    8/2011
JP    H-10-301603 A   11/1998
(Continued)

OTHER PUBLICATIONS

Willebeek-LeMair et al. "Strategies for Dynamic Load Balancing on Highly Parallel Computers" from "IEEE Transactions on Parallel and Distributed Systems, vol. 4, No. 9, Sep. 1993".*
(Continued)

Primary Examiner — Yuhui R Pan
(74) Attorney, Agent, or Firm — Foley & Lardner LLP

(57) ABSTRACT

A state control device is arranged for each function block. When acquiring from a function block (Bi) a state (λ) representing a state of the function block (Bi), a state control device (Ci) corresponding to the function block (Bi) acquires a value (Ui) and a value (Vi) based on an evaluation function (fi) convex upward or downward depending on the performance of the function block (Bi), and transmits the value (Vi) to a state control device (Cj). When receiving from the state control device (Cj) a value (Wj) which the state control device (Cj) has acquired similarly to the value (Vi), the function block (Bi) is controlled based on the value (Ui) and the value (Wj).

22 Claims, 29 Drawing Sheets

(58) Field of Classification Search
USPC .......................................................... 700/28
See application file for complete search history.

(56) References Cited

U.S. PATENT DOCUMENTS

| | | | | |
|---|---|---|---|---|
| 2007/0022121 | A1* | 1/2007 | Bahar | G06F 9/5011 |
| 2009/0299502 | A1* | 12/2009 | Mankame | G05B 11/32 700/68 |
| 2009/0328055 | A1* | 12/2009 | Bose | G06F 1/3203 718/105 |
| 2010/0083010 | A1* | 4/2010 | Kern | G06F 1/3203 713/300 |

FOREIGN PATENT DOCUMENTS

| | | |
|---|---|---|
| JP | 2001-209595 A | 8/2001 |
| JP | 2002-165365 A | 6/2002 |
| JP | 2002165365 A * | 6/2002 |
| JP | 2007-287063 A | 11/2007 |
| WO | WO 2011/134432 A1 | 11/2011 |

OTHER PUBLICATIONS

Willebeek-Lemair, M. et al. "Strategies for Dynamic Load Balancing on Highly Parallel Computers." IEEE Transactions on Parallel and Distributed Systems, vol. 4, No. 9, Sep. 4, 1993, pp. 979-993.
Camponogara, E. et al. "Distributed Model Predictive Control." IEEE Control Systems Magazine, Feb. 2002, pp. 44-52.
Extended European Search Report dated Mar. 8, 2016 in related European application No. 13768633.3 (13 pgs.).
International Search Report dated Apr. 16, 2013 in PCT/JP2013/057573 with English-language translation (2 pgs.).
Written Opinion dated Apr. 16, 2013 in PCT/JP2013/057573 with partial English-language translation (7 pgs.).

* cited by examiner

STATE CONTROL DEVICE, CONTROL METHOD, AND PROGRAM

This application is a national stage entry of International Application No. PCT/JP2013/057573 filed Mar. 12, 2013, which claims priority to Japanese Application No. 2012-075657 filed Mar. 29, 2012, the disclosures of both of which are hereby incorporated by reference in their entirety.

TECHNICAL FIELD

This invention relates to a method of controlling a system that includes a plurality of function blocks and runs the function blocks by integrating the function blocks in an autonomous decentralized adaptive manner.

BACKGROUND ART

Currently, an increase in system scale and a phenomenon where a field that has not been systematized is suddenly turned into a large-scale system are in progress in various fields. A typical example of the former is found in the IT field such as data centers and networks that are related to a technology called cloud, and the scale thereof is increasing year after year. An example of the latter is found in the infrastructure field such as electric power, energy networks, and cities, which are suddenly becoming targets to be controlled as a smart grid, a smart city, or other large-scale system cases. How large-scale systems are to be controlled is therefore expected to be a very important issue in the near future.

Add to that, the energy-conscious mindset of today's society demands control that does not waste electric power by shutting down an idling machine or the like. This is a trend not exclusive to the IT field and the infrastructure field. A generally effective action is, for example, exerting control so as to shut down a control object that is idling.

In the case of electric power grids, though only a limited number of electric power houses are controlled in this manner at present, an issue of which power house is to be activated and which power house is to be shut down for efficient generation of electricity has been studied for a long time. This is a matter of load balancing, and is hereinafter referred to as "unit commitment problem". The unit commitment problem includes not only the issue of which power house is to be activated/shut down but also an issue of allocating load optimally among active power houses after determining for each power house whether to activate or shut down. This is a comprehensive matter of activation/shutdown and optimal allocation of load. In the following, the "unit commitment problem" as used herein includes both the issue of activation and shutdown and the issue of load allocation. A solution method that has been employed is offline scheduling based on a scenario that is scripted as a deterministic mathematical programming model.

If the society steers toward further energy saving, innumerable solar energy sources are expected to be connected to related-art power grids. With solar light energy which fluctuates depending on the goings-on in nature, the related-art method of running power houses by offline scheduling would not work well. This means that control needs to be capable of dealing with a very large number of control objects and dealing with an unexpected external disturbance. Offline scheduling cannot be used for dealing with an unexpected external disturbance, and a method of solving the unit commitment problem in real time for innumerable electric power nodes (on a large scale) will be sought after in the future. However, the unit commitment problem is very hard to solve in real time. Moreover, such a problem that how to treat a large number of control objects exists.

The unit commitment problem exists in the IT field as well. Examples of control exerted in a system of the IT field include load balancing among computer resources, network load balancing, and decentralized storage arrangement. The unit commitment problem is a problem observed in various fields, and a name of each control object which is activated or shut down, or on which a load is imposed includes various names such as function block, element, resource, and node depending on the fields. The control object is herein mainly referred to as "function block", but it should be noted that a different name may be used depending on a context.

A description is now given of a related-art load balancing method while load balancing control for computer resources at a data center including a plurality of servers is used as an example. The basic idea of the related-art method eventuates in "balancing the internal state of the system", which is rather unsophisticated. With this mindset, while the control policy is clear in the case of a uniform system (where the plurality of servers are identical servers), what index is to be the basis of balancing is not clear in a mixed-machine system where different types of machines are used.

For instance, while it is known that the CPU utilization ratios of the respective servers are to be balanced in the case of servers having the same performance, it is not obvious how to balance the CPU utilization ratios of servers that have different performance characteristics in a manner that reflects the servers' respective performance. A result obtained by the queueing theory, which is an index often used in related-art control, is an index based on the theory of probability, and tells nothing about what means to use in order to lead the system to a stochastically steady state.

What this means is that, although the system may eventually satisfy requirements to be fulfilled such as response and throughput, the system has no guarantees or limitations with regard to processes in the middle and the situation of resources that are ultimately used. In other words, the resultant control is merely for fulfilling the required performance irrespective of whether the system is in a very inefficient state in terms of energy.

Under such control, the inefficiency grows as the system increases in scale, and is expected to be a serious problem. Shutting down a server that is to be shut down and activating a server that is to be activated with accuracy is important here, too, and server load balancing can also be considered as a type of the unit commitment problem. The unit commitment problem is a problem also associated with many control problems such as storage arrangement control.

As a document disclosing an invention related to this invention, there is known Patent Document 1. In Patent Document 1, there is such a disclosure that, in an electric power system where a plurality of power generation devices are arranged in a distributed manner, each of the plurality of power generation devices autonomously controls an output of the power generation device itself based on local information acquired from the power generation device itself and a part of other power generation devices out of information on a supply/demand balance in the power generation system and power generation efficiencies of the plurality of power generation devices.

PRIOR ART DOCUMENT

Patent Document

Patent Document 1: JP-A-2002-165365

DISCLOSURE OF THE INVENTION

Problems to be Solved by the Invention

As described above, the unit commitment problem exists in areas such as an infrastructure area and an IT area, and it is anticipated that scales of objects to be controlled extremely increase in the future. Moreover, it is assumed that an unexpected external disturbance usually enters the system. It is important to solve the unit commitment problem in real time in this state, and the method for the solution does not exist now. Moreover, the solution for such a problem that a large number of control objects need to be controlled is not obvious.

This invention has been made in view of the above-mentioned circumstances, and therefore has an object to provide a method of solving the unit commitment problem in real time in a system including a plurality of function blocks. The method according to this invention can also be applied to a case where a large number of control objects are treated, and is considered to be a potential system control method in the future.

Means to Solve the Problems

In order to solve the above-mentioned problems, this invention provides, as one aspect thereof, a state control device, which is provided in correspondence to each of n (n is a natural number of 2 or more) function blocks constructing a system, the state control devices including a state control device $C_i$ corresponding to a function block $B_i$, when i and j are arbitrary natural numbers satisfying relationships of $1 \leq i$, $j \leq n$, and $i \neq j$, the state control device $C_i$ including: means for acquiring a state $\lambda_i$ representing a state of the function block $B_i$ from the function block $B_i$; means for acquiring $U_i$ and $V_i$ based on an evaluation function $f_i$ for the function block $B_i$, the evaluation function $f_i$ being defined in advance depending on a performance of the function block $B_i$ to be controlled, and being such a function that a curve plotted while the state $\lambda_i$ is assigned to a horizontal axis and a value of the function $f_i$ is assigned to a vertical axis is convex upward or downward; means for transmitting $V_i$ to a state control device $C_j$; means for receiving $W_j$ acquired based on an evaluation function $f_j$ for a function block $B_j$ corresponding to the state control device $C_j$ from the state control device $C_j$, the evaluation function $f_j$ being defined in advance depending on a performance of the function block $B_j$, and being such a function that a curve plotted while a state $\lambda_j$ of the function block $B_j$ is assigned to a horizontal axis and a value of the function $f_j$ is assigned to a vertical axis is convex upward or downward and control means for controlling the function block $B_i$ depending on $U_i$ and $W_j$.

Further, this invention provides, as another aspect thereof, a method of controlling each of n (n is a natural number of 2 or more) function blocks constructing a system by using a state control device provided in correspondence to the each of n function blocks, the state control devices including a state control device $C_i$ corresponding to a function block $B_i$, when i and j are arbitrary natural numbers satisfying relationships of $1 \leq i$, $j \leq n$, and $i \neq j$, the method including: a step of acquiring, by the state control device $C_i$, a state $\lambda_i$ representing a state of the function block $B_i$ from the function block $B_i$; a step of acquiring, by the state control device $C_i$, $U_i$ and $V_i$ based on an evaluation function $f_i$ for the function block $B_i$, the evaluation function $f_i$ being defined in advance depending on a performance of the function block $B_i$ to be controlled, and being such a function that a curve plotted while the state $\lambda_i$ is assigned to a horizontal axis and a value of the function $f_i$ is assigned to a vertical axis is convex upward or downward; a step of transmitting, by the state control device $C_i$, $V_i$ to a state control device $C_j$; a step of receiving, by the state control device $C_i$, $W_j$ acquired based on an evaluation function $f_j$ for a function block $B_j$ corresponding to the state control device $C_j$ from the state control device $C_j$, the evaluation function $f_j$ being defined in advance depending on a performance of the function block $B_j$, and being such a function that a curve plotted while a state $\lambda_j$ of the function block $B_j$ is assigned to a horizontal axis and a value of the function $f_j$ is assigned to a vertical axis is convex upward or downward; and a control step of controlling, by the state control device $C_i$, the function block $B_i$ depending on $U_i$ and $W_j$.

Further, this invention provides, as still another aspect thereof, a program for controlling each of n (n is a natural number of 2 or more) function blocks constructing a system by using a computer provided in correspondence to the each of n function blocks, the computers including a computer $C_i$ corresponding to a function block $B_i$, when i and j are arbitrary natural numbers satisfying relationships of $1 \leq i$, $j \leq n$, and $i \neq j$, the program causing the computer $C_i$ to execute: a procedure of acquiring a state $\lambda_i$ representing a state of the function block $B_i$ from the function block $B_i$; a procedure of acquiring $U_i$ and $V_i$ based on an evaluation function $f_i$ for the function block $B_i$, the evaluation function $f_i$ being defined in advance depending on a performance of the function block $B_i$ to be controlled, and being such a function that a curve plotted while the state $\lambda_i$ is assigned to a horizontal axis and a value of the function $f_i$ is assigned to a vertical axis is convex upward or downward; a procedure of transmitting $V_i$ to a state control device $C_j$; a procedure of receiving $W_j$ acquired based on an evaluation function $f_j$ for a function block $B_j$ corresponding to the state control device $C_j$ from the state control device $C_j$, the evaluation function $f_j$ being defined in advance depending on a performance of the function block $B_j$, and being such a function that a curve plotted while a state $\lambda_j$ of the function block $B_j$ is assigned to a horizontal axis and a value of the function $f_j$ is assigned to a vertical axis is convex upward or downward; and a control procedure of controlling the function block $B_i$ depending on $U_i$ and $W_j$.

Effect of the Invention

According to one embodiment of this invention, it is possible to contribute to general control of a system including a plurality of function blocks and runs the plurality of function blocks by integrating the function blocks in a manner adaptive to autonomous decentralization. According to one embodiment of this invention, it is possible to accomplish, easily and in a scalable manner, control for making the system robust against an external disturbance and for adapting the system in real time in a manner that depends on the situation.

MODES FOR EMBODYING THE INVENTION

A description is given of a function, operation, and configuration of this invention while a system where a plurality of server computers on a network cooperate with one another for processing is given as an example. A system including n (n is a natural number of 2 or more) servers different in performance from one another is considered. The servers form the network, and processing (load) randomly input to each of the servers is distributed across the servers. Such a system has a configuration illustrated in FIG. 1.

Consideration is given of how the system as a whole carries out efficient processing. On this occasion, the efficient processing means processing of minimizing a response or maximizing an energy efficiency in the entire system. The problem of the load balancing includes activating/shutting down inefficient servers, and corresponds to a unit commitment problem used herein.

In the unit commitment problem, determining whether to activate or shut down is an issue of determining which resource out of a group of resources is to be used and which resource is not, or an issue of managing the respective resources. Load arrangement is an issue of how tasks assigned to the overall system are to be allocated to the provided resources in order to accomplish optimization under a certain index. Hitherto, in many cases, these issues have been attempted to be solved individually via a stochastic approach. However, with a simple theory of probability, it is difficult to secure robustness depending on the situation in an ever-changing environment and to deal with changes in environment quickly in real time.

Figure 2:
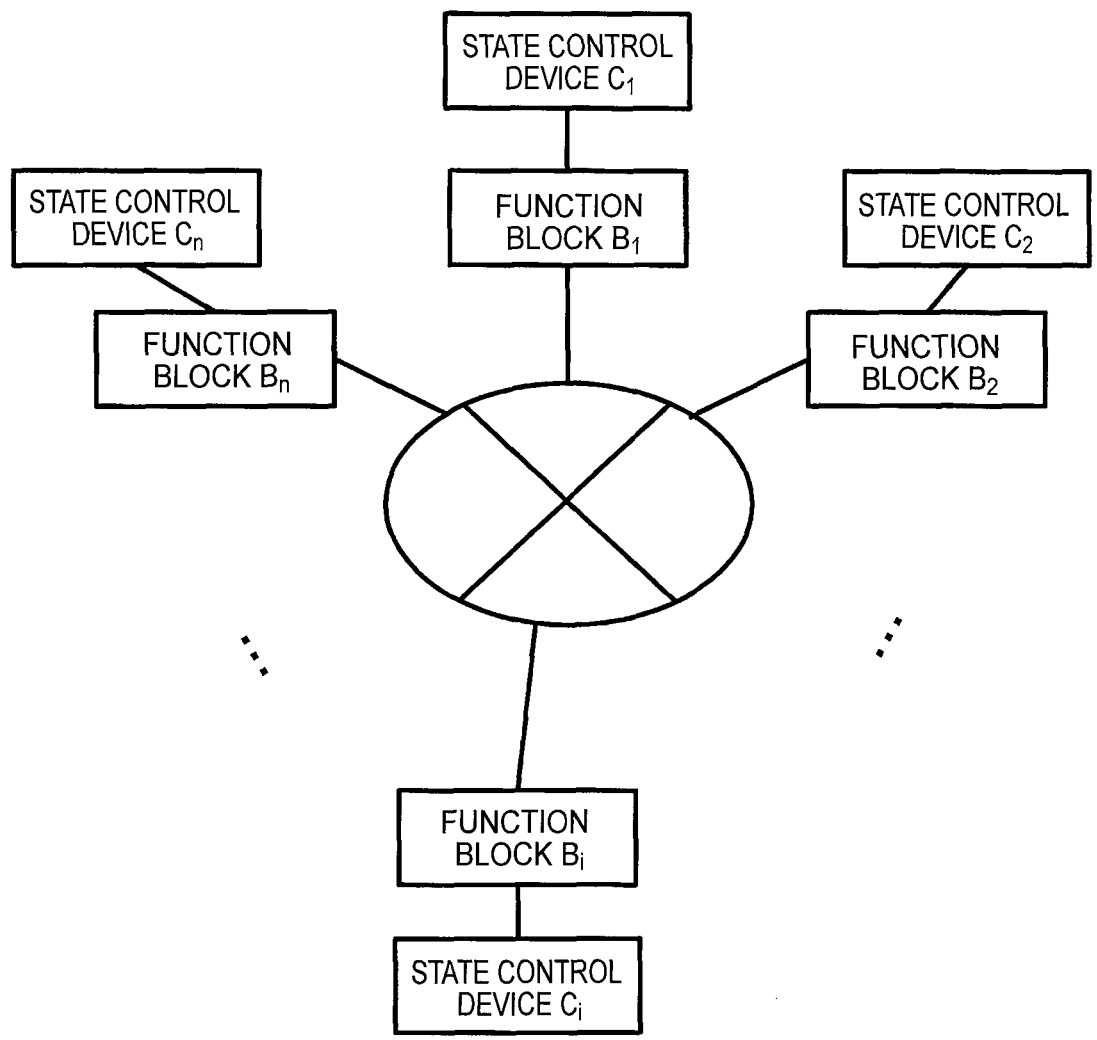
FIG. 2 is a diagram illustrating a system 1, which is one embodiment of this invention.

As illustrated in FIG. 2, state control devices $C_1$, $C_2$, ..., $C_i$, ..., $C_n$ are respectively provided for function blocks $B_1$, $B_2$, ..., $B_i$, ..., $B_n$ in a system 1 according to one embodiment of this invention. i is a natural number, and satisfies a relationship of $1 \leq i \leq n$. The state control device solves the unit commitment problem in real time, thereby controlling the function block. In the following, when a description common to all the function blocks and all the state control devices is given, the function block $B_i$ and the state control device $C_i$ are respectively used. In FIG. 2, the function block $B_i$ and the state control device $C_i$ are independently illustrated and both thereof are connected via a signal line, but the state control device $C_i$ may be incorporated into the function block $B_i$.

Figure 3:
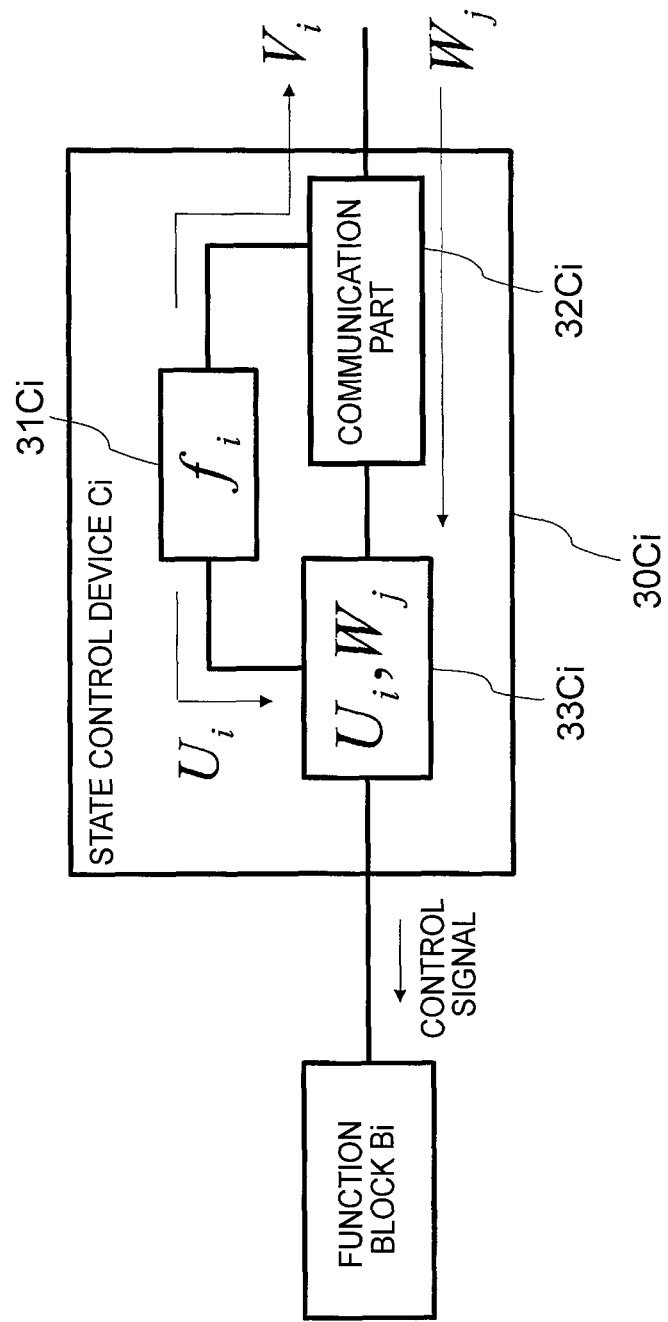
FIG. 3 is a block diagram illustrating a state control device $30C_i$.

Referring to FIG. 3, a description is given of a state control device $30C_i$. The state control device $30C_i$ corresponding to the function block $B_i$ includes an evaluation function processing part $31C_i$, a communication part $32C_i$, and a control signal generation part $33C_i$.

The evaluation function processing part $31C_i$ generates $U_i$ and $V_i$ based on an evaluation function $f_i$ defined in advance for the function block $B_i$, and outputs $U_i$ and $V_i$ to the communication part $32C_i$ and the control signal generation part $33C_i$. The communication part $32C_i$ transmits $V_i$ to the state control devices $C_j$ ($j \neq i$ and $1 \leq j \leq n$) other than the state control device $C_i$, receives $W_j$ generated based on an evaluation function of the function block $B_j$, and outputs $W_j$ to the control signal generation part $33C_i$. The control signal generation part $33C_i$ generates a control signal based on $U_i$ and $W_j$, and outputs the control signal to the function block $B_i$.

The evaluation function $f_i$ is a function defined in advance for each function block $B_i$ depending on a performance of the function block $B_i$, and is a function having a parameter $\lambda_i$ representing a state of the function block $B_i$ at a certain time point as a variable. For example, a load amount on each of the servers can be used as the state $\lambda$ of the server in the server system described above. An index relating to an efficiency and profit of the function block $B_i$ is preferably used as the value of the function $f_i$. A detailed description is later given of the index relating to the efficiency and the profit in examples, and the efficiency herein should be understood as efficiency in a general sense. The function $f_i$ is a function defined, in a sense, as a guide of the control, and may not necessarily be a value which can be measured or a value which can be calculated from a measured value, but may be such a value.

Further, the evaluation function $f_i$ is a function convex upward or a function convex downward. The function $f_i$ plots a curve convex upward or downward while the state $\lambda_i$ is assigned to a horizontal axis, and the value of the function $f_i$ is assigned to a vertical axis. Regarding convexity and concavity of a function, a function convex upward may be referred to as "concave function", and a function convex downward may be referred to as "convex function", but an expression referring to the direction of the convex shape plotted as a curve of a function is herein employed, and the function convex upward and the function convex downward are collectively referred to as "convex function".

Figure 4:
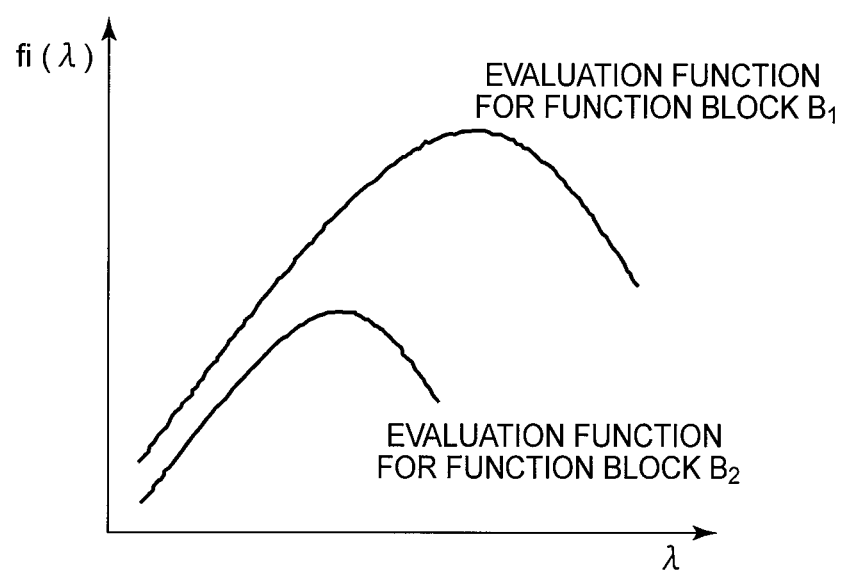
FIG. 4 is a graph showing evaluation functions used in the system 1.

The employment of the convex function as the evaluation function is a point of this invention. This is because a certain efficiency or stability of a system is represented by such a convex function as shown in FIG. 4 in many systems. A problem of accomplishing overall optimization, namely, a problem of acquiring a state where the sum of values of evaluation functions of the respective components is maximum, through cooperation between components whose evaluation functions are convex functions is known as "convex programming problem". It has mathematically been proven that, in a convex programming problem, optimization is accomplished under a situation where differential values of evaluation functions at the operation levels of the respective components are equal to one another. This principle is applied in this invention, which is the reason why convex functions are used here as evaluation functions. This invention can immediately adapt to a state robustly and in real time by using the convex function as the evaluation function. Moreover, on this occasion, this invention can solve the problems relating to the unit commitment of the function block and the assignment of a load on the function block by means of not the theory of probability, but a deterministic or relational method. Hereinafter, the control relating to the activation/shutting down of the function block is referred to as "unit commitment control", and the control relating to arrangement/balancing of a load to the function block is referred to as "load balancing control".

Figure 5:
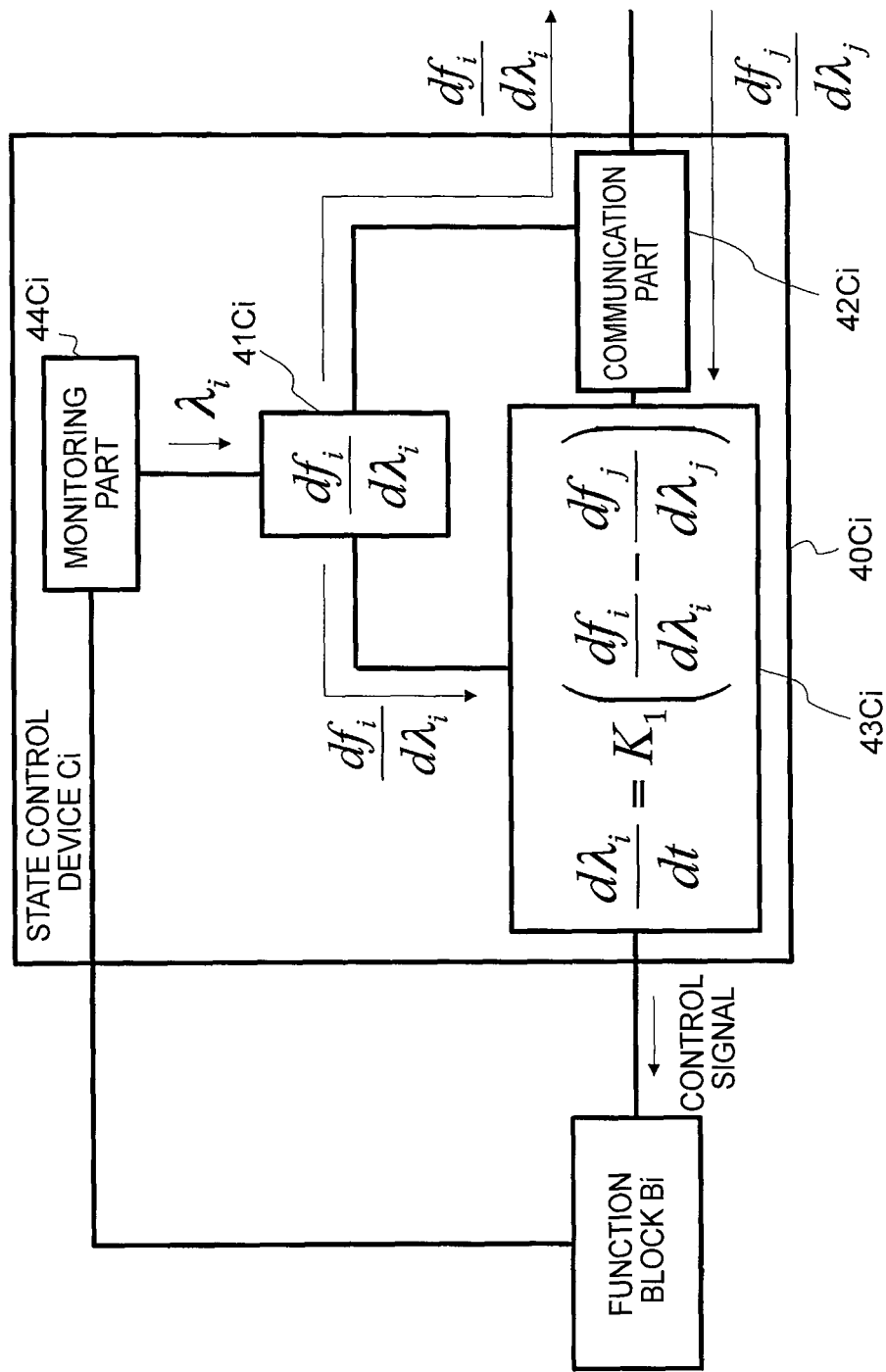
FIG. 5 is a block diagram illustrating a state control device $40C_i$.

A description is now given of the system 1 when the load balancing control is carried out. In this case, as illustrated in FIG. 5, the system 1 provides the each function block $B_i$ with a state control device $40C_i$. The state control device $40C_i$ includes a monitoring part $44C_i$ as well as an evaluation function processing part $41C_i$, a communication part $42C_i$, and a control signal generation part $43C_i$.

The evaluation function processing part $41C_i$ acquires $df_i/d\lambda_i$ based on the evaluation function $f_i$ defined in advance for the function block $B_i$, and the state $\lambda_i$ output by the monitoring part $44C_i$ described later, and outputs $df_i/d\lambda_i$ to the communication part $42C_i$ and the control signal generation part $43C_i$. The communication part $42C_i$ transmits $df_i/d\lambda_i$ to a state control device $C_j$ ($j \neq i$ and $1 \leq j \leq n$) other than the state control device $C_i$. The state control device $C_j$, which is the transmission destination, generates $df_j/d\lambda_j$ based on an evaluation function $f_j$ for the corresponding function block $B_j$ and a state $\lambda_j$ acquired from the function block $B_j$ as in the state control device $C_i$, thereby transmitting $df_j/d\lambda_j$ to the state control device $C_i$. The communication part $42C_i$ receives $df_j/d\lambda_j$, and outputs $df_j/d\lambda_j$ to the control signal generation part $43C_i$. The control signal generation part $43C_i$ generates a control signal by following $df_i/d\lambda_i$, $df_j/d\lambda_j$, and Equation 1 defined in advance, and outputs the control signal to the function block $B_i$.

$$\frac{d\lambda_i}{dt} = K_1\left(\frac{df_i}{d\lambda_i} - \frac{df_j}{d\lambda_j}\right) \qquad \text{Equation 1}$$

In this equation, $K_1$ is a coefficient corresponding to a gain of the state change. As a result of the control, the control signal generation parts $43C_i$ and $43C_j$ generate control signals for changing the states of the function blocks $B_i$ and $B_j$ so that the derivatives $df_i/d\lambda_i$ and $df_j/d\lambda_j$ are equal to each other. This control is equivalent to controlling a state (load amount) of each function block to reach a point where the total profit is maximized as described above for the "convex programming problem". In other words, the efficiency set to the vertical axis of the evaluation function is maximized in the entire system. The monitoring part $44C_i$ monitors the function block $B_i$, thereby acquiring $\lambda_i$ representing the current state of the function block $B_i$, and outputs $\lambda_i$ to the evaluation function processing part $41C_i$.

Each of the state control devices C1, C2, . . . , Cn communicates to/from at least one of the other state control devices, transmits the own derivative to the state control device, and receives the derivative of the state control device to carry out control based on Equation 1. In FIG. 2, for the sake of drawing, it appears that each of the state control devices can communicate to/from all the other state control devices, but an actual connection may not be arranged in this way, and, for example, a state control device which communicates to/from only one of the other state control devices may exist in the system 1. Alternatively, each of the state control devices in the system 1 may communicate to/from a plurality of state control devices.

A relationship among the state control devices for communicating the values required for generating the control signals, such as the communication of the derivatives described above, and a relationship among the function blocks corresponding to the state control devices having such a relationship may be herein referred to as "adjacency". For example, the state control devices $C_i$ and $C_j$ are adjacent to each other in the above-mentioned description of the load balancing control. Moreover, the function blocks $B_i$ and $B_j$ thereof are also adjacent to each other.

Equation 1 has an important point other than the efficiency maximization. The point is that Equation 1 requires state changes which are the same in absolute value and are different in sign respectively from the element i (state control device $C_i$) and the element j (state control device $C_j$). This means that a sum of the state changes of a certain element and an element adjacent thereto at a certain time point is zero. This is the important point of this invention.

Figure 1:
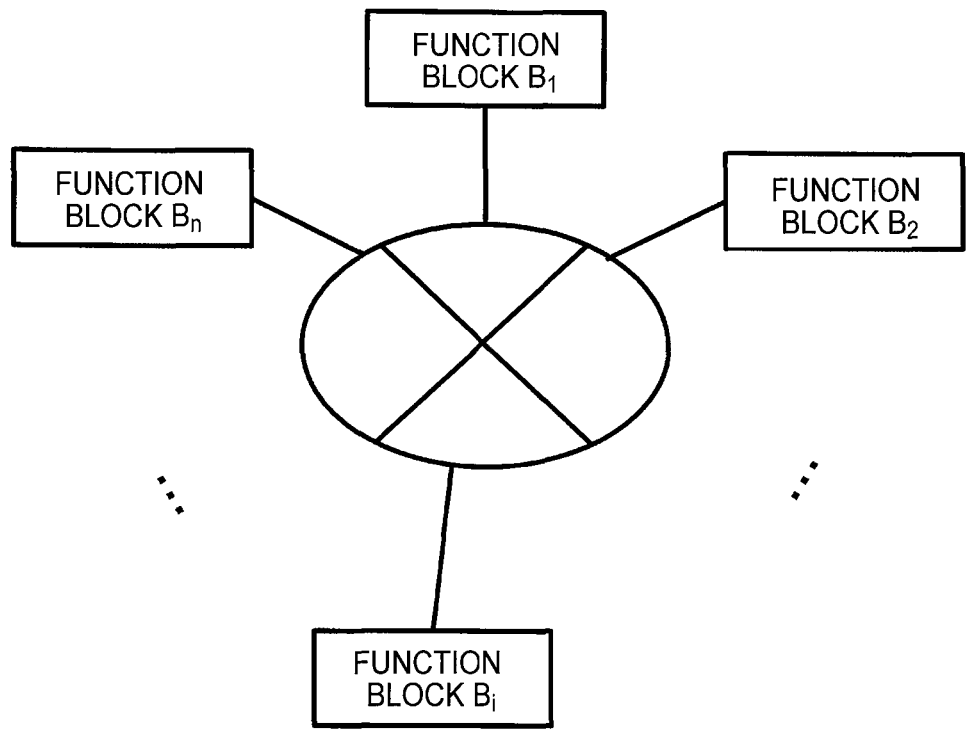
FIG. 1 is a diagram illustrating an example of a network system to which this invention is applicable.

A load request occurs locally, in other words, on each of the function blocks across the system in the system illustrated in FIG. 1. In this invention, the state control device is provided for each of the function blocks as in the system 1 illustrated in FIG. 2. The passing and receiving of the local load on each of the function blocks are controlled so that the sum of the state changes of a certain element and an element adjacent thereto at a certain time point is zero. As a result, the autonomous decentralized processing is carried out, but in this invention, a total load requested from the entire system can be satisfied without excess or deficiency.

When the unit commitment problem is to be solved, a total request (or total demand) to be satisfied by the entire system (in the above-mentioned example, the entire server network) exists. The satisfying of the total request is also referred to as "supply/demand balancing". The supply/demand balancing is one of constraints for solving the unit commitment problem. It is meaningless to maximize the efficiency and the profit without satisfying the total demand as the entire system.

A general method of solving the unit commitment problem calculates the total demand from the entire system, and distributes loads which the respective elements are to take charge of based on the total demand. This method requires an entity for supervising the entire system in order to appropriately distribute the total demand from the entire system to the respective elements (function blocks). For example, the system of FIG. 1 requires such means as, in a sense, a central control device for the system, for appropriately distributing the total demand requested from the entire system to the respective function blocks B1, B2, . . . , Bn.

In this invention, the total demand on the entire system can be satisfied by balancing the passing and receiving of a load only among the elements (function blocks) adjacent to one another. On this occasion, the control is carried out by means of the autonomous decentralized processing, and a central control device for acquiring the total demand on the entire system by summation is not necessary. This control method is particularly effective when the scale of the network increases, and it thus becomes difficult to provide a central control device for supervising the entire system.

The number of state control devices adjacent to a certain state control device or the number of function blocks adjacent to a certain function block may be two or larger. On this occasion, each of the state control devices may define Equation 1 for each of state control devices adjacent to the state control device, and may sequentially carry out the control based on Equation 1 for all the adjacent state control devices. For example, when the state control devices $C_2$ and $C_3$ are adjacent to the state control device $C_1$, the state control device $C_1$ may first control the function block $B_1$ by following Equation 2, and may then control the function block $B_1$ by following Equation 3. The state control device $C_1$ is a state control device specified by assigning 1 to i in FIG. 5, and the control signal generation part $43C_1$ first generates the control signal by following Equation 2, transmits the generated control signal to the function block $B_1$, and generates the control signal by following Equation 3, to transmit the generated control signal to the function block $B_1$.

$$\frac{d\lambda_1}{dt} = K_1\left(\frac{df_1}{d\lambda_1} - \frac{df_2}{d\lambda_2}\right) \quad \text{Equation 2}$$

$$\frac{d\lambda_1}{dt} = K_1\left(\frac{df_1}{d\lambda_1} - \frac{df_3}{d\lambda_3}\right) \quad \text{Equation 3}$$

Figure 6:
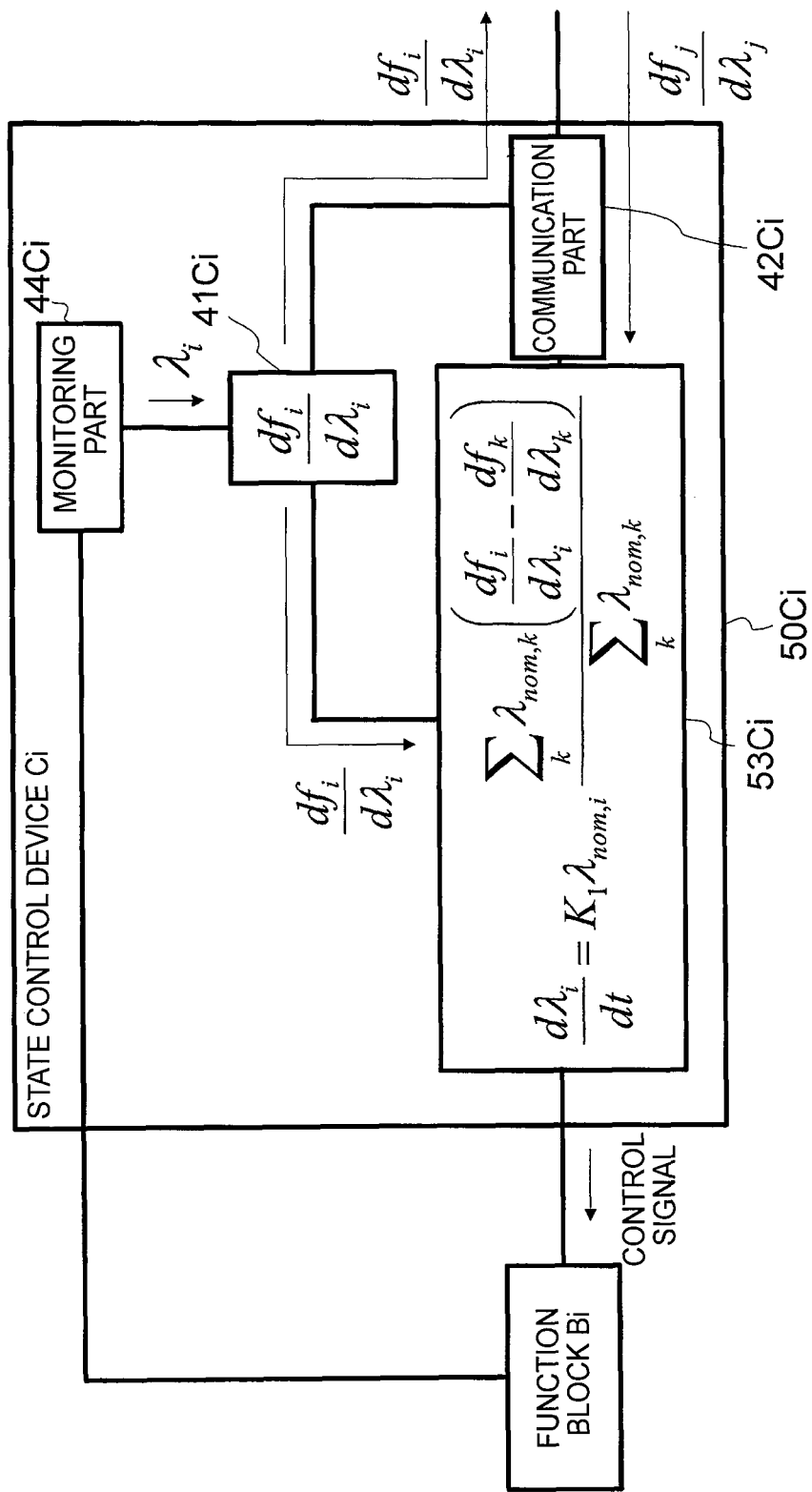
FIG. 6 is a block diagram illustrating a state control device $50C_i$.

Alternatively, each of the state control devices may acquire Equation 4 as one equation based on the derivatives of the state control devices itself and all the state control devices adjacent to the state control device, and carry out the control based on Equation 4. For example, when the state control devices $C_2$ and $C_3$ are adjacent to the state control device $C_1$, the state control device $C_1$ may control the function block $B_1$ by following one equation such as Equation 5. On this occasion, the state control device $50C_i$ is configured as illustrated in FIG. 6, and includes a control signal generation part $53C_i$ for generating the control signal based on Equation 4, and outputting the generated control signal to the function block $B_i$ in place of the control signal generation part $43C_i$ of FIG. 5.

$$\frac{d\lambda_i}{dt} = K_1\lambda_{nom,i}\frac{\sum_k \lambda_{nom,k}\left(\frac{df_i}{d\lambda_i} - \frac{df_k}{d\lambda_k}\right)}{\sum_k \lambda_{nom,k}} \quad \text{Equation 4}$$

-continued $$\frac{d\lambda_1}{dt} = K_1 \lambda_{nom,1} \frac{\lambda_{nom,1}\left(\frac{df_1}{d\lambda_1} - \frac{df_1}{d\lambda_1}\right) + \lambda_{nom,2}\left(\frac{df_1}{d\lambda_1} - \frac{df_2}{d\lambda_2}\right) + \lambda_{nom,3}\left(\frac{df_1}{d\lambda_1} - \frac{df_3}{d\lambda_3}\right)}{\lambda_{nom,1} + \lambda_{nom,2} + \lambda_{nom,3}} \quad \text{Equation 5}$$

In Equations 4 and 5, $\lambda_{nom,i}$ is a normalization coefficient for the element i. When the elements are heterogeneous, in other words, function blocks different in performance are mixed, it is often convenient to define the evaluation functions for the respective blocks by multiplying the normalized evaluation function by the normalization coefficients depending on the performances of the respective function blocks, and the normalization coefficient is thus introduced herein. Thus, the normalization coefficient $\lambda_{nom,i}$ is an amount corresponding to the performance and a scale of the function block $B_i$.

The passing and receiving of the load among the elements are automatically balanced by Equation 1, but the automatic balancing is not provided by Equation 4. Therefore, when the control based on Equation 4 is carried out, such a device that the sum of the state changes at a certain time point of a certain element and elements adjacent thereto is zero needs to be added.

In order to control the sum of the changes in state $\lambda$ to reach zero, the element which distributes the load determines easiness of receiving a load at the current time point for each of the adjacent elements, and distributes the load to elements in a state where the load is easily received. When the evaluation function f is a function convex upward, an element larger in the derivative $d\lambda/dt$ than other elements is determined to be in the state where the load is easily received compared with other elements which are not larger in the derivative $d\lambda/dt$. Moreover, when the evaluation function f is a function convex downward, an element smaller in the derivative $d\lambda/dt$ than other elements is determined to be in the state where the load is easily received compared with other elements which are not smaller in the derivative $d\lambda/dt$.

For example, there is known a method of dividing the adjacent elements into two groups including a group of adjacent elements which can receive loads, and a group of adjacent elements which cannot receive loads based on the derivative $d\lambda/dt$. When the evaluation function is convex upward, the derivative $d\lambda_i/dt$ of the element i is compared with each of the derivatives $d\lambda_j/dt$ of the elements adjacent to the element i, and the number of adjacent elements larger in derivative than $d\lambda_i/dt$ is counted. Then, the load derived by using Equation 4 is divided by the counted number of elements. Then, the load calculated in this way is distributed to the respective elements larger in the derivative $d\lambda/dt$ than the derivative $d\lambda_i/dt$. When the state control devices $C_2$, $C_3$, and $C_4$ are adjacent to the state control device $C_1$, and the derivatives $d\lambda_2/dt$ and $d\lambda_3/dt$ of the state control devices $C_2$ and $C_3$ are larger than $d\lambda_1/dt$, the number of elements larger in derivative $d\lambda/dt$ than $d\lambda_1/dt$ is thus two, and a value $d\lambda_1/2dt$ acquired by dividing the $d\lambda_1/dt$ acquired based on Equation 5 by the number of elements 2 is distributed respectively to the state control devices $C_2$ and $C_3$. On this occasion, it is important to provide the control so that $d\lambda_1/dt+d\lambda_2/dt+d\lambda_3/dt=0$ is satisfied at a certain time point.

As another method, a method of observing states of the loads on the adjacent elements, and weighting distributions for elements which can easily receive the load is conceivable. How easy an adjacent element receives the load can be determined by comparing the derivative of the evaluation function as in the principle of the control for this time. An element which easily receives a load is an element larger in derivative $d\lambda/dt$ than itself when the evaluation function is convex upward, and is an element smaller in derivative $d\lambda/dt$ than itself when the evaluation function is convex downward. A case where the state control devices $C_2$, $C_3$, and $C_4$ are adjacent to the state control device $C_1$, and the load is distributed to the state control devices $C_2$ and $C_3$ out thereof is now considered. When a value acquired by subtracting the derivative $d\lambda_2/dt$ of the state control device $C_2$ from the derivative $d\lambda_1/dt$ of $C_1$ is $d\lambda_1/dt-d\lambda_2/dt=-5$, and a value acquired by subtracting the evaluation function derivative $d\lambda_3/dt$ of $C_3$ from the evaluation function derivative $d\lambda_1/dt$ of $C_1$ is $d\lambda_1/dt-d\lambda_3/dt=-10$, a value $dd\lambda_1/3dt$ acquired by multiplying the value $dd\lambda_1/dt$ acquired by Equation 5 by $(d\lambda_1-d\lambda_2)/(d\lambda_1-d\lambda_2+d\lambda_1-d\lambda_3)=5/(5+10)=\frac{1}{3}$ is distributed to the state control device $C_2$, and a value $2d\lambda_1/3dt$ acquired by multiplying the value $d\lambda_1/dt$ by $(d\lambda_1/dt-d\lambda_3/dt)/(d\lambda_1/dt-d\lambda_2/dt+d\lambda_1/dt-d\lambda_3/dt)=10/(5+10)=\frac{2}{3}$ is distributed to the state control device $C_3$. On this occasion, the control is provided so that $d\lambda_1/dt+d\lambda_2/dt+d\lambda_3/dt=0$ is satisfied at a certain time point.

The problem of balancing of the load can be solved in real time while the total demand is satisfied by the load balancing control. A description is now given of the system 1 when the unit commitment control is carried out. Which function blocks of the system 1 are activated and which function blocks are shut down are determined in the unit commitment control.

FIG. 7(A) is a graph of the state (load on this occasion) $\lambda_i$ and the evaluation function $f_i$ of the function block $B_i$. The value of the evaluation function $f_i$ is zero, and has a gradient $g_{0,i}$ at $\lambda_i=\lambda_{0,i}$. $\lambda_{0,i}$ is also referred to as "zero-crossing point of the function block $B_i$". The evaluation function $f_i$ takes a peak value $\alpha_i$ at $\lambda_i=\lambda_{peak,i}$. $\lambda_{max,i}$ is an upper limit value of $\lambda_i$.

FIG. 7(B) is a graph of the load $\lambda_j$ and the evaluation function $f_j$ of the function block $B_j$ adjacent to the function block $B_i$. The evaluation functions $f_i$ and $f_j$ output values corresponding to the efficiencies or the profits of the function blocks $B_i$ and $B_j$. On the evaluation function $f_j$ of the function block $B_j$ adjacent to the function block $B_i$, a horizontal axis coordinate of a point having the same gradient $g_{0,i}$ as that of the zero-crossing point $\lambda_{o,i}$ of the function block $B_i$ is $z_{ij}$. $z_{ij}$ is used as an index in the unit commitment control of this invention. $z_{ij}$ is represented by Equation 6.

$$\left(\frac{df_j}{d\lambda_j}\right)_{\lambda_j=z_{ij}} = \left(\frac{df_i}{d\lambda_i}\right)_{\lambda_i=\lambda_{0,i}} \quad \text{Equation 6}$$

Further, an index $S_i$ is defined by using the index $z_{ij}$ as Equation 7.

$$S_i = \sum_{j \neq i} (\lambda_j - z_{ij}) - \lambda_{0,i} \quad \text{Equation 7}$$

The index $S_i$ represents how much the sum of the loads of all the function blocks adjacent to the function block $B_i$ is larger than the load at the zero-crossing point $\lambda_{0,i}$ of the function block $B_i$. It should be noted that in Equation 7, both $\lambda_j$ and $z_{ij}$ are values relating to the function block adjacent to the function block $B_i$. It is assumed that values relating to function blocks which are included in the system 1, but are not adjacent to the function block Bi are not included in Equation 7.

When the function block $B_i$ is shut down, a condition to activate the function block $B_i$ is that the function block $B_i$ is ready to take charge of a load equal to or larger than the zero-crossing point. When this condition is satisfied, the profit acquired from the function block $B_i$ is equal to or larger than zero when the function block $B_i$ is activated, and the activation of the function block $B_i$ is thus not loss. The index $S_i$ is an advantage/disadvantage converted into a number caused by the activation/shutting down of the function block $B_i$ as described above.

When the derivative of evaluation function $f_i$ is $g_{0,i}$ at the zero-crossing point $\lambda_{0,i}$ of the function block $B_i$, and the value of the load $\lambda_j$ is $z_{ij}$ when the derivative of the evaluation function $f_j$ of the function block $B_j$ adjacent to the function block $B_i$ is $g_{0,i}$ a first term on the right side of Equation 7 represents a sum of differences, each of which is a difference between the current load $\lambda_i$ and $z_{ij}$ of the function block $B_j$, for all the function blocks adjacent to the function block $B_i$. The index $S_i$ is acquired by subtracting the zero-crossing point $\lambda_{0,i}$ of the evaluation function $f_i$ of the function block $B_i$, which is a second term on the right side, from the sum of the differences.

When the function block $B_i$, which is in a state where the index $S_i$ is larger than zero, and is shut down, is to be activated, the function block $B_i$ gradually takes charge of a part of the loads which the adjacent function block group is bearing, and the loads exceeds the zero-crossing point $\lambda_{0,i}$. Thus, when the function block $B_i$ is activated in this state, a positive profit is generated. When the function block $B_i$ is currently activated, the index $S_i$ larger than zero represents a state where the function block $B_i$ is not required to be shut down at the current time point.

Conversely, even when the function block $B_i$, which is in a state where the index $S_i$ is smaller than zero, and is shut down, is to be activated, similarly the function block $B_i$ gradually takes charge of a part of the loads which the adjacent function block group is bearing, but the loads become smaller than the zero-crossing point $\lambda_{0,i}$. Thus, when the function block $B_i$ is activated in this state, a negative profit is generated. When the function block $B_i$ is currently activated, the index $S_i$ smaller than zero represents a state where the function block $B_i$ is required to be shut down.

As described above, whether the function block $B_i$ is required to be activated or not can be determined based on the sign of the index $S_i$. When the index $S_i$ is negative, this state means that the function block $B_i$ is in charge of such a load $\lambda_i$ that the evaluation function $f_i$ takes a negative value at this time point. Therefore, the state can be considered that when the evaluation function $f_i$ becomes equal to or smaller than zero, the function block $B_i$ is shut down.

There is another point to be considered when the activated node is to be shut down. The point relates to the unit commitment for nodes same in performance. As described above, when the activation takes a cost, such a state that only any one of nodes is preferably activated, and the rest of nodes are preferably shut down often occurs. However, when the nodes are the same in performance, which node is to be shut down cannot be currently determined. Then, we have introduced the following algorithm.

"When the value of the evaluation function is equal to or smaller than 0, and is the lowest among the adjacent nodes, a node is shut down.

The comparison in the value is carried out among the activated nodes.

Even when a plurality of nodes have the lowest value, the node is shut down."

In more detail, the algorithm is described as below. In other words, when the evaluation function $f_i$ of the activated function block $B_i$ is equal to or smaller than zero, and the value of the evaluation function $f_i$ is the lowest among values of evaluation functions $f_{j1}, f_{j2}, \ldots, f_{jm}$ of activated blocks $B_{j1}, B_{j2}, \ldots, B_{jm}$ (j1, j2, ..., jm are other than i) adjacent to the function block $B_i$, the function block $B_i$ is shut down. On this occasion, even when a value equal to the value of the evaluation function $f_i$ exists among the values of the evaluation functions $f_{j1}, f_{j2}, \ldots, f_{jm}$, the function block $B_i$ is shut down.

Such a possibility that all the nodes in the network are shut down completely synchronously with one another is low, and even if all nodes are stopped at the same time, any nodes are activated by the unit commitment control according to this invention, which eliminates the problem. If the coupling in the network is loose, some segments can be left even by means of this algorithm, and if this is the case, the state can be handled by a method of finding out activated nodes among the adjacent nodes as well as activated nodes connected via shut down adjacent nodes, namely, substantial adjacent nodes, and applying the algorithm thereto. The loose coupling herein refers to a connection in a network where the number of adjacent nodes is small at each node. Alternatively, when a node group in which a node is directly connected to a large number of other nodes in the node group, but is not directly connected to nodes outside the node group, in other words, a node group activated as an independent island is referred to as "segment", a coupling between two segments is said to be loose.

In FIGS. 7(A) and (B), when the loads $\lambda_i$ and $\lambda_j$ are zero, both the evaluation functions $f_i$ and $f_j$ take negative values. These states imply that the maintenance of the function blocks $B_i$ and $B_j$ in the activated state generates costs. When the function block is a server, this configuration is slightly difficult to imagine, and a description is given of, for example, a case where the system 1 is an electric power generation network constructed by a plurality of generators, and the function block is the generator. A generation cost by the generator includes a variable cost generated in proportion to a power generation amount and a fixed cost generated independently of the power generation amount. An electricity cost received from a customer is approximately proportional to the power generation amount, and unless a power equal to or larger than a certain level is generated, the fixed cost cannot be collected. In FIG. 7(A), when the power generation amount is equal to or smaller than $\lambda_{0,i}$, the entire fixed cost of the generator cannot be collected, and when the specific generator is focused on, an expenditure exceeds an income. At $\lambda_{0,i}$, the electricity cost received from the customer for the electricity generation amount generated by the generator and a total cost of the fixed cost and the variable cost for the power generation amount match each other, and the expenditure and the income are balanced.

The evaluation function f does not always take a negative value when the state $\lambda$ is zero. Examples described later include such an example that the system 1 is a data center, each function block is a computer constructing the data center, and a response of the data center is optimized. On this occasion, an amount relating to the response of the computer is set to the evaluation function f, and the evaluation function f takes a positive value when the state $\lambda$ is zero. In this way, the evaluation function can take both positive and negative values when the state λ is zero. However, when a case where the evaluation function takes a negative value is considered in advance, the case where the evaluation function takes a positive value can be solved as part thereof.

Figure 8:
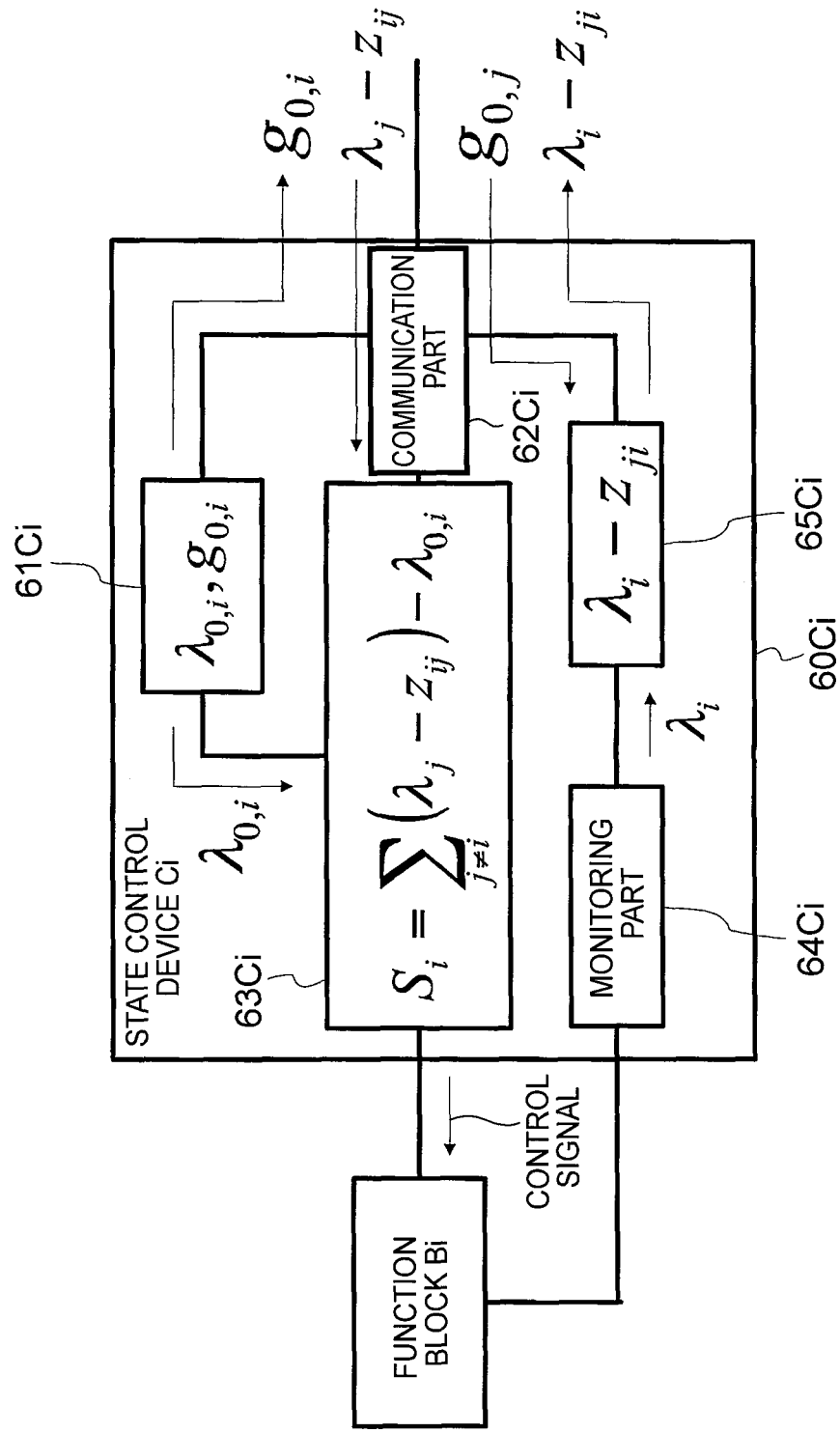
FIG. 8 is a block diagram illustrating a state control device $60C_i$.

Referring to FIG. 8, a description is given of a state control device $60C_i$ for carrying out the unit commitment control. The state control device $60C_i$ includes an evaluation function processing part $61C_i$, a communication part $62C_i$, a control signal generation part $63C_i$, a monitoring part $64C_i$, and an evaluation function processing part $65C_i$.

The evaluation function processing part $61C_i$ outputs the zero-crossing point $\lambda_{0,i}$ defined based on the evaluation function $f_i$ of the function block $B_i$ defined in advance to the control signal generation part $63C_i$. Moreover, the evaluation function processing part $61C_i$ outputs the gradient $g_{0,i}$ of the evaluation function $f_i$ at the zero-crossing point $\lambda_{0,i}$ to the communication part $62C_i$. The evaluation function processing part $61C_i$ may be a storage device for storing the zero-crossing point $\lambda_{0,i}$ and the gradient $g_{0,i}$.

The communication part $62C_i$ transmits the gradient $g_{0,i}$ received from the evaluation function processing part $61C_i$ to another state control device $60C_j$ (not shown) adjacent to the state control device $60C_i$. Moreover, the communication part $62C_i$ receives $\lambda_j$-$z_{ij}$ generated based on the gradient $g_{0,i}$ received by the state control device $60C_j$, and outputs $\lambda_j$-$z_{ij}$ to the control signal generation part $63C_i$.

Further, the communication part $62C_i$ receives a gradient $g_{0,j}$ of the evaluation function $f_j$ at a zero-crossing point $\lambda_{0,j}$ defined based on the evaluation function $f_j$ of the function block $B_j$ from the state control device $60C_j$ and outputs the gradient $g_{0,j}$ to the evaluation function processing part $65C_i$. Moreover, the communication part $62C_i$ transmits $\lambda_j$-$z_{ij}$ input from the evaluation function processing part $65C_i$ to the state control device $60C_j$.

The control signal generation part $63C_i$ acquires the index $S_i$ based on the zero-crossing point $\lambda_{0,j}$ received from the evaluation function processing part $61C_i$, and $\lambda_j$-$z_{ij}$ received from the adjacent state control devices via the communication part $62C_i$, and activates or shuts down the function block $B_i$ depending on the sign thereof.

The monitoring part $64C_i$ monitors the function block $B_i$, thereby acquiring the $\lambda_i$ representing the current state of the function block $B_i$, and outputs $\lambda_i$ to the evaluation function processing part $65C_i$.

The evaluation function processing part $65C_i$ generates $\lambda_i$-$z_{ji}$ based on the state $\lambda_i$ received from the monitoring part $64C_i$ and the gradient $g_{0,j}$ received via the communication part $62C_i$ from the state control device $60C_j$, and transmits $\lambda_i$-$z_{ji}$ via the communication part $62C_i$ to the state control device $60C_j$.

A description is now given of an operation of the unit commitment control for the function block $B_i$ by the state control device $60C_i$. The gradient $g_{0,i}$ output by the evaluation function processing part $61C_i$ is transmitted via the communication part $62C_i$ to the other state control device $60C_j$ adjacent to the state control device $60C_i$. The state control device $60C_j$, which has received the gradient $g_{0,i}$, generates, by the evaluation function processing part $65C_j$, $\lambda_i$-$z_{ji}$ based on the state $\lambda_i$ acquired by the monitoring part $64C_j$ and the received gradient $g_{0,j}$, and transmits $\lambda_i$-$z_{ji}$ via the communication part $62C_j$ to the state control device $60C_i$. A description is now given again of the state control device $60C_i$ and the state control device $60C_i$ passes $\lambda_j$-$z_{ij}$ received by the communication part $62C_i$ to the control signal generation part $63C_i$. The control signal generation part $63C_i$ acquires the index $S_i$ based on the zero-crossing point $\lambda_{0,j}$ received from the evaluation function processing part $61C_i$ and $\lambda_j$-$z_{ij}$ received from the adjacent state control device via the communication part $62C_i$ and activates or shuts down the function block $B_i$ depending on the sign thereof.

Moreover, when the state control device $60C_i$ receives the gradient $g_{0,j}$ at the zero-crossing point $\lambda_{0,j}$ of the evaluation function $f_j$ for the corresponding function block $B_j$ from the adjacent other state control device $60C_j$, the state control device $60C_i$ acquires the state $\lambda_i$ by using the monitoring part $64C_i$ generates $\lambda_i$-$z_{ji}$ by using the evaluation function processing part $65C_i$ and transmits $\lambda_i$-$z_{ji}$ via the communication part $62C_i$ to the state control device $60C_j$.

A description is given of the load balancing control and the unit commitment control in the system 1 independently for the sake of description, and it is thus apparent that any one of the load balancing control and the unit commitment control can be applied to the system, but it is also apparent for a person skilled in the art that both thereof may be provided in order to achieve complete optimization. For example, as in the state control device $70C_i$ of FIG. 9, a state control device for carrying out, while carrying out the load balancing control among adjacent function blocks based on Equation 1, the unit commitment control for the function block by using Equation 7 and the above-mentioned algorithm and considering the states of the adjacent function blocks is provided for each function block. As a result, the unit commitment problem including the load balancing control can be solved in real time in the system 1. This is epoch-making compared with solving the unit commitment problem by making a scheduling beforehand as in the related art. This is because the system 1 can immediately handle, in real time, an even external disturbance and a change in demand, which is not estimated before system operation.

The respective function blocks in the system 1 operate independently of one another in the autonomous decentralized manner, and hence even if any one of the function blocks or the state control devices fails, the other state control devices operate so as to autonomously recover the output from the entire system by an amount corresponding to the interruption of the signal from the failed state control device. Moreover, even if the number of the function blocks abruptly increases or decreases, the system 1 gradually and autonomously tries to move to an appropriate operation state. In other words, the system 1 is very robust against an external disturbance, and also has a scalability of freely increasing/decreasing the number of the elements.

A related-art system is not effective against a failure, or requires preparation of various sequences for errors. Moreover, stability of the entire system is not guaranteed when the number of the elements (resources) is freely increased or decreased, and programs and processing need to be reviewed each time the number of the elements is increased/decreased. The system 1 according to this invention can solve all the problems in the autonomous decentralized adaptive control.

Figure 10:
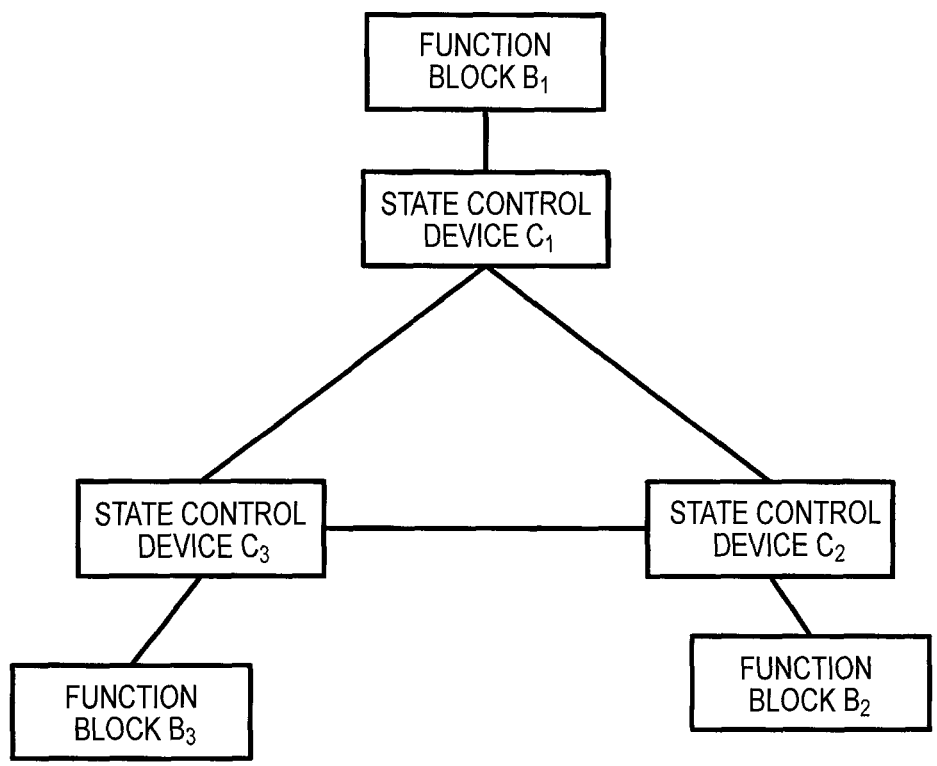
FIG. 10 is a diagram illustrating a system 80 including a network having a triangular structure in which three state control devices $C_1$, $C_2$, and $C_3$ are mutually connected to one another.
Figure 11:
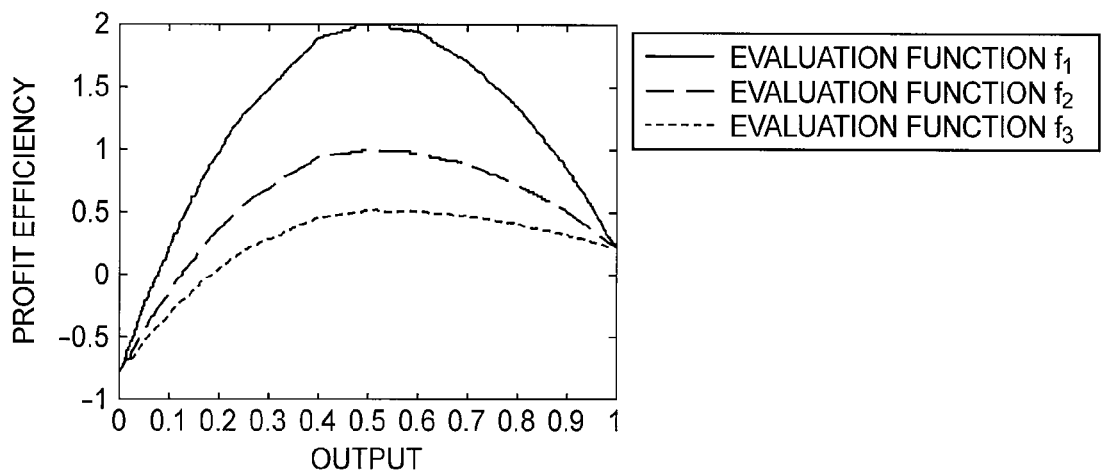
FIG. 11 is a graph showing evaluation functions $f_1$, $f_2$, and $f_3$ when performances of function blocks $B_1$, $B_2$, and $B_3$ are different from one another.

How the respective function blocks are activated/shut down and carry out load balancing in response to a temporal change in the total demand from the system 1 according to this invention was experimented. The experiment was carried out on a system 80 illustrated in FIG. 10 including a network having a triangular structure where three state control devices $C_1$, $C_2$, and $C_3$ are connected to one another. The state control devices $C_1$, $C_2$, and $C_3$ respectively control function blocks $B_1$, $B_2$, and $B_3$, and carry out both the load balancing control and the unit commitment control as in the state control device $70C_i$ of FIG. 9. The function blocks $B_1$, $B_2$, and $B_3$ are different from one another in performance, and, thus, their evaluation functions $f_1$, $f_2$, and $f_3$ are different from one another. FIG. 11 is a graph of the evaluation functions $f_1$, $f_2$, and $f_3$. States $\lambda_1$, $\lambda_2$, and $\lambda_3$ respectively represent outputs (powers) of the function blocks $B_1$, $B_2$, and $B_3$. The evaluation functions $f_1$, $f_2$, and $f_3$ are respectively the functions of the states $\lambda_1$, $\lambda_2$, and $\lambda_3$, and represent profit efficiencies of the function blocks $B_1$, $B_2$, and $B_3$ in the certain states $\lambda_1$, $\lambda_2$, and $\lambda_3$. As understood from a comparison of the profit efficiencies for the same output of the evaluation functions, the profit efficiency increases in the order of the function blocks $B_1$, $B_2$, and $B_3$. The total demand was temporally changed in the system 80. In other words, the total demand was 0.2 from a time point 0 to a time point 10, the total demand was 1.0 from the time point 10 to a time point 20, and the total demand was again changed to 0.2 after the time point 20.

Figure 12:
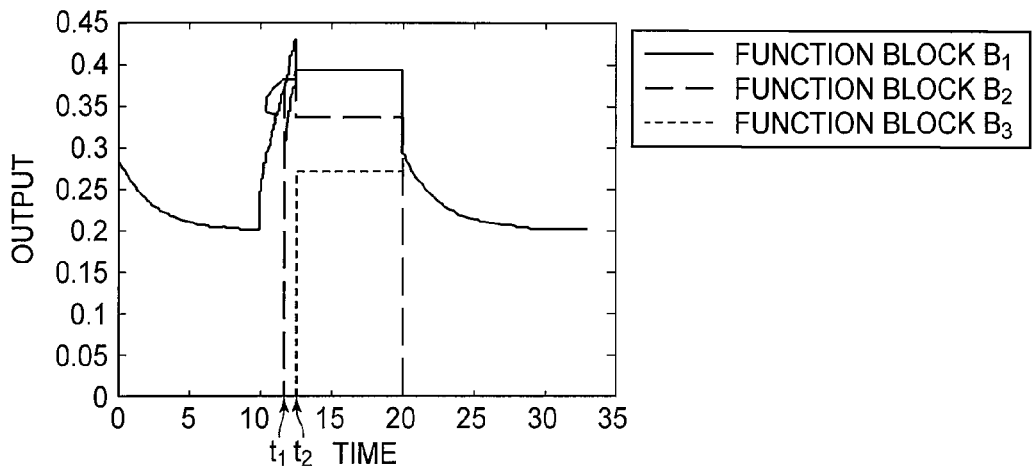
FIG. 12 is a graph showing temporal changes in outputs $\lambda_1$, $\lambda_2$, and $\lambda_3$ of the function blocks $B_1$, $B_2$, and $B_3$ different in performance from one another.
Figure 13:
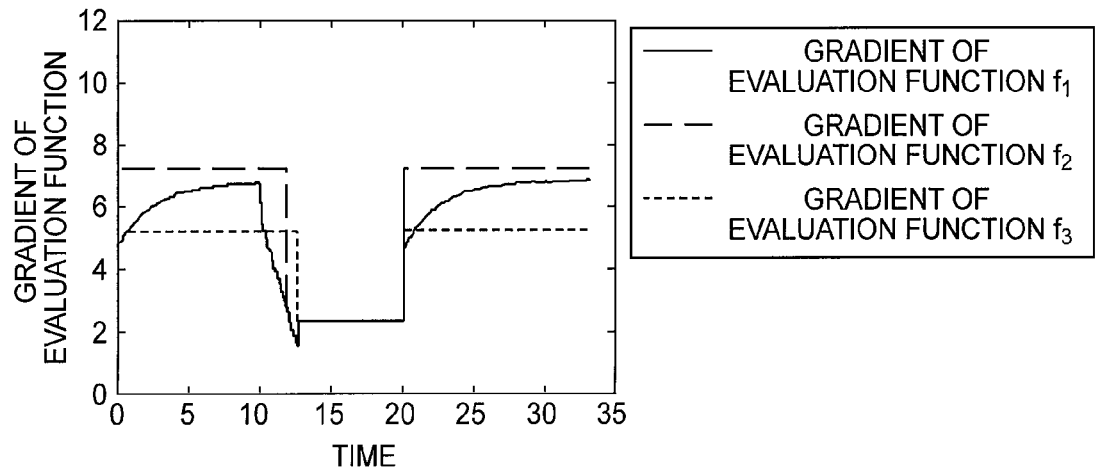
FIG. 13 is a graph showing temporal changes in gradient of the evaluation functions $f_1$, $f_2$, and $f_3$ of the function blocks $B_1$, $B_2$, and $B_3$ different in performance from one another.

On this occasion, the outputs $\lambda_1$, $\lambda_2$, and $\lambda_3$ of the respective function blocks $B_1$, $B_2$, and $B_3$ respectively presented temporal changes as shown in FIG. 12 by the control by the state control devices $C_1$, $C_2$, and $C_3$. In other words, when the total demand is 0.2 from the time point 0 to the time point 10, only the function block $B_1$ highest in profit efficiency was activated. When the total demand increased from 0.2 to 1.0 at the time point 10, the output of the function block $B_1$ quickly increased accordingly, and the function block $B_2$ higher in profit efficiency out of the shut-down function blocks $B_2$ and $B_3$ was activated by priority at a time point $t_1$. After the time point $t_1$, the outputs of the function block $B_1$ and $B_2$ increased, and the shut-down function block $B_3$ was activated at a time point $t_2$. The outputs of the function blocks $B_1$, $B_2$, and $B_3$ are each constant from the time point $t_2$ to the time point 20. When the total demand returned from 1.0 to 0.2 at the time point 20, the function blocks $B_2$ and $B_3$ were shut down, and the state returned to the state where only the function block $B_1$ operates. FIG. 13 shows the gradients of the evaluation functions $f_1$, $f_2$, and $f_3$ in this period.

As described above, this invention has such a mechanism as to mathematically optimally solve the unit commitment problem, and hence the experimental result indicates that an external disturbance (quick change in demand) is responded while the unit commitment problem is solved in real time (dynamically). This is a very remarkable achievement.

Figure 14:
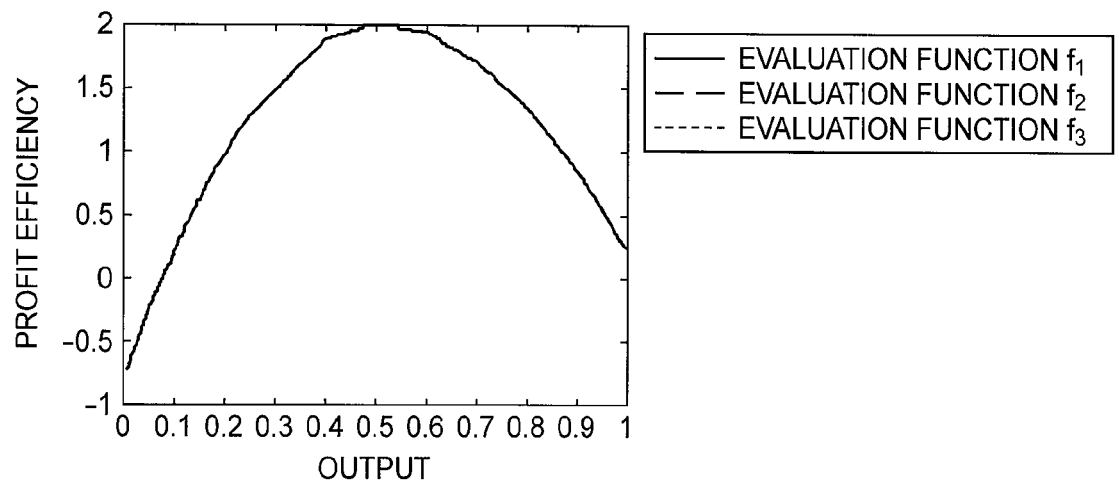
FIG. 14 is a graph showing evaluation functions $f_1$, $f_2$, and $f_3$ of the function blocks $B_1$, $B_2$, and $B_3$ having the same performance.
Figure 15:
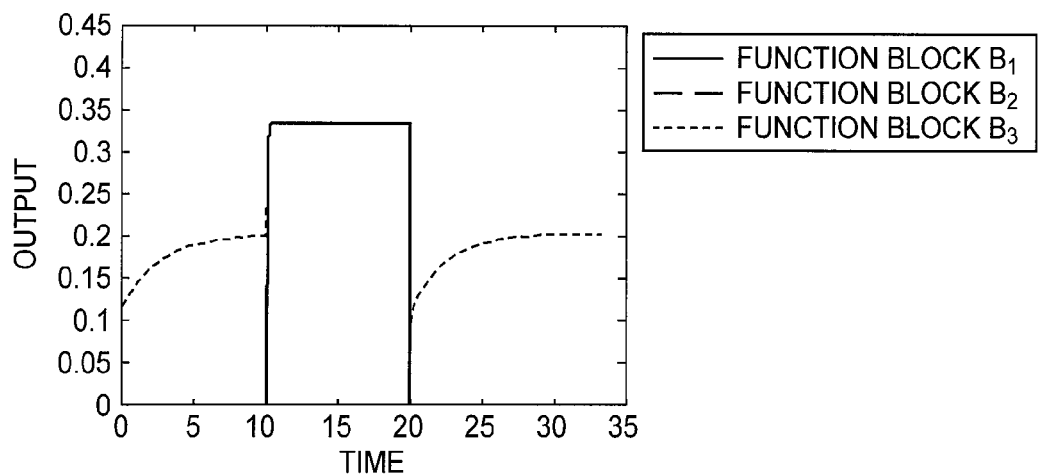
FIG. 15 is a graph showing temporal changes in outputs $\lambda_1$, $\lambda_2$, and $\lambda_3$ of the function blocks $B_1$, $B_2$, and $B_3$ having the same performance.
Figure 16:
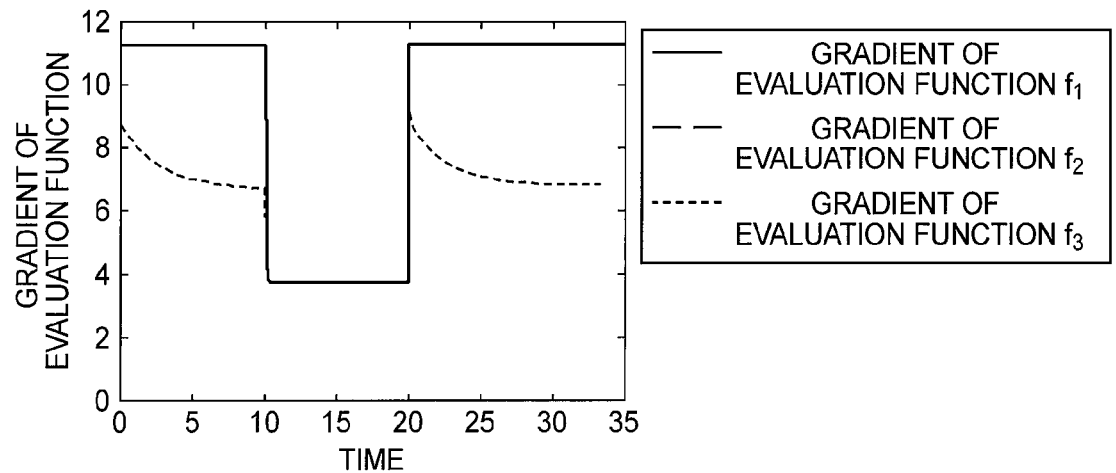
FIG. 16 is a graph showing temporal changes in gradient of the evaluation functions $f_1$, $f_2$, and $f_3$ of the function blocks $B_1$, $B_2$, and $B_3$ having the same performance.

A description is now given of such an experiment that the performances of the function blocks $B_1$, $B_2$, and $B_3$ are set to equal. In this case, the evaluation functions $f_1$, $f_2$, and $f_3$ are the same, and hence their graphs overlap as shown in FIG. 14 to appear as a single curve. On this occasion, similarly, the total demand was 0.2 from the time point 0 to the time point 10, the total demand was 1.0 from the time point 10 to the time point 20, and the total demand was again changed to 0.2 after the time point 20. All the function blocks are the same in performance, and it is thus difficult to understand from the graph, but it is understood that only the function block $B_3$ was activated when the total demand was 0.2, and the three function blocks equally took charge of the load when the total demand was 1.0. In this way, this invention can efficiently carry out the optimization even if the activation generates a cost and the function blocks are the same in performance.

This invention carries out such control that the derivatives of the evaluation functions are equal for respective elements, but equalizing the derivatives of the certain functions for the respective elements is not the essence. The essence is that derivatives of convex functions are equal for the respective elements.

EXAMPLE 1

Figure 17:
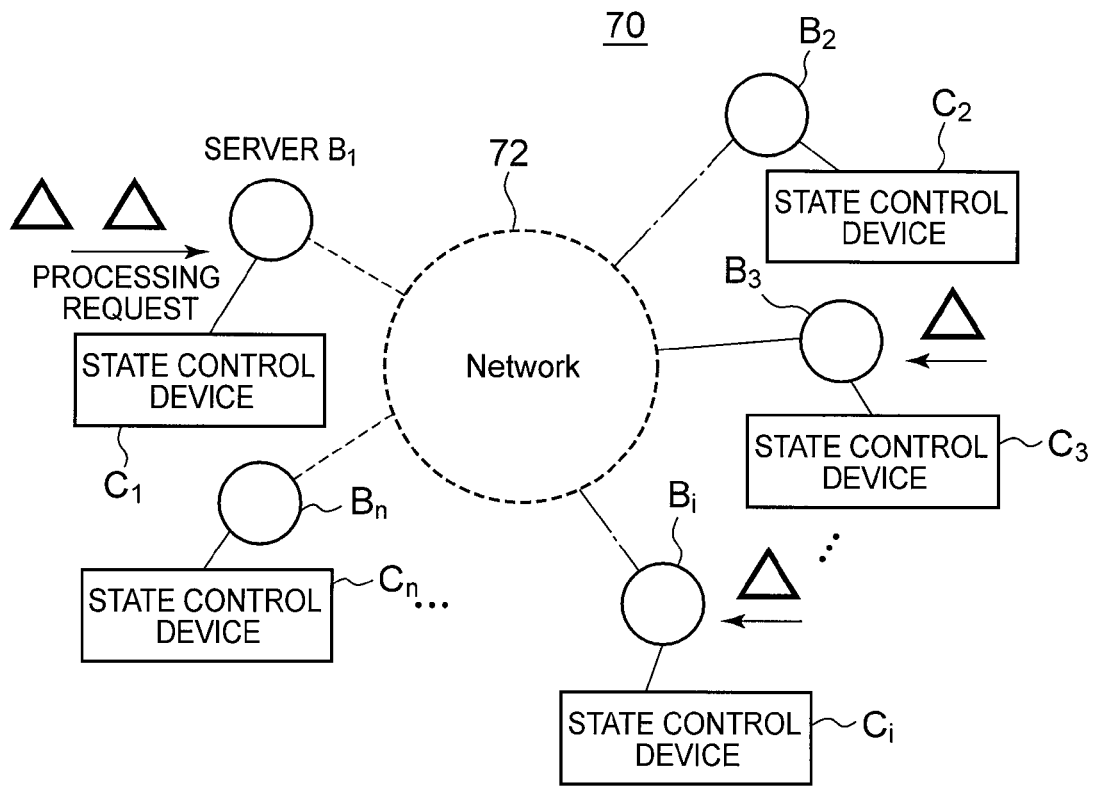
FIG. 17 is a diagram illustrating a data center 70, which is Example 1 of this invention.

A description is now given of a data center 70, which is an example of this invention. Referring to FIG. 17, the data center 70 includes servers $B_1$, $B_2$, ..., $B_i$, ..., $B_n$ connected with one another via a data communication network, and state control devices $C_1$, $C_2$, ..., $C_i$, ..., $C_n$ corresponding to the respective servers. The embodiment described above in terms of the resource load balancing is applied to the data center 70. In this example, as the states $\lambda_1$, $\lambda_2$, ..., $\lambda_i$, ..., $\lambda_n$ of the servers $B_1$, $B_2$, ..., $B_i$, ..., $B_n$ task amounts (workloads) assigned to resources managed by the servers are used.

When the resource load balancing at the data center is considered, response, throughput, energy, and the like can be mentioned as constraints which an administrator sticks to. In this example, the response and the throughput are considered as the constraints.

The response and the throughput are amounts closely related with each other. Moreover, the response and the throughput are in a trade-off relationship. As briefly described, as processing by the server approaches a limit, the throughput increases and the response decreases. Moreover, the response has such a characteristic as to quickly decrease as the processing by the server approaches the limit. This is described by the queueing theory. The administrator of the server needs to balance loads imposed on the servers so that a response demand and a throughput demand from the system managed by the administrator of the servers are satisfied at the same time as much as possible.

How does the administrator distribute a load imposed on the data center by using this invention? As described above, the response and the throughput are in the trade-off relationship, and hence when the response is emphasized, the workload ($\lambda_i$) assigned to the each server (function block) $B_i$ only needs to be decreased. Moreover, when the throughput is emphasized, the workload $\lambda_i$ only needs to be increased. Therefore, the function set to the each element only needs to be set in the following method, for example.

Figure 18:
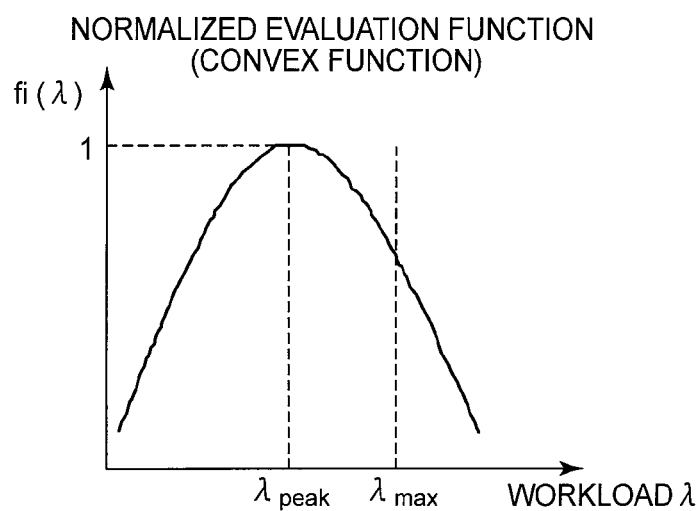
FIG. 18 is a graph showing a normalized evaluation function.

FIG. 18 shows an overview of the evaluation function. The problem to be examined for this time is the load balancing, and the horizontal axis is thus the workload $\lambda_i$. As described above, the evaluation function is preferably a convex function, and is thus a quadratic function convex upward for this time. $\lambda_{max}$ is a limit of the resource, and $\lambda_{peak}$ represents a peak position of the evaluation function. When the peak of the evaluation function is normalized to 1, the normalized evaluation function is determined as a quadratic function passing through (0,0) and ($\lambda_{peak}$, 1) in this case. In this example, it is assumed that the activation of the server does not generate a cost, and the value of the evaluation function is not negative around the origin. When the response and the throughput are not decreased much by the activation/shutting down, this configuration is appropriate.

The respective elements (resources) are different from one another in performance, and hence each of evaluation functions is acquired by multiplying the normalized evaluation function by a coefficient $\alpha_i$ proportional to the performance difference. As described above, when the response needs to be emphasized, the workload $\lambda_i$ distributed to each element (resource) only needs to be decreased, and when the throughput needs to be emphasized, the workload $\lambda_i$ only needs to be increased. Therefore, when the system needs to carry out work while the response is emphasized, the position of the $\lambda_{peak}$ only needs to be smaller, and when the system needs to carry out work while the throughput is emphasized, the position of the $\lambda_{peak}$ only needs to be larger.

Each of the servers in the data center 70 uses the method of the system 1, thereby operating to reach each position of $\lambda_{peak}$ as much as possible while solving the unit commitment problem. Thus, when the position of $\lambda_{peak}$ is set to a small value, the work is distributed so that the load on each element is relatively small, and the response is emphasized as the overall operation. Moreover, when the position of $\lambda_{peak}$ is set to a large value, the work is distributed so that the load on each element is relatively large, and the throughput is emphasized as the overall operation. Unnecessary resources are appropriately shut down, and hence control without waste in terms of energy is provided.

It should be noted that the vertical axis of the evaluation function does not represent a certain actual efficiency at the data center 70. Rather, the vertical axis represents a position at which the administrator wants the data center 70 to operate, and the setting of the evaluation function is not ruled by a certain physical amount or law. A person who wants to operate the system can arbitrarily set the vertical axis and the horizontal axis. In a sense, when a person passes a command as an evaluation function to the system, the system autonomously operates in a cooperative manner subsequently.

The evaluation function is the quadratic function passing through (0,0) and ($\lambda_{peak}1$) multiplied by the coefficient $\alpha_i$ for this time, but the evaluation function only needs to be a convex function, and can thus be set in various ways. In an extreme case, a hand-written evaluation function may be set.

Figure 9:
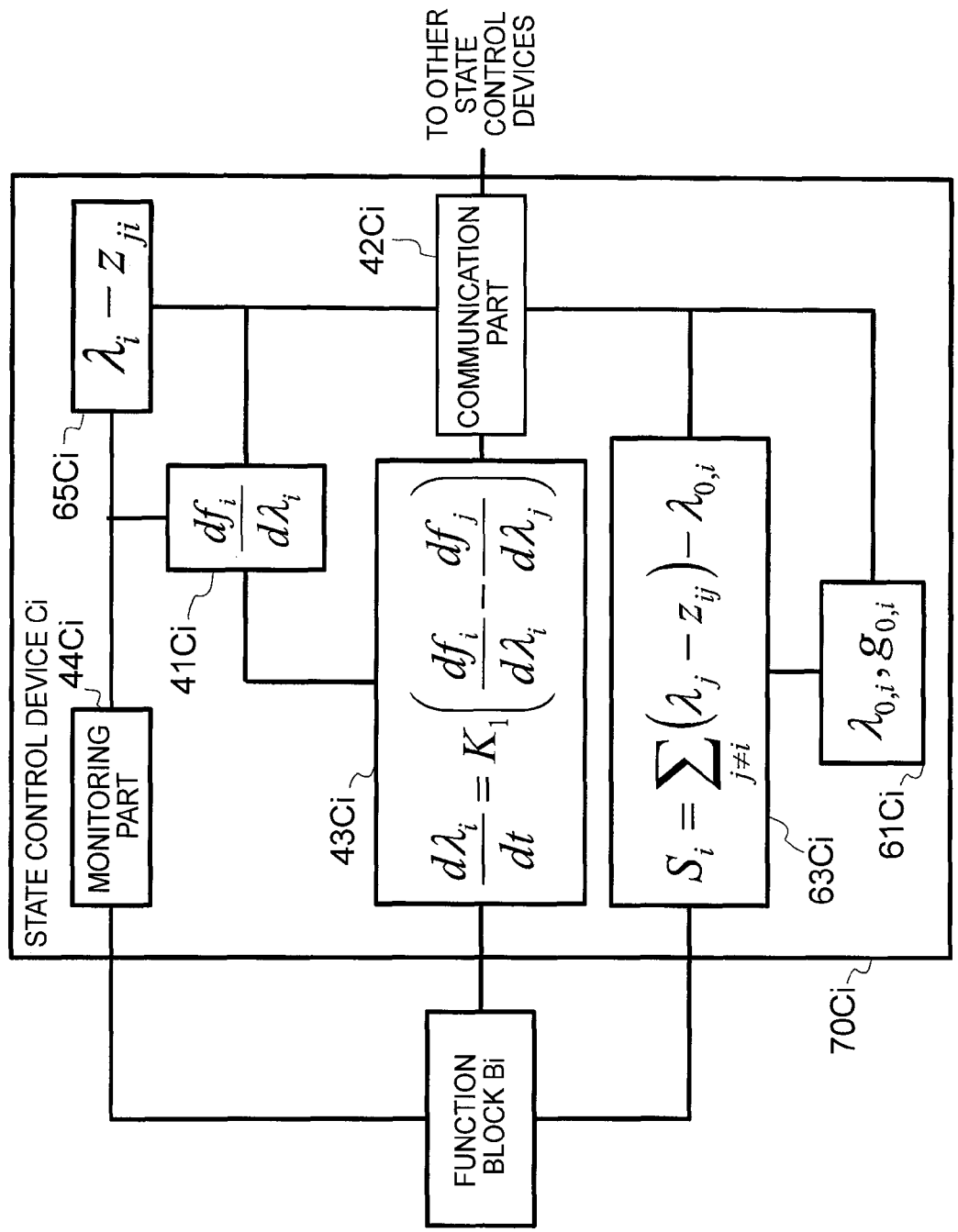
FIG. 9 is a block diagram illustrating a state control device $70C_i$.

An experiment of the load balancing at the data center 70 was carried out by using the above-mentioned evaluation function. The state control device $C_i$ for carrying out both the load balancing control and the activation/shutting down control as illustrated in FIG. 9 is provided for the each server $B_i$. The each server $B_i$ carries out the control while observing the evaluation function $f_i$ set to the server $B_i$ itself and states of other servers connected the server $B_i$ itself. The each server $B_i$ carries out data communication to/from all servers other than the server $B_i$ itself. In other words, the server $B_i$ transmits $df_i/d\lambda_i$, $g_{0,i}$, and $\lambda_i$-$z_{ji}$ to the other server $B_j$, and conversely receives $df_j/d\lambda_j$, $g_{0,j}$, and $\lambda_j$-$z_{ij}$ from the server $B_j$. As a result, a difference between a total request (demand) required for the supply/demand balancing and the workload on the entire system at the current time point can be monitored by the each server. A coefficient $K_1$ for determining the load balancing is appropriately set. Moreover, the total number of servers is 1,000. Further, the performances of the respective servers are not equal, and $\alpha_i$ is set to be larger for a server higher in performance.

Figure 19:
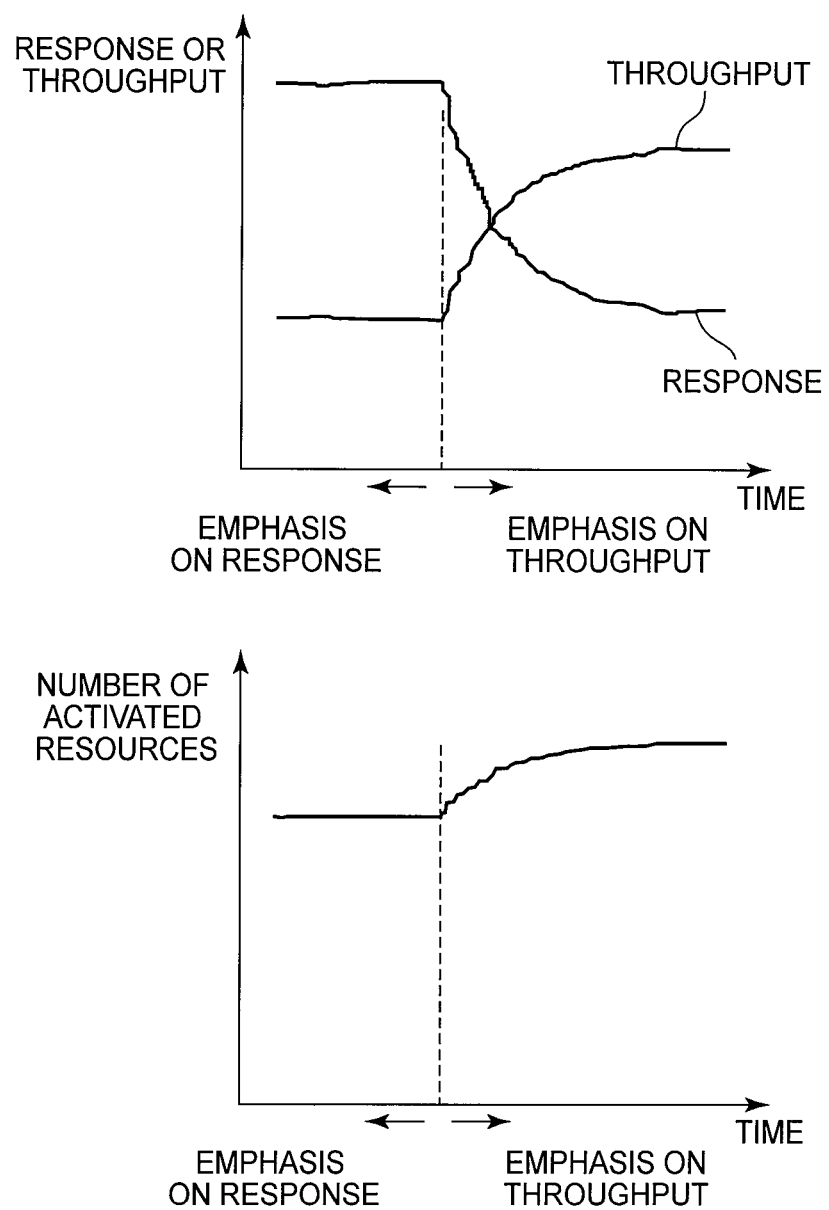
FIG. 19 includes graphs showing changes in a throughput, a response, and a number of activated resources before and after a peak $\lambda_{peak}$ of the evaluation function was changed at the data center 70.

FIG. 19 shows a first experiment result. The horizontal axis of the graph represents time. The vertical axis of the graph represents an effective response, throughput, and number of activated resources (number of activated servers) of the entire system. At first, $\lambda_{peak}$ was set to be small, and the response was emphasized in the operation. Then, the $\lambda_{peak}$ was set to be large at a time point represented as "Emphasis on Throughput" in FIG. 19. Then, as the graph represents, it was confirmed that while the response decreased, the throughput increased, and the system autonomously changed the operation toward the state where the response is emphasized. The number of activated servers was also appropriately adjusted, and it was confirmed that this invention is effective.

Figure 20:
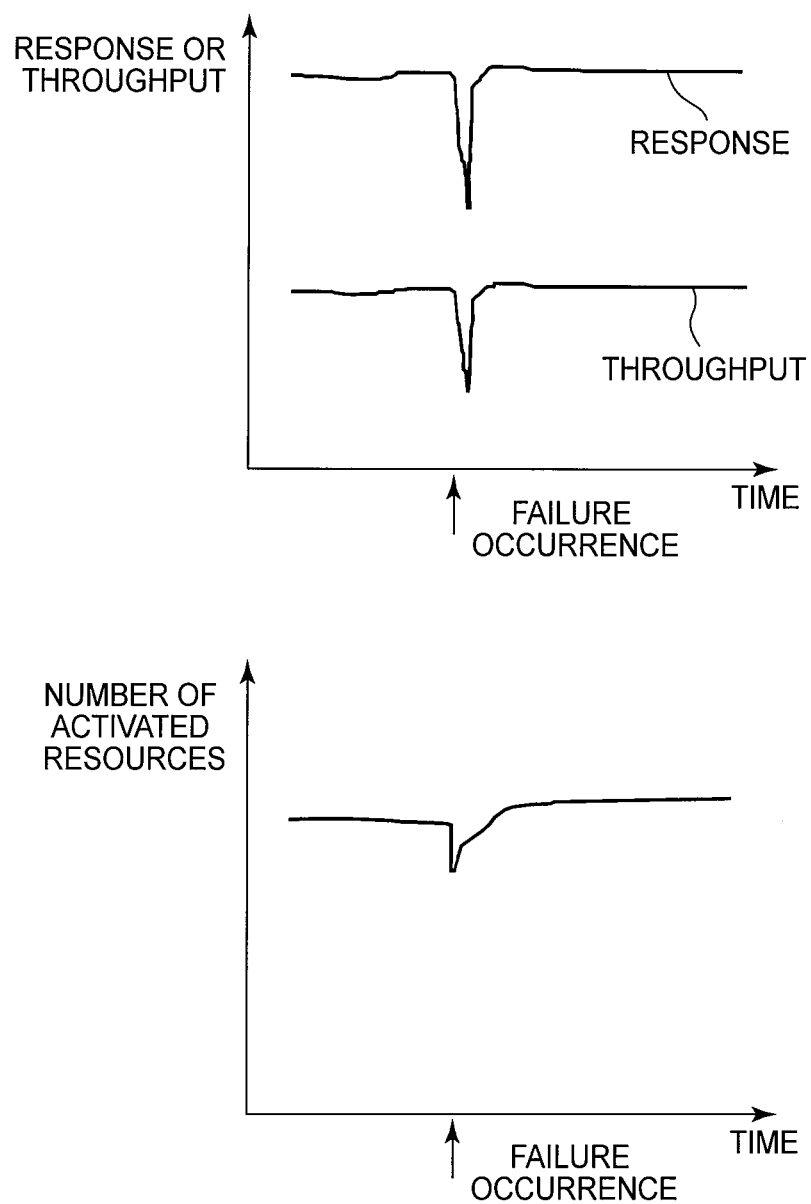
FIG. 20 includes graphs showing changes in the throughput, the response, and the number of activated resources before and after a part of servers were shut down at the data center 70.

FIG. 20 shows a second experiment result. The horizontal axis of the graph represents time. The vertical axis of the graph represents an effective response, throughput, and number of activated resources (number of activated servers) of the entire system. 10 Percent of servers were intentionally shut down (positions represented by arrows in FIG. 20) during the operation while a certain $\lambda_{peak}$ was set. Then, it is understood from the graphs that the throughput and the response temporarily decreased, but the throughput and the response autonomously recovered. The performances of the servers are not equal but are in a heterogeneous state, and hence the number of servers used after the autonomous recovery changed before and after the intentional stop of the servers. This surely means that the unit commitment problem is autonomously solved. It was confirmed that this invention is also effective in terms of robustness against a failure.

Figure 21:
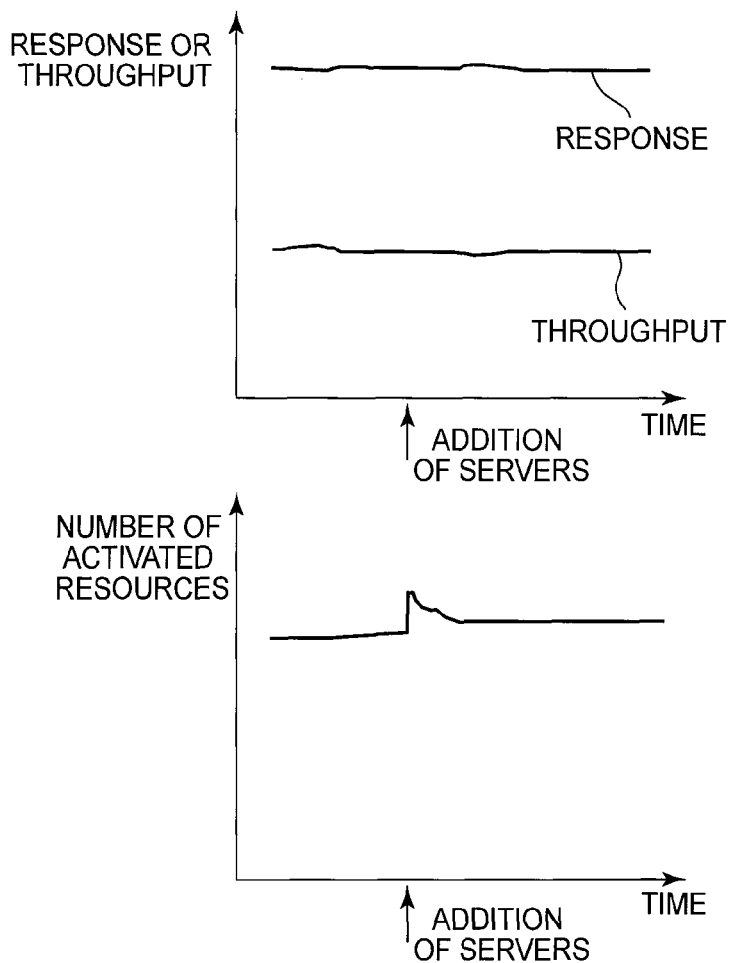
FIG. 21 includes graphs showing changes in the throughput, the response, and the number of activated resources before and after servers were added at the data center 70.

FIG. 21 shows a third experiment result. The horizontal axis of the graph represents time. The vertical axis of the graph represents an effective response, throughput, and number of activated resources (number of activated servers) of the entire system. 100 Servers were intentionally added (positions represented by arrows in FIG. 21) during the operation while a certain $\lambda_{peak}$ was set. Then, the servers including the added servers were autonomously activated/shut down without changes in throughput and response performances, and settled down in a stable state. This represents that the system is scalable, and means that a change in program and a change in processing are not necessary at all for an increase/decrease in resources. This is very useful characteristic, and it was confirmed that this invention is effective.

EXAMPLE 2

Figure 22:
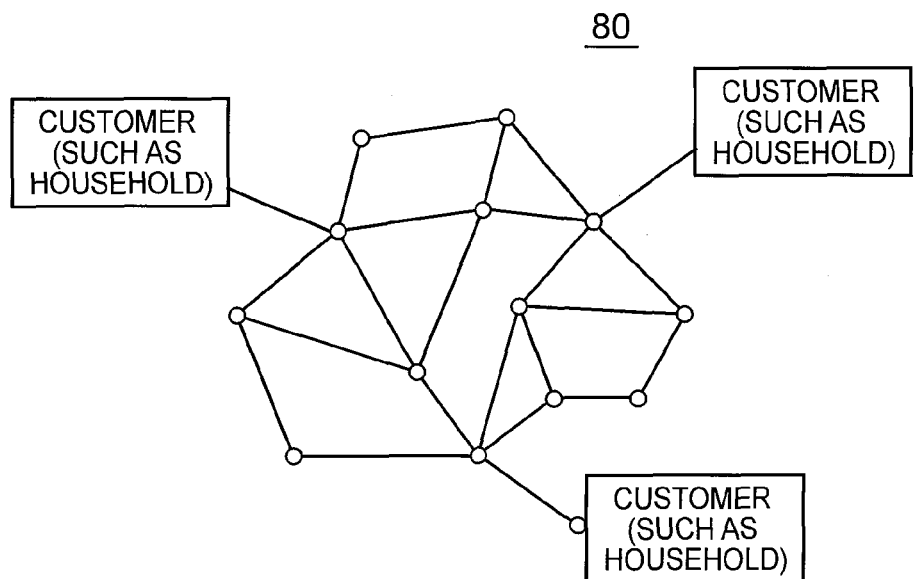
FIG. 22 is a diagram illustrating a generator network 80.

This example is a case where this invention is applied to a generator network 80 including a plurality of generators. As illustrated in FIG. 22, the function blocks $B_1, B_2, \ldots, B_n$ of the generator network 80 are each a generator, and the state control devices $C_1, C_2, \ldots, C_n$ for the respective function blocks are connected to each other via a data communication network. At least a part of the generators supply customers such as households, plants, and offices with a power. The state $\lambda_i$ corresponds to a generation power assigned to the generator $B_i$. As understood from this example, in this invention, the function blocks do not always need to communicate with one another, but the state control devices need to communicate with one another.

Figure 7:
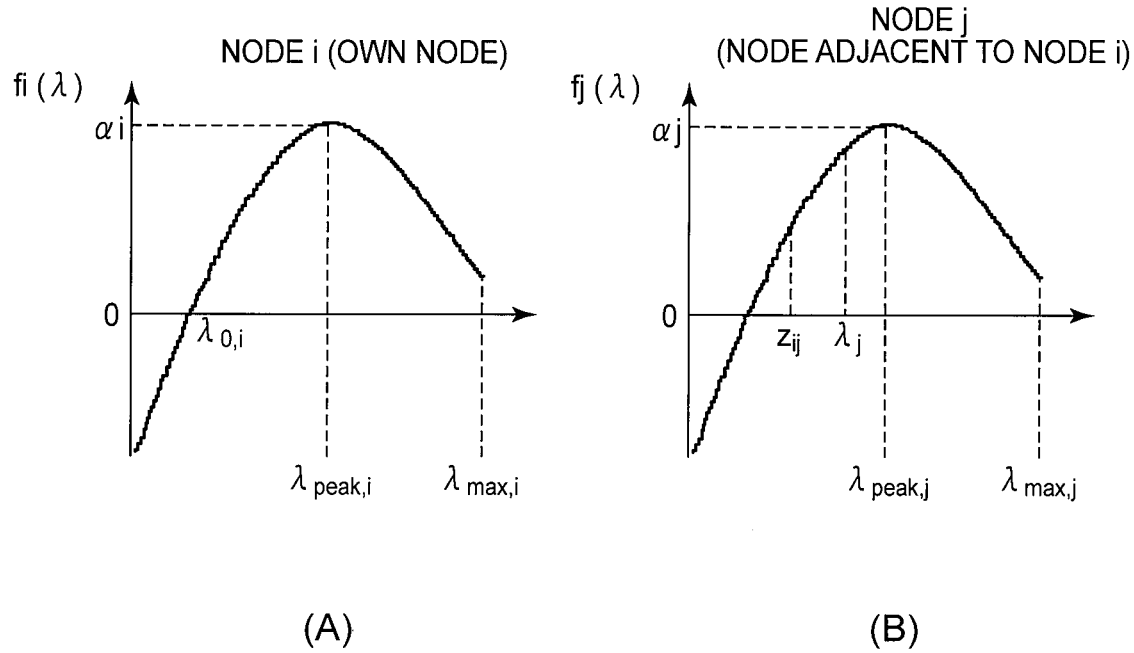
FIG. 7 includes graphs showing a state $\lambda_i$ and an evaluation function $f_i$ of a function block $B_i$ and a graph showing a load $\lambda_j$ and an evaluation function $f_j$ of a function block $B_j$ adjacent to the function block $B_i$.

The evaluation function shown in FIG. 7 is set to the each generator. The performances of the generators are not equal, and peak values ($\alpha$) and power limit values ($\lambda_{max}$) are different from one another. A profit by the generation is assigned to the vertical axis. Thus, when the value of the evaluation function is positive, a profit is generated by the power generation, and when the value is negative, a loss is generated by the power generation. Such control that the profit is maximized depending on the demand is preferably provided as a whole. A cost is generated by the activation, and hence the evaluation function value is negative when the load is 0. Moreover, a quadratic function, which is a convex function, is set to the evaluation function. It is known that the profit function of the generator is approximated by a quadratic curve.

An experiment of the control by the generator network 80 illustrated in FIG. 22 was carried out by using the evaluation function. The state control device illustrated in FIG. 9 according to this invention is built into the each generator, and the each generator carries out control while observing the evaluation function set to itself and states (evaluation functions) of other generators connected to itself. As described above, the control according to this invention can be divided into the determination of the activation/shutting down of the elements (resources) (unit commitment control) and the determination of the arrangement of the load to the elements which are determined to activate (load balancing control). Carrying out both of the controls in real time is the original control of solving "the unit commitment problem", but only the determination of the activation/shutting down or the determination of the arrangement of the load can be carried out according to this invention. The original control of carrying out both of the controls in real time is carried out in this example. The coefficient $K_1$ for determining the load balancing is appropriately set. Moreover, the profits of the respective generators are not equal to one another, and a generator providing a higher profit has a higher $\alpha_i$.

It should be noted that, in FIG. 22, the each generator is connected to at least two generators, but is not connected to all the other generators. However, even if a local change such as a change in one specific generator occurs in the network, the local information is finally distributed to the entire network if the generators are connected via the network. The state control devices only need to be able to carry out data communication to/from at least one other state control device.

Figure 23:
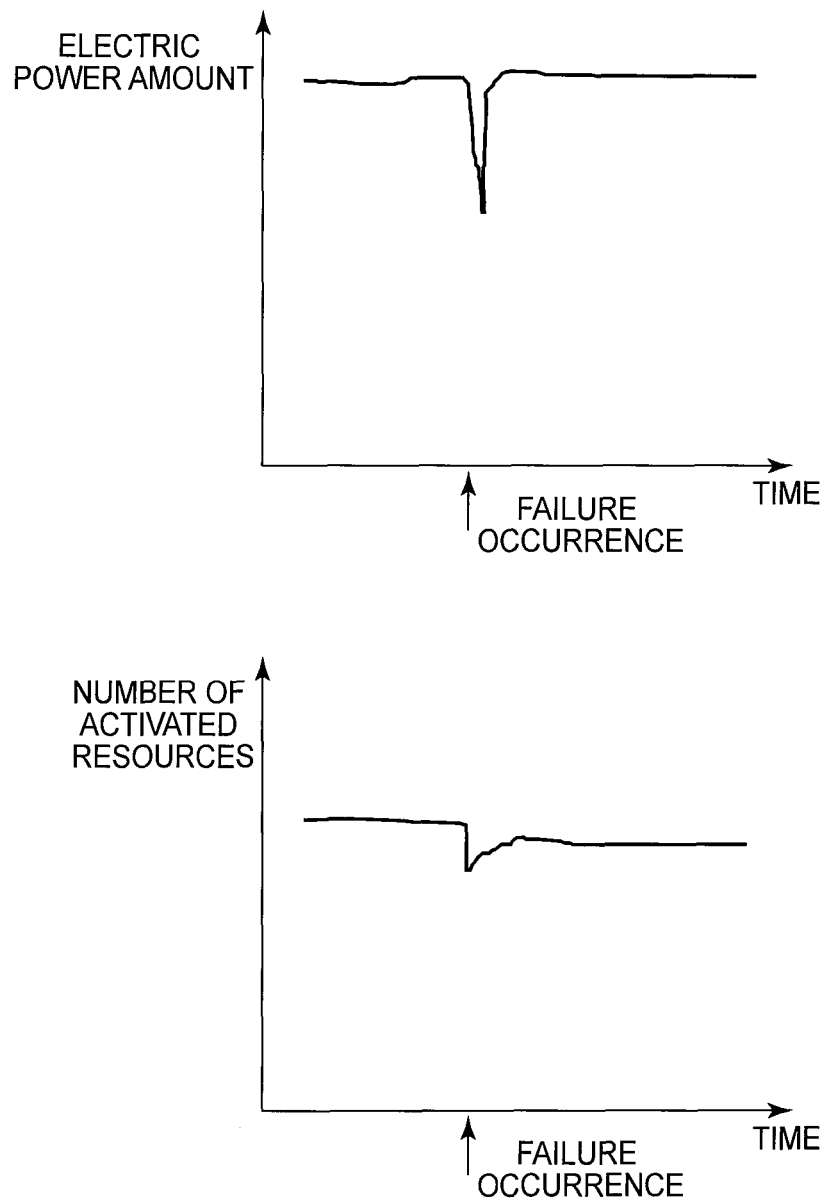
FIG. 23 includes graphs showing changes in an electric power and a number of activated resources in an entire system before and after a part of generators were shut down in the generator network 80.

FIG. 23 shows a first experiment result. The horizontal axes of graphs represent time, and vertical axes represent an electric power of the entire system and the number of activated resources (number of activated generators). 10 percent of generators were intentionally shut down (position represented by arrows in the graphs) during the operation for a certain electric power demand. Then, it is understood from the graphs that the power supply performance temporarily decreased, but the power supply performance autonomously recovered. The performances of the generators are not equal to one another, and are in a heterogeneous state. Therefore, the number of generators used after the autonomous recovery changed before and after the intentional stop of the generators. This surely means that the unit commitment problem is autonomously solved. It is confirmed that this invention is effective in terms of robustness against failure.

Figure 24:
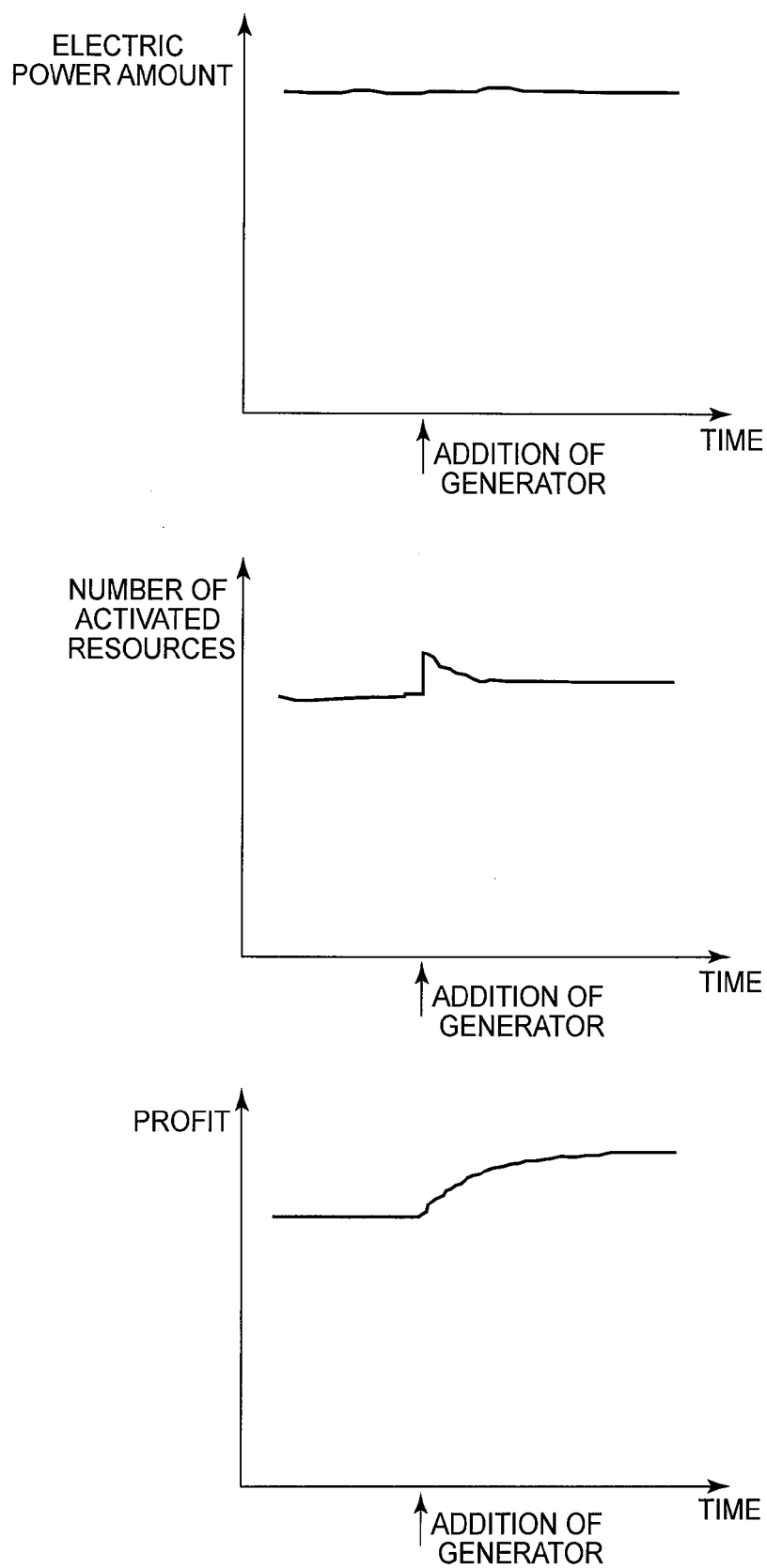
FIG. 24 includes graphs showing changes in the electric power, the number of activated resources, and a profit in the entire system before and after generators were added in the generator network 80.

FIG. 24 shows a second experiment result. The horizontal axes of graphs represent time, and vertical axes represent the electric power of the entire system, the number of activated resources (number of activated generators), and the profit. 100 generators were intentionally added (position represented by arrows in the graphs) during the operation for a certain electric power demand. Then, it is understood from the graphs that the generators including the added generators were autonomously activated/shut down without a change in power generation performance, and settled down in a stable state. On this occasion, it is understood that the profit increases. This means that generators high in profit efficiency out of the added generators were controlled to activate, and previously activated generators low in profit were controlled to shut down. It is understood that the unit commitment problem is autonomously solved, and the profit is maximized. Moreover, this represents that the system is scalable, and means that a change in program and a change in processing are not necessary at all for an increase/decrease in resources. This is a very useful characteristic, and it is confirmed that this invention is effective.

As described above, it is understood that this invention can be always effectively used whether the activation cost (degradation caused by activation) exists or not. Moreover, it is understood that this invention can be applied to not only the load balancing to the servers, which is in the IT fields, but also the unit commitment of the generators. By the way, for a case where the response and the throughput are greatly changed by the activation/shutting down of the servers, the evaluation function only needs to be configured so as to be negative in the neighborhood of the origin as in Example 2.

EXAMPLE 3

This example is an example in which this invention is applied to the resource load balancing in a data center 70 in FIG. 17 as in Example 1. The control was carried out while the response and the throughput were used as the constraint in Example 1, but the control was carried out while energy was used as the constraint in this example. The power saving in the operation was intended by using the energy as the constraint. This example is also basically a problem of setting the evaluation function.

On this occasion, based on an equation for an efficiency of a muscle, an energy efficiency $f_i(\lambda)$ when a function block $B_i$ operates in a state $\lambda$ is described as Equation 8.

$$f_i(\lambda) = \frac{W(\lambda)}{H_{def} + W(\lambda) + H} \qquad \text{Equation 8}$$

A power consumption during idling is denoted by $H_{def}$, a power consumption during work is denoted by $W(\lambda)$, and an additional power consumption during work (cooling fan) is denoted by H.

The efficiency is generally a convex function having a peak in a certain workload equal to or smaller than $\lambda_{max}$, and Equation 8 only needs to be used as the evaluation function for the workload equal to or smaller than $\lambda_{max}$. The equation of the energy efficiency cannot be defined for the workload equal to or larger than $\lambda_{max}$, and is thus defined artificially.

Figure 25:
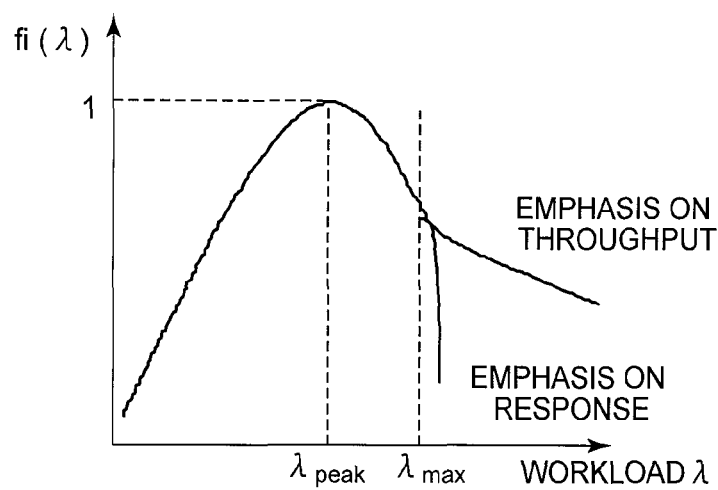
FIG. 25 is a graph showing an evaluation function which provides control while an energy of the data center 70 is considered as a constraint, and emphasizes a throughput when a workload is larger than $\lambda_{max}$, and an evaluation function which provides control while the energy of the data center 70 is considered as a constraint, and emphasizes a response when the workload is larger than $\lambda_{max}$.

FIG. 25 shows an example of an image of the evaluation function defined in this way. The evaluation function for a workload larger than $\lambda_{max}$ may be set depending on preference of the operator. For example, if the response is emphasized, the workload needs to be decreased fast, and the evaluation function only needs to have a steep slope, and if the throughput is emphasized, the workload does not need to be abruptly decreased, and a curve having a gentle gradient only needs to be drawn for the evaluation function. The operator can freely generate the evaluation function in this way.

It should be noted that, because the evaluation function can be freely generated, there is a case where appropriateness provided by the evaluation function cannot be determined in an objectively quantitative manner. For example, the evaluation function when a function of the quantitative energy efficiency for the workload equal to or smaller than $\lambda_{max}$, but is a qualitative function such as comfort of the operator for the workload equal to or larger than $\lambda_{max}$ in this case. If the objective quantitativity is necessary by any means, an objective index or what can be converted into a quantitative index needs to be considered. However, related-art systems are often operated based on experience or preferences of an administrator, and the availability of the operation based on the qualitative evaluation function can be considered that the system can be operated based on the preferences of the administrator, and can be rather considered as a useful characteristic.

Moreover, the energy is tried to be adjusted in this example, but the evaluation function having a negative area close to the origin caused by the activation cost as in Example 2 is not used. Whether the activation cost is required to be considered or not only needs to be determined by the administrator. On this occasion, a workload equal to or larger than $\lambda_{max}$ is defined. Thus, $\lambda_{max}$ is not an actual limit of the device. Generally, the device is rarely used at the actual limit, and a practical limit is set to a position somehow lower than the actual limit. If the limit is exceeded, the excess is required to be recovered if possible, and this example is an example thereof.

Figure 26:
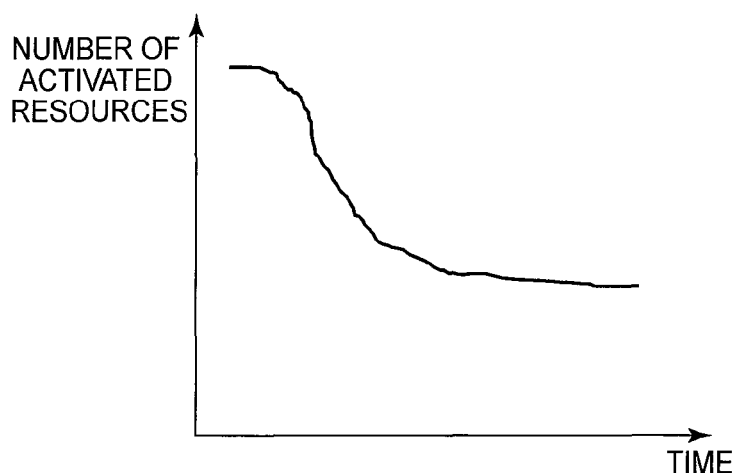
FIG. 26 includes graphs showing temporal changes in a number of activated resources and an energy efficiency in an experiment of a load balancing at the data center 70 whose energy is considered as the constraint.
Figure 26:
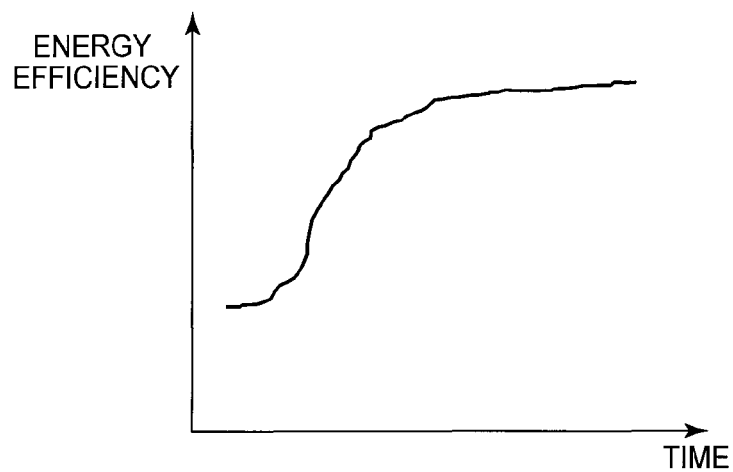

An experiment of the load balancing at the data center 70 was carried out by using the evaluation functions as in Example 1. FIG. 26 shows an experiment result. All the servers (1,000 servers) were operated at first, and, then, the energy efficiency and the number of the operating servers were observed subsequently in this example. As understood from the drawing, all the servers were operating at first, and energy was thus consumed wastefully, but it was confirmed that activating servers were autonomously selected, and the load was distributed, resulting in a decrease in energy consumption. In other words, it is confirmed that this invention is effective for saving electric power of the data center 70.

EXAMPLE 4

In this example, a description is given of a method of switching, in a context-sensitive manner, between the control emphasizing the response or the throughput described in Example 1 and the control emphasizing the energy efficiency described in Example 3. Basically, the experiment was carried out for the same configuration of the data center as that of Example 1, but one different point is that an evaluation function switching part for issuing a command of switching the evaluation function depending on the state is provided.

Figure 27:
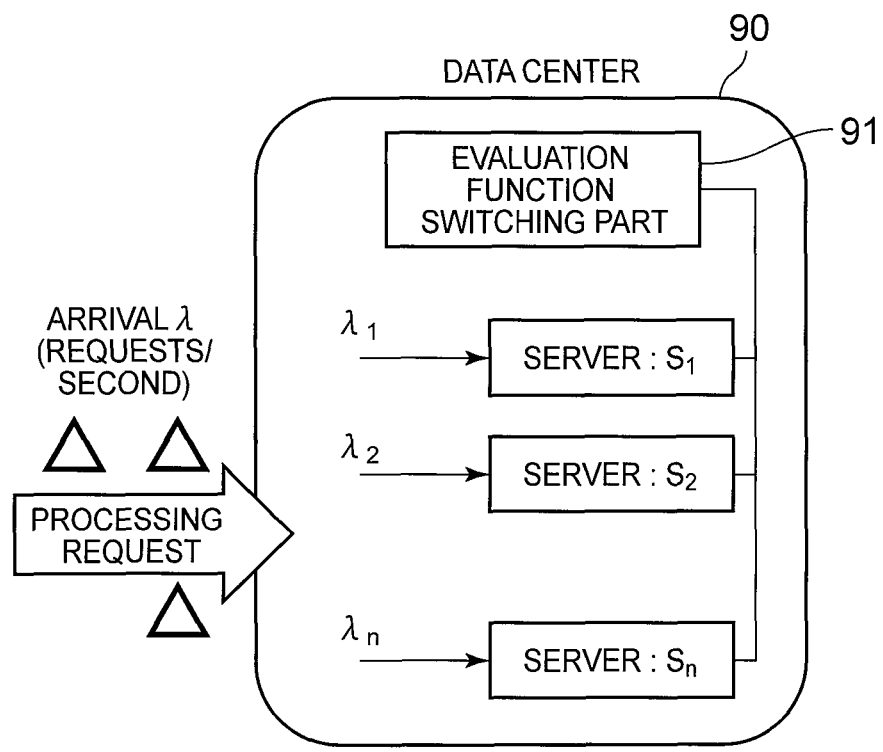
FIG. 27 is a diagram illustrating a data center 90.

FIG. 27 illustrates a system schematic diagram of this example. A data center 90 corresponds to the data center 70 in FIG. 17. Servers $s_1, s_2, \ldots, s_n$ correspond to the function blocks $B_1, B_2, \ldots, B_n$ and the state control devices $C_1, C_2, \ldots, C_n$, and are connected to one another via a data communication network. States $\lambda_1, \lambda_2, \ldots, \lambda_n$ are number of processing requests per second arriving at the respective servers $s_1, s_2, \ldots, s_n$. Further, the data center 90 includes an evaluation function switching part 91.

Two types of evaluation functions are provided for each of the servers $s_1, s_2, \ldots, s_n$ in this example. In other words, the evaluation function having the response and the throughput as the constraint as shown in FIG. 18, which is described in Example 1, and the evaluation function having the energy as the constraint as shown in FIG. 25, which is described in Example 3, are provided, and are stored in a storage device of the state control device. Then, the evaluation function switching part 91 transmits a command to switch the evaluation functions $f_1, f_2, \ldots, f_n$ to be used to the servers $s_1, s_2, \ldots, s_n$. The state control devices $C_1, C_2, \ldots, C_n$ carry out the unit commitment control and the load balancing control based on the evaluation functions in response to the respective switching commands.

A switching signal may be a signal for instructing the switch to the selected evaluation function based on an input operation by the administrator. Alternatively, a determination device (not shown) for determining a state from a certain external input may be further provided at the data center 90, and an evaluation function automatically selected by using the determination device may be specified.

The evaluation function switching part 91 switches between the two types of evaluation function in this example, but three or larger evaluation functions may be provided, and any one of them may be used. Moreover, this example has such a configuration that the one evaluation function switching part is provided for the entire data center 90, but one evaluation function switching part may be provided for the each server.

Figure 28:
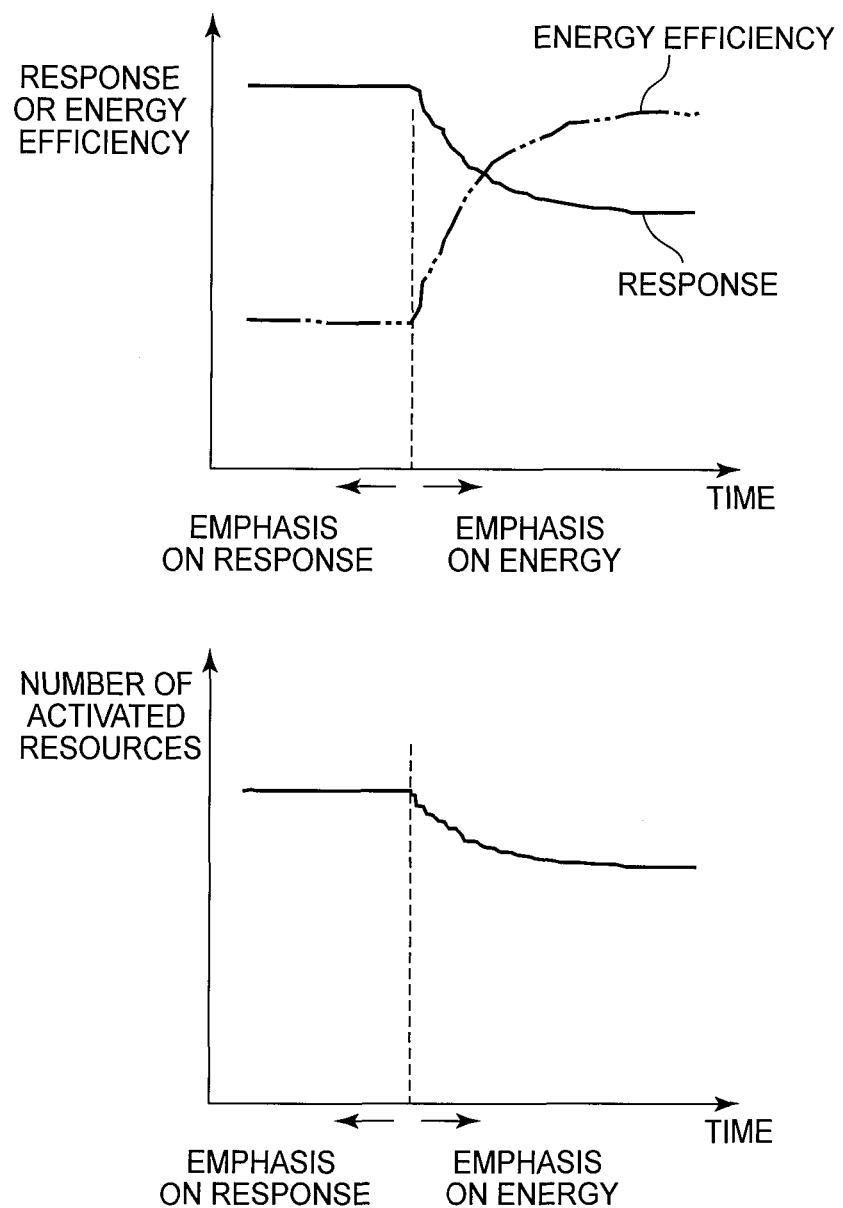
FIG. 28 includes graphs showing changes in a response, an energy efficiency, and a number of activated resources before and after an evaluation function switching part 91 switches an evaluation function at the data center 90.

FIG. 28 shows a result of an experiment carried out by using the data center 90. Conditions are the same as those of Examples 1 and 3 other than the existence of the evaluation function switching part 91. The horizontal axes of graphs represent time, and vertical axes represent an effective response or an energy efficiency and the number of activated servers in the entire system. The system was operated while the response was emphasized at first, and the emphasis was switched to energy efficiency in the course (position represented by arrows in the graphs). Then, the response was high, and the energy efficiency was not so high at first, but after the emphasis was switched to the energy efficiency, the response decreased, but the energy efficiency increased. In other words, it was confirmed that the evaluation function was appropriately switched by the evaluation function switching part.

Moreover, from this example, it is understood that even if a plurality of requirements (emphasis on response, emphasis on energy, and the like) exist, the administrator can change the operation of the system only by appropriately instructing a change in the operation target of the system without changing programs and processing. In other words, this invention can effectively operate a system even if a plurality of requirements exist, and it is thus confirmed that this invention is effective.

EXAMPLE 5

In Examples 1 to 4, it is assumed that a period required for the data communication between the state control devices is so short as to be negligible, and a delay caused by the network does not affect the response and the throughput. A description is now given of an example considering the network delay.

Figure 29:
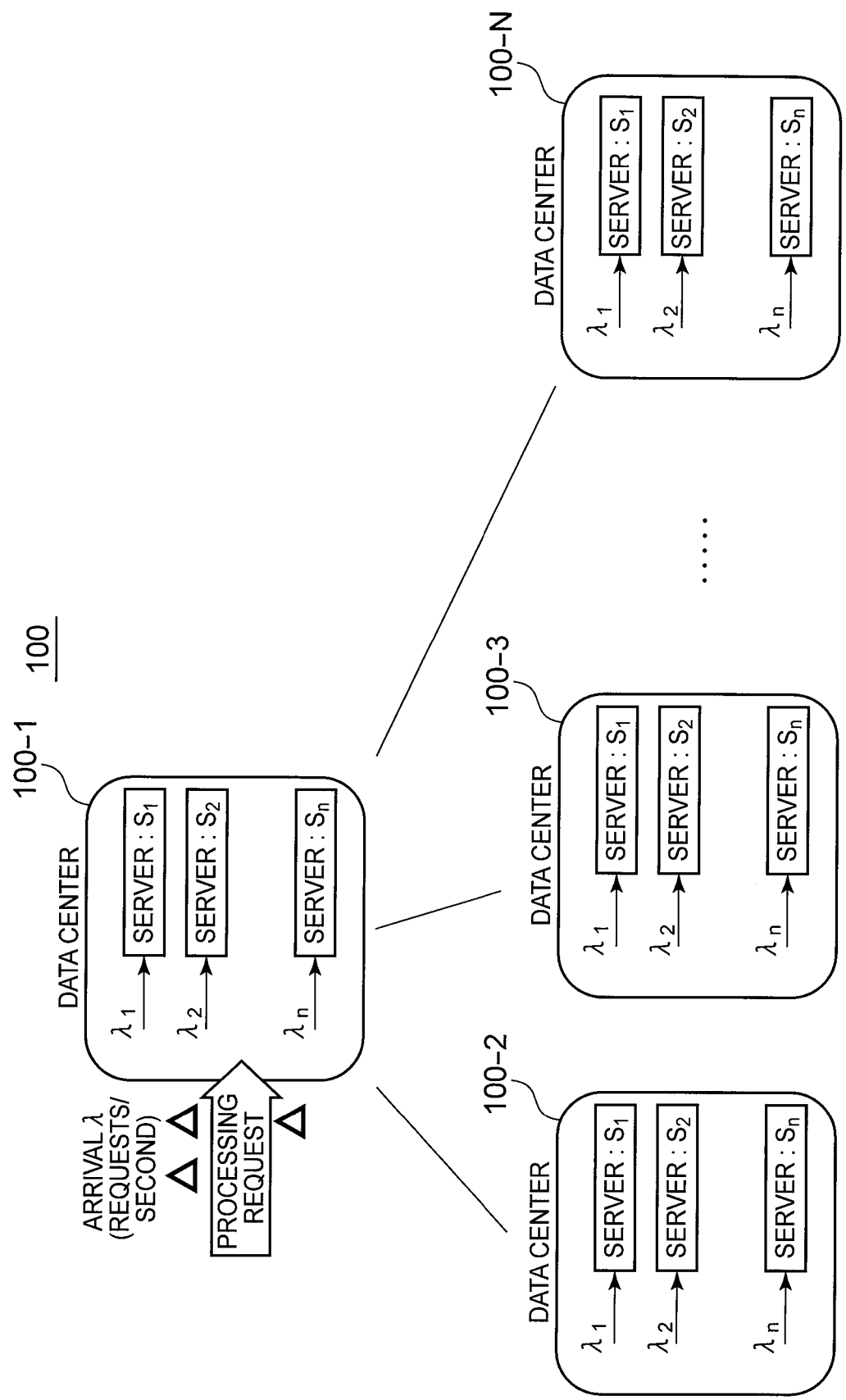
FIG. 29 is a diagram illustrating a network system 100.

As illustrated in FIG. 29, a network system 100 of this example includes a plurality of data centers 100-1, 100-2, ..., 100-N (N is a natural number of 2 or more) connected with one another via a network. The data centers 100-1, 100-2, ..., 100-N are respectively data centers corresponding to the data center 70, and are so separated from one another that the delay caused by the network is not negligible.

The resources are not closed into a single data center, and hence the delay caused by the network is not negligible in the network system 100. Thus, regarding the response and the throughput, the load is required to be distributed to the resources while a distance (delay) from a data center which is requested to carry out processing (data center mainly processing the instructed processing) is considered.

The control emphasizing the response is carried out in this example, and an evaluation function acquired by multiplying the same normalized evaluation function as that of Example 1 by the coefficient $\alpha_i$ depending on the performance of each server is used for the server. The distance (delay) from the data center which is requested to carry out the processing is considered by multiplying the normalized evaluation function by a coefficient acquired by adding a coefficient acquired from Equation 9 where Dly is a transmission delay from the data center which is requested to carry out the processing to the performance coefficient $a_i$ of the element (resource) of the each data center.

$$\frac{1}{1+Dly} \qquad \text{Equation 9}$$

As a result, each resource is recognized to have a relatively high performance at a closer data center, and to have a relatively low performance at a farther data center, and a load balancing is suitably carried out to the resources over a network with a delay.

Figure 30:
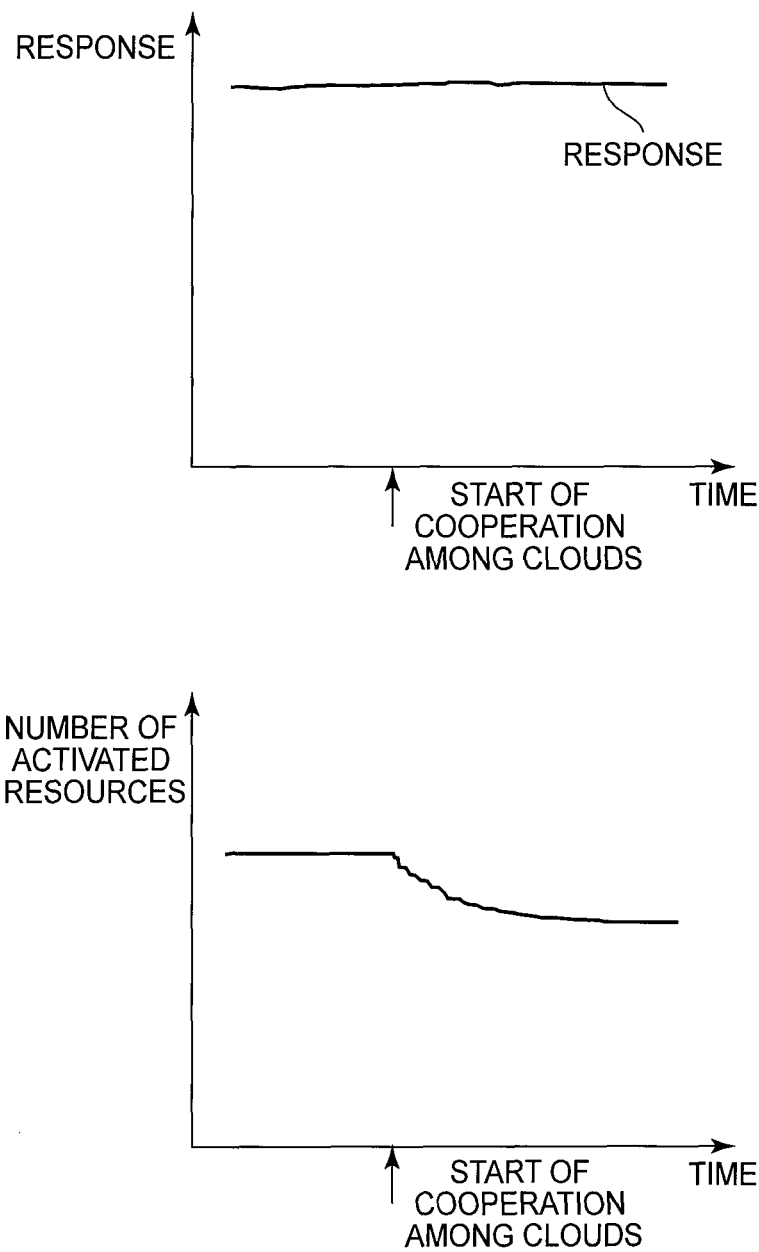
FIG. 30 includes graphs showing changes in a response and a number of activated resources before and after a data center 100-1 separated in advance from other data centers is connected to the other data centers in the network system 100.

FIG. 30 shows a result of the experiment carried out in the network system 100. The horizontal axes of graphs represent time, and vertical axes represent an effective response of the entire network system 100 and the number of activated servers in the entire network system 100. This experiment was carried out in a state where a large number of resources particularly high in processing performance exist at other data centers relatively close to the data center 100-1 which is requested to carry out the processing. In this state, even if the delays of the network are considered, it can be considered that the resources at the other data centers are preferably used.

Only the single data center, namely, the data center 100-1 to which the processing request was issued was carrying out the processing until a time point indicated by arrows in the graphs. The data center 100-1 had not communicated to/from the other data centers 100-2, 100-3, . . . , 100-N up to this time point. The data center 100-1 started the communication to/from other data centers at the time point indicated by the arrows in the graphs. Then, the data center 100-1 was coupled to data centers around via the network for cooperative operation.

From FIG. 30, it is understood that when the data center 100-1 is controlled to cooperate with the other data centers, the response does not change, but the number of activated resources decreases. This is because while servers relatively low in processing performance were autonomously shut down in the data center 100-1, servers relatively high in processing performance were autonomously activated and started processing in the other data centers around. As a result, the processing carried out by the large number of servers low in processing performance in the data center 100-1 came to be carried out by the small number of servers high in processing performance in the data centers around. In other words, the network system 100 autonomously reduced the number of activated resources while the response performance was maintained.

It is confirmed that this invention is also effective for the elements (resources) coupled via the network having the delay. When cooperation among clouds is discussed in the future, significance of the use of this invention is high.

EXAMPLE 6

A description is given of the load balancing to the resources for the processing in terms of the response, the throughput, and the energy in the examples, but application examples of this invention are not limited thereto. A description is given of the load balancing to storages in this example.

Figure 31:
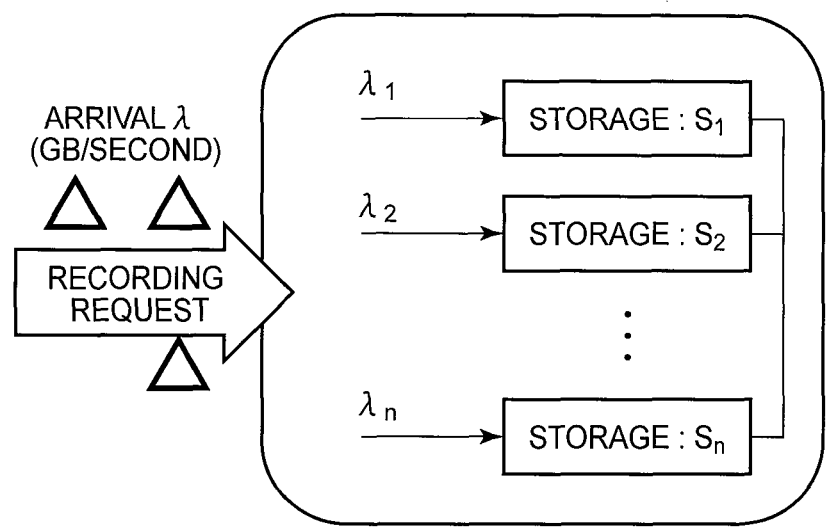
FIG. 31 is a diagram illustrating a storage center 110.

FIG. 31 is a schematic diagram of a storage center 110 used in this example. Storages $s_1, s_2, \ldots, s_n$ respectively correspond to the function blocks $B_1, B_2, \ldots, B_n$ in FIG. 1, and respectively include state control devices $C_1, C_2, \ldots, C_n$ (not shown). Further, the storage center 110 includes an evaluation function switching part (not shown). The state control devices $C_1, C_2, \ldots, C_n$ and the evaluation function switching part are connected to one another via a data communication network. The state $\lambda_1$ is a size (GB/second) of a recording request arriving at the storage $s_1$ in one second.

Figure 32:
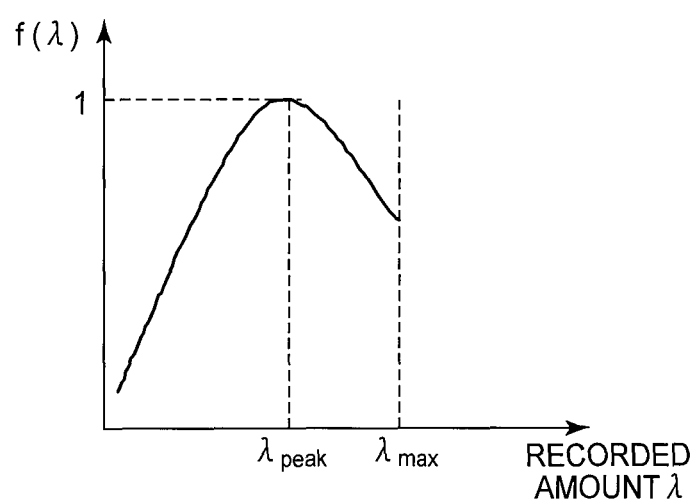
FIG. 32 is a graph showing a normalized evaluation function f used for controlling the storage center 110.

How to select the evaluation function is an important point also in this embodiment, and an evaluation function $f(\lambda)$ shown in FIG. 32 only needs to be used. $\lambda$ assigned to the horizontal axis represents a storage amount (recorded amount). The vertical axis is normalized, and the normalized evaluation function is multiplied by a coefficient $\alpha_i$ proportional to the performance of the storage. The performance on this occasion only needs to be determined by considering a recording speed, accessibility, and an archive property (storage property).

The coefficient $\alpha_i$ is prepared for respective control policies of the storage center 110 such as priority to recording speed and priority to archiving in this example, and the coefficient $\alpha_i$ is changed depending on the employed control policy. In other words, a coefficient $\alpha_{is}$ for the priority to the recording speed and a coefficient $\alpha_{ia}$ for the priority to the archive property are stored in advance in the storage device of the state control device $C_i$ ($1 \leq i \leq n$). The each state control device changes the coefficient multiplying the normalized evaluation function in response to an instruction from the evaluation function switching part. Similarly, the entire evaluation function is changed in Example 4 similarly including the evaluation function switching part, but the normalized evaluation function is maintained, and only the coefficient $\alpha_i$ is changed in this example. As a result of the change in coefficient the storage center 110 moves the data to the storage by following the control policy. The very free setting of the evaluation function in this way is one of great advantages of this invention.

An experiment of the load balancing was carried out in the storage center 110. The storage center 110 was carrying out the control based on the control policy setting priority to the recording speed at first. On this occasion, the state control device of the each storage in the storage center 110 controls the storage thereof by following an evaluation function acquired by multiplying the normalized evaluation function $f_i$ by the coefficient $\alpha_{is}$ for the priority to the recording speed. The evaluation function switching part notified the state control device of each of the storages that the each of the storages of the storage center 110 was required to switch to the coefficient $\alpha_{ia}$ for the priority to archive property at a time point t. In response to this notification, thereafter, the state control device of the each storage controlled the storage thereof by following an evaluation function acquired by multiplying the normalized evaluation function $f_i$ by the coefficient $\alpha_{ia}$ for the priority to archive property.

Figure 33:
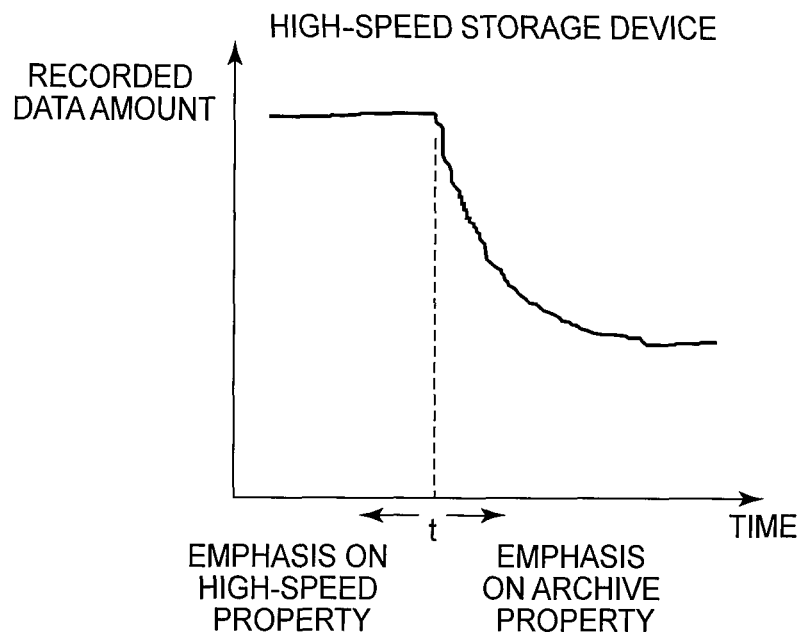
FIG. 33 is a graph showing a change in a data amount recorded by a storage device excellent in a high-speed property before and after a coefficient by which the normalized evaluation function is multiplied is switched from $\alpha_{is}$ for priority to recording speed to $\alpha_{ia}$ for priority to archive property at the storage center 110.
Figure 34:
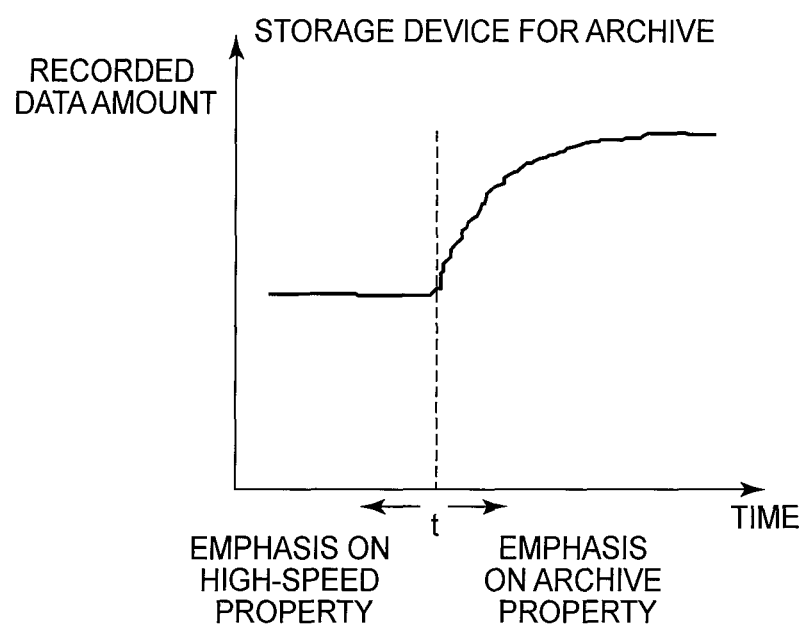
FIG. 34 is a graph showing a change in a data amount recorded by a storage device excellent in an archive property before and after a coefficient by which the normalized evaluation function is multiplied is switched from $\alpha_{is}$ for priority on the recording speed to $\alpha_{ia}$ for priority on the archive property at the storage center 110.

Temporal changes in the recorded data amount in two storages constituting the storage center 110 are shown in graphs in FIGS. 33 and 34 in this experiment. FIG. 33 is a graph for a storage excellent in the recording speed out of the storages constituting the storage center 110, and FIG. 34 is a graph for a storage high in the archive property similarly out of the storages constituting the storage center 110. In both of the graphs, the horizontal axes represent time, and the vertical axes represent data amounts stored in the storages.

As understood from the drawings, a capacity of the storage high in archive property increases, and the recorded amount of the storage high in the recording speed decreases after the time point t. In other words, the system autonomously realizes the intention of the administrator. This invention can be used in various fields as long as certain resources (elements) exist in a related manner (coupled via a network) in this way. This is confirmed in this example.

The control is carried out by providing the evaluation function switching part and preparing one normalized evaluation function and the plurality of coefficients $\alpha$ for the each storage, thereby practically providing the plurality of evaluation functions for the each storage in this example, but such a configuration that one evaluation function is provided for the each storage for the control is surely possible.

EXAMPLE 7

The above-mentioned examples are in such a form that the evaluation function is set in advance or provided by the administrator. In other words, the evaluation function is relatively fixed. Moreover, whether the evaluation function completely quantitatively matches an actual efficiency is not guaranteed in some examples. A description is now given of a method of controlling the evaluation function to quantitatively gradually approach the actual efficiency in this example. The energy efficiency is an amount which can be actually measured, and a description is thus given of a method of gradually changing the evaluation function relating to the energy efficiency to the actual efficiency. The example relates to the energy efficiency, and the example has such a form that the control is carried out for the resource load balancing in the data center 70 in FIG. 17 while the energy is considered as the constraint as Example 3.

Figure 35:
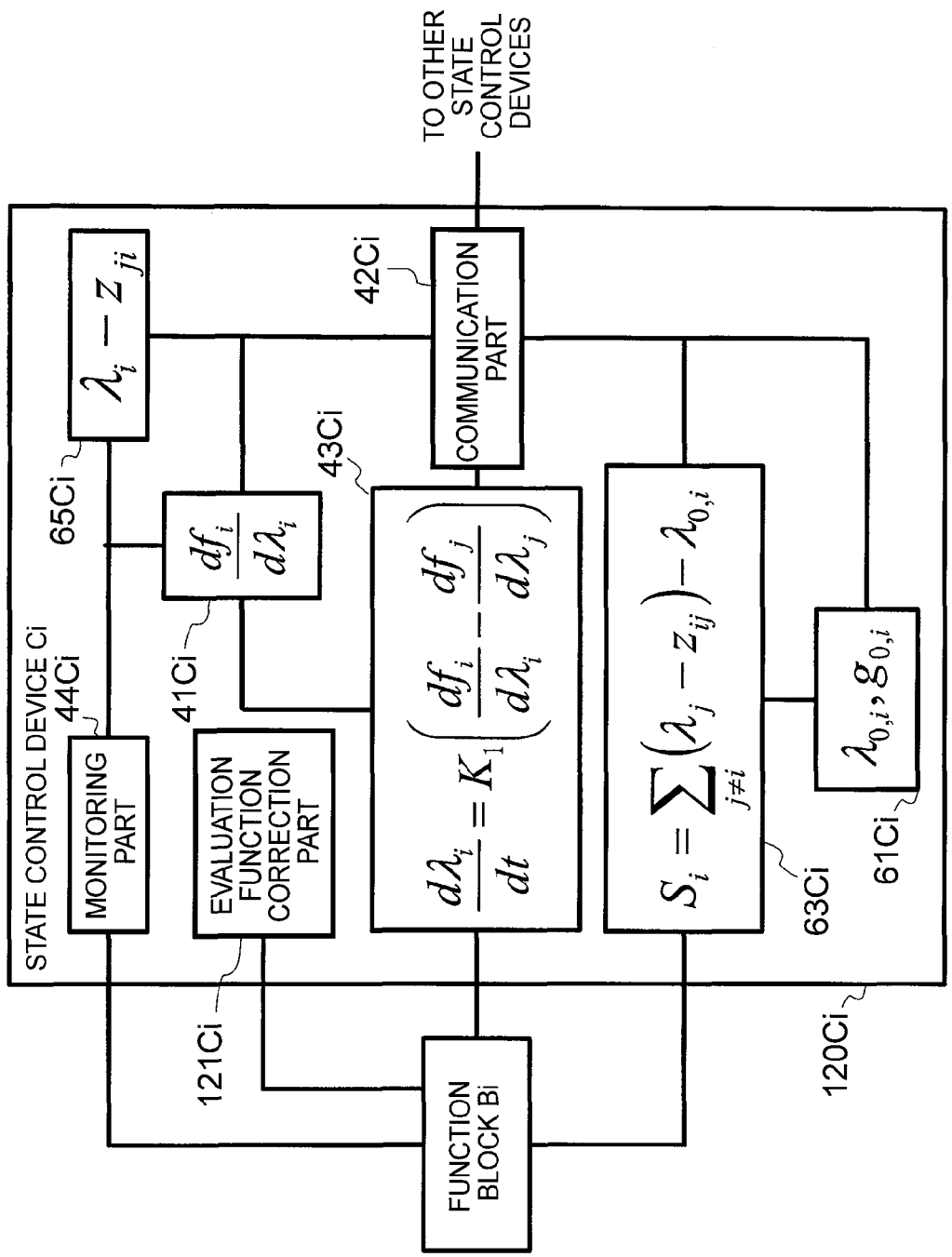
FIG. 35 is a diagram illustrating a state control device $120C_i$.

A state control device 120C$_i$ in FIG. 35 is used in place of the state control device 70C$_i$ in FIG. 9 in this example. The state control device 102C$_i$ includes the respective function blocks of the state control device 70C$_i$ as well as an evaluation function correction part 121C$_i$. The evaluation function correction part 121C$_i$ measures a value corresponding to the evaluation function of the function block B$_i$, and updates an evaluation function f$_i$ defined in advance for the function block B$_i$ based on the measured value. As a result, the evaluation function referred to by the state control device is controlled to gradually approach an actual evaluation function of a corresponding function block as time elapses.

Figure 36:
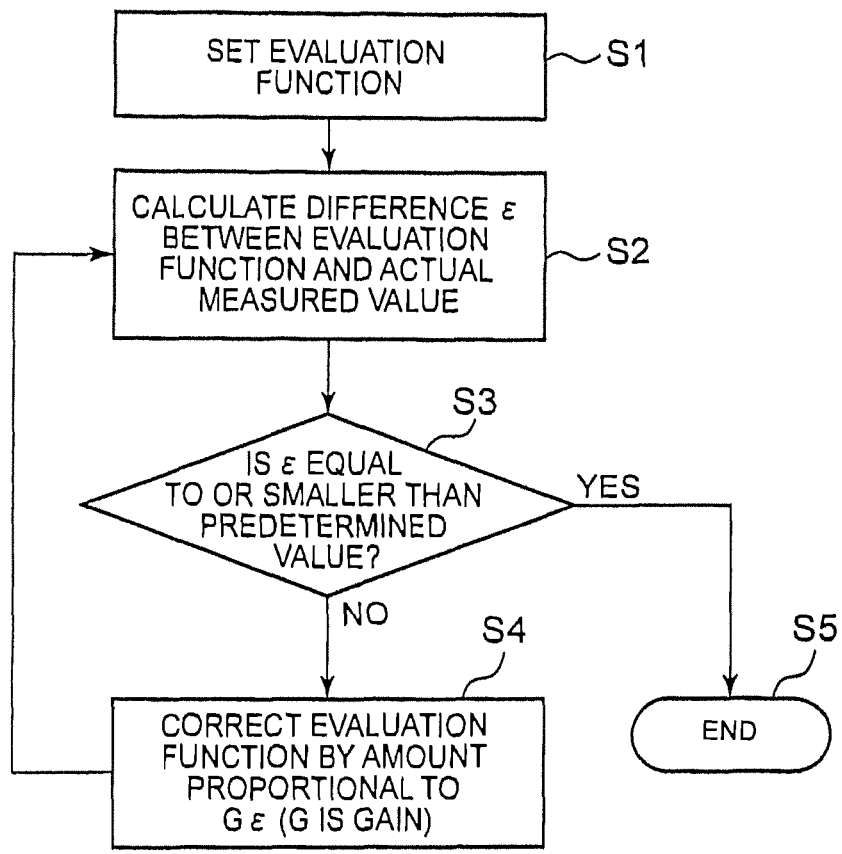
FIG. 36 is a flowchart illustrating correction processing for an evaluation function by an evaluation function correction part $121C_i$.

Referring to FIG. 36, a description is given of the correction processing for the evaluation function by the evaluation function correction part 121C$_i$. An initial value of the evaluation function f$_i$ is defined in advance in the state control device 120C$_i$ (Step S1). The evaluation function correction part 121C$_i$ measures the value corresponding to the evaluation function f$_i$ from the function block B$_i$, acquires a difference $\epsilon$ between the measured value and the evaluation function f$_i$ defined in advance in the function block B$_i$ (Step S2), corrects, when the difference $\epsilon$ is larger than a predetermined value, the evaluation function f$_i$ by a product G$\epsilon$ of a predetermined gain G and the difference $\epsilon$ (Steps S3 and S4), and finishes the processing when the difference $\epsilon$ is equal to or smaller than the predetermined value (Steps S3 and S5).

Figure 37:
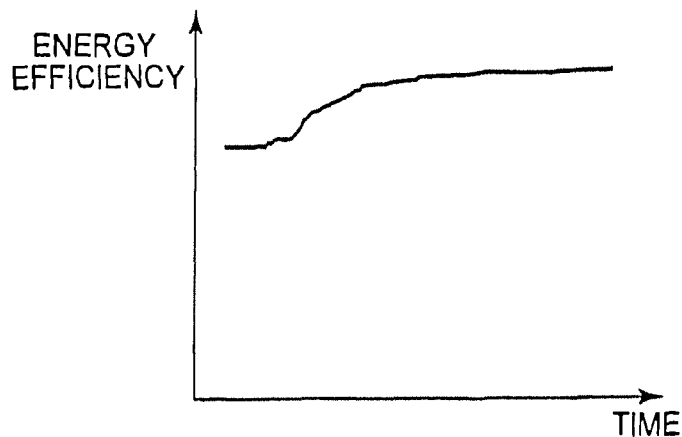
FIG. 37 is a graph showing a result of an experiment of control carried out while the energy is considered as a constraint in a data center system where state control devices $102C_1$, $120C_2$, ..., $120C_n$ are respectively provided for function blocks $B_1$, $B_2$, ..., $B_n$.

FIG. 37 is a graph showing a result of an experiment of control while the energy is considered as the constraint in a data center system where the state control devices 120C$_1$, 120C$_2$, ..., 120C$_n$ respectively provided for the function blocks B$_1$, B$_2$, ..., B$_n$. The condition of this example is the same as that in Example 3 except for such a point that the state control devices 120C$_1$, 120C$_2$, ..., 120C$_n$ respectively include the evaluation function correction parts 121C$_1$, 121C$_2$, ..., 121C$_n$. The horizontal axis of the graph represents time, and the vertical axis represents the energy efficiency. It is understood from the graph that the energy efficiency is improved as time elapses. Based on this result, it is understood that the evaluation function can be dynamically adjusted.

EXAMPLE 8

The data center, the generator network, and the storage center are controlled in the above-mentioned examples, but the applications of this invention are not limited thereto, and this invention can be generally applied to systems for controlling a plurality of function blocks to cooperate with one another. This example is an application of this invention to control of actuators of a robot and the like.

Figure 38:
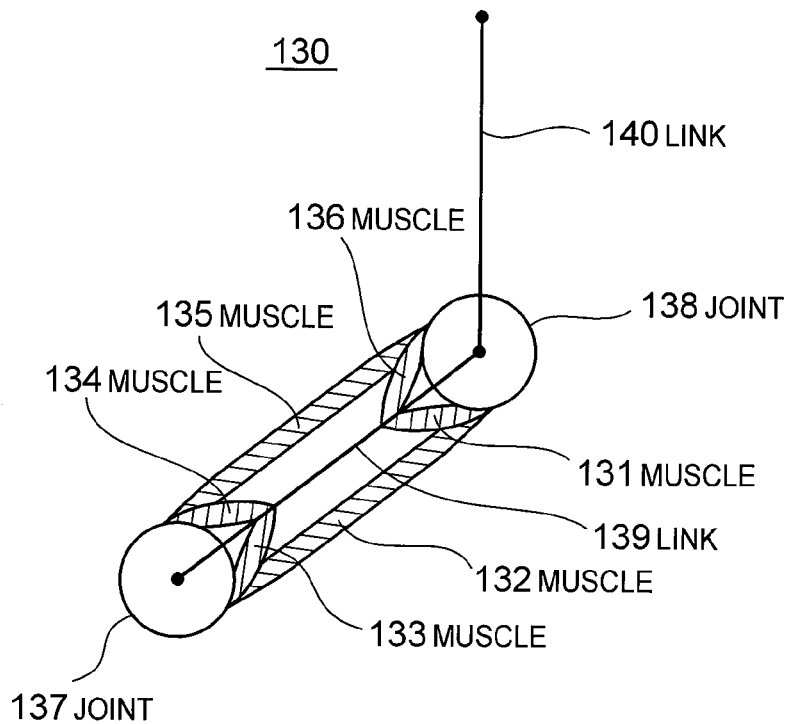
FIG. 38 is a diagram illustrating a redundant musculoskeletal system 130.

Referring to FIG. 38, a description is given of a redundant musculoskeletal system 130 in this example. The redundant musculoskeletal system 130 is a 6-muscle, 2-joint, 2-link human hand model that specifically includes six muscles 131 to 136, two joints 137 and 138, and two links 139 and 140. The model can reproduce the motion of an arm on a two-dimensional plane well.

The torque of joints can be calculated by setting a desired motion of the hand (end of the link 140). The torque of joints and the contraction of each muscle are related to each other, and influence on the torque can be estimated by setting a muscle contraction. In the case of the redundant musculoskeletal system 130, however, muscles have a greater degree of freedom than the degree of freedom of joints, and therefore the value of the contractile force of each muscle for achieving a desired torque of joints cannot be determined uniquely. In other words, a set of various muscle contractile forces is presented as solutions. This problem is called an ill-posed problem in which the solution cannot be determined uniquely.

In such cases, setting a constraint condition is effective for determining the muscle contractile force uniquely. The inventors of this invention believe that a set of muscle contractile forces is required to be determined so as to maximize muscle efficiency, for this has an advantage in terms of energy. Then this problem becomes the "unit commitment problem", namely, a matter of load balancing. The problem can be interpreted as which muscle is to be moved (this corresponds to load) in order to control most efficiently.

The muscles 131, 132, ..., 136 are respectively function blocks B$_1$, B$_2$, ..., B$_6$ in this example. The state control devices C$_1$, C$_2$, ..., C$_6$ are devices (not shown), for controlling the corresponding muscles, but these devices do not always need to be provided as devices corresponding to the muscles 131, 132, ..., 136 in one to one manner as long as the devices control the respective function blocks as in the above-mentioned examples, and may be, for example, a single processing device capable of parallel processing for controlling the respective muscles. A contractile force generated by the function block B$_1$, namely the muscle 131, is a state $\lambda_1$ of the function block B$_1$ in this example. For the muscles 132 to 136, contractile forces are states $\lambda_2$ to $\lambda_6$.

According to this invention, real-time load balancing can be carried out, and therefore this invention is very effective for the control of control equipment such as a robot. While the example shown here is of an arm, the same control can be executed for a robot leg. How important the real-time characteristic is will easily be understood when the case of a leg is considered: if the calculation for load balancing takes too long, the robot will fall down during the calculation.

Evaluation functions are set to respective muscles in order to apply the control of this invention to the robot arm. Efficiencies in the contractile forces $\lambda_1$ to $\lambda 6$ generated by the muscles 131 to 136 are set to evaluation functions f$_1$ to f$_6$ in order to maximize the efficiencies of the muscles in this example. Muscle efficiency is in general expressed by the following equation. When the default energy consumption is given as H$_{def}$, work-hour energy consumption is given as W($\lambda$), and work-hour additional energy consumption is given as H, the efficiency is expressed as follows (Equation 10).

$$f_{i(\lambda)} = \frac{W(\lambda)}{H_{def} + W(\lambda) + H} \qquad \text{Equation 10}$$

This efficiency is in general a convex function that peaks at some point that is equal to or smaller than $\lambda_{max}$ (the maximum value of muscle contraction in this case).

Figure 39:
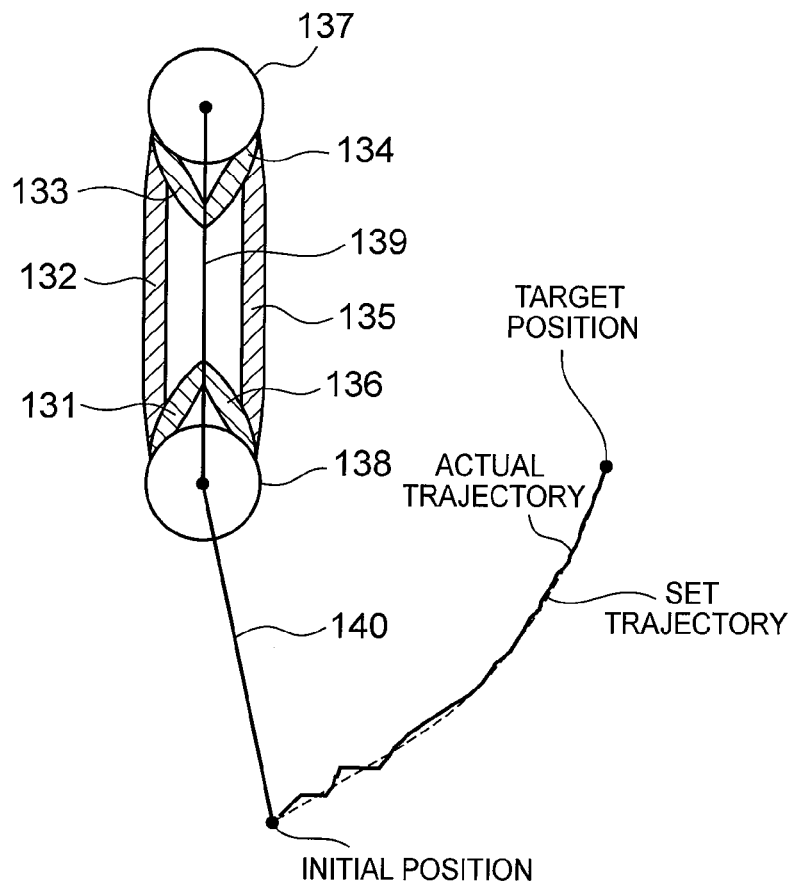
FIG. 39 is a diagram illustrating a result of control carried out to move a hand tip to a target position in the redundant musculoskeletal system 130.

FIG. 39 illustrates a result of control of using a model to control an arm of the robot, thereby moving the hand to a target position. The hand roughly traces a target trajectory to reach the target position. In other words, it was understood that the control functions appropriately.

As described in the embodiments and examples, this invention has thus been confirmed to be a method capable of handling integrally and efficiently a very wide range of control equipment including power generators, data centers, and robots.

This invention has been described above by way of an embodiment and examples. However, the present invention is not limited by these embodiment and examples.

A description is mainly given of the applications of this invention to the unit commitment problem of the generators, the load balancing (unit commitment problem) in the data center, and the load balancing (unit commitment problem) in the storages in the examples, but this invention is not limited to the information field and the infrastructure field as particularly described in Example 8, and can be used in various fields as long as certain resources (elements) exist in relationship with one another (coupled to one another via a network).

The example of the arm is described in the control filed such as the robot, but the invention can naturally be applied to a leg and a body of the robot. Moreover, the invention can be applied to a snake-type robot which is not the humanoid robot. The effect of the load balancing is small for a vehicle having four wheels, but if a vehicle has a large number of wheels, this invention can be applied to a load balancing in the wheels. This invention can basically be applied to any cases in which a controlling body is larger in a degree of freedom than a controlled body, and provides a large effect.

Regarding the connection form among the state control devices, each of the state control devices in the system may communicate to/from all the other state control devices, but some of the state control devices may communicate to/from only a part of the state control devices in the system. This is because information from a state control device connected to only one other state control device is propagated to all the other state control devices via the network. The form of the network constituted by the state control devices in the system is not particularly limited, and, for example, a hub device may be provided in the system, thereby connecting the state control devices to one another via a network topology of the star type.

Figure 40:
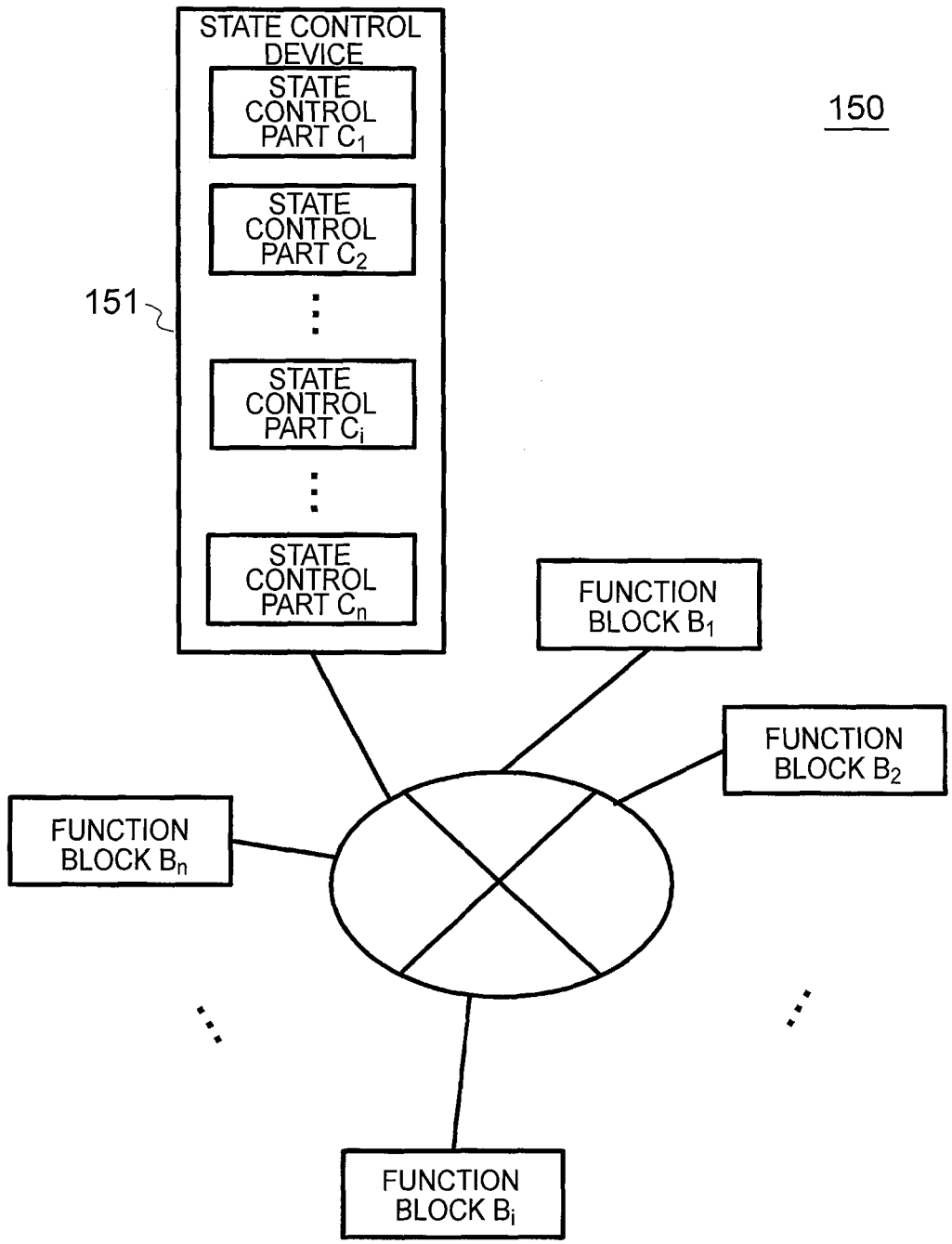
FIG. 40 is a diagram illustrating such a configuration that all nodes in a system are controlled by a single state control device.

The state control devices do not always need to correspond to the function blocks in one to one manner as described in Example 8. It is apparent to a person skilled in the art that the unit commitment control and the load balancing control according to this invention can be carried out by providing, as illustrated in FIG. 40, a single state control device 151 including state control parts $C_1$, $C_2$, ..., $C_n$ for carrying out the control corresponding to the state control devices $C_1$, $C_2$, ..., $C_n$ in an entire system, and controlling the respective state control parts to control corresponding function blocks.

Part or whole of the above-mentioned embodiment and examples can also be described as the following supplementary notes. However, the following supplementary notes are not intended to limit this invention.

Supplementary Note 1

A state control device, which is provided in correspondence to each of n (n is a natural number of 2 or more) function blocks constructing a system, the state control devices including a state control device $C_i$ corresponding to a function block $B_i$, when i and j are arbitrary natural numbers satisfying relationships of $1 \leq i$, $j \leq n$, and $i \neq j$, the state control device $C_i$ including:

means for acquiring a state $\lambda_j$ representing a state of the function block $B_j$ from the function block $B_j$;

means for acquiring $U_i$ and $V_i$ based on an evaluation function $f_i$ for the function block $B_i$, the evaluation function $f_i$ being defined in advance depending on a performance of the function block $B_i$;

means for transmitting $V_i$ to a state control device $C_j$;

means for receiving $W_j$ acquired based on an evaluation function $f_j$ for a function block $B_j$ from the state control device $C_j$, the evaluation function $f_j$ being defined in advance depending on a performance of the function block $B_j$ corresponding to the state control device $C_j$; and control means for controlling the function block $B_i$ so that a sum of a variation in the state $\lambda_i$ and a variation in a state $\lambda_j$ is zero depending on $U_i$ and $W_j$.

Supplementary Note 2

A state control device according to Supplementary Note 1, in which when the evaluation functions $f_i$ and $f_j$, and the states $\lambda_i$ and $\lambda_j$ are generally referred to as an evaluation function f and a state $\lambda$, respectively, the evaluation function f is such a function that a curve plotted while the state $\lambda$ is assigned to a horizontal axis and a value of the evaluation function f is assigned to a vertical axis is convex upward or downward.

Supplementary Note 3

A state control device according to Supplementary Note 1 or 2, in which:

$U_i$ is a horizontal axis coordinate $\lambda_{0,i}$ at a zero-crossing point, which is an intersection between the evaluation function $f_i$ and the horizontal axis;

$V_i$ is a gradient $g_{0,i}$ of the evaluation function $f_i$ at the zero-crossing point;

$W_j$ is $\lambda_j$-$z_{ij}$ where $z_{ij}$ is a horizontal axis coordinate at a point on the evaluation function $f_j$ matching $g_{0,i}$ in the gradient; and the control means activates or shuts down the function block $B_i$ depending on a result of comparison between $S_i = \Sigma(\lambda_j - z_{ij}) - \lambda_{0,i}$ and zero.

Supplementary Note 4

A state control device according to Supplementary Note 1 or 2, in which:

each of $U_i$ and $V_i$ is $df_i/d\lambda_i$;

$W_j$ is $df_j/d\lambda_j$; and the control means controls the function block $B_i$ by following $d\lambda_i/dt = K_1(df_i/d\lambda_i - df_j/d\lambda_j)$.

Supplementary Note 5

A state control device according to any one of Supplementary Notes 1 to 4, in which the state control device is configured to:

transmit $V_i$ to each of a plurality of other state control devices $C_{j1}, C_{j2}, \ldots, C_{jm}$ (j1, j2, . . . , jm are natural numbers other than i, and 2≤m≤n); and receive $W_{j1}, W_{j2}, \ldots, W_{jm}$ respectively from the plurality of other state control devices $C_{j1}, C_{j2}, \ldots, C_{jm}$.

Supplementary Note 6

A state control device according to Supplementary Note 5, in which the control means carries out control based on one equation defined depending on $U_i$ and $W_{j1}$, control based on one equation defined depending on $U_i$ and $W_{j2}$, . . . , and control based on one equation defined depending on $U_i$ and $W_{jm}$ successively for the function block $B_i$ in a random order.

Supplementary Note 7

A state control device according to Supplementary Note 5, in which the control means controls the function block $B_i$ by following one equation defined depending on $U_i$ and $W_{j1}$, $W_{j2}, \ldots, W_{jm}$.

Supplementary Note 8

A state control device according to any one of Supplementary Notes 1 to 7, in which the evaluation function relates to an efficiency of a corresponding one of the function blocks.

Supplementary Note 9

A state control device according to any one of Supplementary Notes 1 to 8, in which the state control device controls the function block based on one evaluation function selected depending on a predetermined condition out of a plurality of evaluation functions.

Supplementary Note 10

A state control device according to any one of Supplementary Notes 1 to 8, further including evaluation function switching means for selecting one evaluation function depending on a predetermined condition out of a plurality of evaluation functions.

Supplementary Note 11

A state control device according to any one of Supplementary Notes 1 to 10, further including:
means for measuring a value corresponding to a value of the evaluation function; and
means for correcting the evaluation function based on the measured value.

Supplementary Note 12

A state control device according to any one of Supplementary Notes 1 to 11, in which:
the system includes a node serving as a start point when a transmission delay amount is acquired; and
the state control device controls the function block $B_i$ based on an evaluation function defined depending on a performance of the function block $B_i$ and the transmission delay amount generated by data communication carried out between the start point node and the function block $B_i$.

Supplementary Note 13

A state control device according to Supplementary Note 12, in which the start point node is an input/output terminal provided in a network system.

Supplementary Note 14

A state control device according to any one of Supplementary Notes 1 to 13, in which:
each of the function blocks $B_i$ is a computer; and
$\lambda$ is a workload assigned to the computer.

Supplementary Note 15

A state control device according to any one of Supplementary Notes 1 to 13, in which:
each of the function blocks $B_i$ is a computer; and
$\lambda$ is a power consumption of the computer.

Supplementary Note 16

A state control device according to any one of Supplementary Notes 1 to 13, in which:
each of the function blocks $B_i$ is a storage device; and
$\lambda$ is a data amount stored in the storage device.

Supplementary Note 17

A state control device according to any one of Supplementary Notes 1 to 13, in which:
each of the function blocks $B_i$ is a generator; and
$\lambda$ is a power generation amount of the generator.

Supplementary Note 18

A state control device according to any one of Supplementary Notes 1 to 13, in which:
each of the function blocks $B_i$ is an actuator; and
$\lambda$ is a force generated by the actuator.

Supplementary Note 19

A function block, including the state control device according to any one of Supplementary Notes 1 to 18.

Supplementary Note 20

A network system, including the function block according to Supplementary Note 19 as a node.

Supplementary Note 21

A method of controlling each of n (n is a natural number of 2 or more) function blocks constructing a system by using a state control device provided in correspondence to the each of n the function blocks, the state control devices including a state control device $C_i$ corresponding to a function block $B_i$, when i and j are arbitrary natural numbers satisfying relationships of 1≤i, j≤n, and i≠j, the method including:
a step of acquiring, by the state control device $C_i$, a state $\lambda_i$ representing a state of the function block $B_i$ from the function block $B_i$;
a step of acquiring, by the state control device $C_i$, $U_i$ and $V_i$ based on an evaluation function $f_i$ for the function block $B_i$, the evaluation function $f_i$ being determined in advance depending on a performance of the function block $B_i$;

a step of transmitting, by the state control device $C_i$, $V_i$ to a state control device $C_j$;

a step of receiving, by the state control device $C_i$, $W_j$ acquired based on an evaluation function $f_j$ for a function block $B_j$ corresponding to the state control device $C_j$ from the state control device $C_j$, the evaluation function $f_j$ being determined in advance depending on a performance of the function block $B_j$; and a control step of controlling, by the state control device $C_i$, the function block $B_i$ so that a sum of a variation in the state $\lambda_i$ and a variation in a state $\lambda_j$ is zero depending on $U_i$ and $W_j$.

Supplementary Note 22

A control method according to Supplementary Note 21, in which when the evaluation functions $f_i$ and $f_j$, and the states $\lambda_i$ and $\lambda_j$ are generally referred to as an evaluation function $f$ and a state $\lambda$, respectively, the evaluation function $f$ is such a function that a curve plotted while the state $\lambda$ is assigned to a horizontal axis and a value of the evaluation function $f$ is assigned to a vertical axis is convex upward or downward.

Supplementary Note 23

A control method according to Supplementary Note 21 or 22, in which:

$U_i$ is a horizontal axis coordinate $\lambda_{0,i}$ at a zero-crossing point, which is an intersection between the evaluation function $f_i$ and the horizontal axis;

$V_i$ is a gradient $g_{0,i}$ of the evaluation function $f_i$ at the zero-crossing point;

$W_j$ is $\lambda_j$-$z_{ij}$ where $z_{ij}$ is a horizontal axis coordinate at a point on the evaluation function $f_j$ matching $g_{0,i}$ in the gradient; and the control step includes activating or shutting down the function block $B_i$ depending on a result of comparison between $S_i = \Sigma(\lambda_j - z_{ij}) - \lambda_{0,i}$ and zero.

Supplementary Note 24

A control method according to Supplementary Note 21 or 22, in which:

each of $U_i$ and $V_i$ is $df_i/d\lambda_i$;

$W_j$ is $df_j/d\lambda_j$; and the control step includes controlling the function block $B_i$ by following $d\lambda_i/dt = K_1(df/d\lambda_i - df_j/d\lambda_j)$.

Supplementary Note 25

A control method according to any one of Supplementary Notes 21 to 24, further including transmitting $V_i$ to each of a plurality of other state control devices $C_{j1}, C_{j2}, \ldots, C_{jm}$ (j1, j2, ..., jm are natural numbers other than i, and $2 \leq m \leq n$); and receiving $W_{j1}, W_{j2}, \ldots, W_{jm}$ respectively from the plurality of other state control devices $C_{j1}, C_{j2}, \ldots, C_{jm}$.

Supplementary Note 26

A control method according to Supplementary Note 25, in which the control step includes carrying out control based on one equation defined depending on $U_i$ and $W_{j1}$, control based on one equation defined depending on $U_i$ and $W_{j2}, \ldots$, and control based on one equation defined depending on $U_i$ and $W_{jm}$ successively for the function block $B_i$ in a random order.

Supplementary Note 27

A control method according to Supplementary Note 25, in which the control step includes controlling the function block $B_i$ by following one equation defined depending on $U_i$ and $W_{j1}, W_{j2}, \ldots, W_{jm}$.

Supplementary Note 28

A control method according to any one of Supplementary Notes 21 to 27, in which the evaluation function relates to an efficiency of a corresponding one of the function blocks.

Supplementary Note 29

A control method according to any one of Supplementary Notes 21 to 28, further including controlling the function block based on one evaluation function selected depending on a predetermined condition out of a plurality of evaluation functions.

Supplementary Note 30

A control method according to any one of Supplementary Notes 21 to 28, further including an evaluation function switching step of selecting one evaluation function depending on a predetermined condition out of a plurality of evaluation functions.

Supplementary Note 31

A control method according to any one of Supplementary Notes 21 to 30, further including:

a step of measuring a value corresponding to a value of the evaluation function; and a step of correcting the evaluation function based on the measured value.

Supplementary Note 32

A control method according to any one of Supplementary Notes 21 to 31, in which:

the system includes a node serving as a start point when a transmission delay amount is acquired; and the control method further includes controlling the function block $B_i$ based on an evaluation function defined depending on a performance of the function block $B_i$, and the transmission delay amount generated by data communication carried out between the start point node and the function block $B_i$.

Supplementary Note 33

A control method according to Supplementary Note 32, in which the start point node is an input/output terminal provided in a network system.

Supplementary Note 34

A control method according to any one of Supplementary Notes 21 to 33, in which:

each of the function blocks $B_i$ is a computer; and $\lambda$ is a workload assigned to the computer.

Supplementary Note 35

A control method according to any one of Supplementary Notes 21 to 33, in which:

each of the function blocks $B_i$ is a computer; and
$\lambda$ is a power consumption of the computer.

Supplementary Note 36

A control method according to any one of Supplementary Notes 21 to 33, in which:
each of the function blocks $B_i$ is a storage device; and
$\lambda$ is a data amount stored in the storage device.

Supplementary Note 37

A control method according to any one of Supplementary Notes 21 to 33, in which:
each of the function blocks $B_i$ is a generator; and
$\lambda$ is a power generation amount of the generator.

Supplementary Note 38

A control method according to any one of Supplementary Notes 21 to 33, in which:
each of the function blocks $B_i$ is an actuator; and
$\lambda$ is a force generated by the actuator.

Supplementary Note 39

A program for controlling each of n (n is a natural number of 2 or more) function blocks constructing a system by using a computer provided in correspondence to the each of the n function blocks, the computers including a computer $C_i$ corresponding to a function block $B_i$, when i and j are arbitrary natural numbers satisfying relationships of $1 \le i$, $j \le n$, and $i \ne j$, the program causing the computer $C_i$ to execute:
a procedure of acquiring a state $\lambda_i$ representing a state of the function block $B_i$ from the function block $B_i$;
a procedure of acquiring $U_i$ and $V_i$ based on an evaluation function $f_i$ for the function block $B_i$, the evaluation function $f_i$ being determined in advance depending on a performance of the function block $B_i$;
a procedure of transmitting $V_i$ to a state control device $C_j$;
a procedure of receiving $W_j$ acquired based on an evaluation function $f_j$ for a function block $B_j$ corresponding to the state control device $C_j$ from the state control device $C_j$, the evaluation function $f_j$ being determined in advance depending on a performance of the function block $B_j$; and
a control procedure of controlling the function block $B_i$ so that a sum of a variation in the state $\lambda_i$ and a variation in a state $\lambda_j$ is zero depending on $U_i$ and $W_j$.

Supplementary Note 40

A program according to Supplementary Note 39, in which when the evaluation functions $f_i$ and $f_j$ and the states $\lambda_i$ and $\lambda_j$ are generally referred to as an evaluation function f and a state $\lambda$, respectively, the evaluation function f is such a function that a curve plotted while the state $\lambda$ is assigned to a horizontal axis and a value of the evaluation function f is assigned to a vertical axis is convex upward or downward.

Supplementary Note 41

A program according to Supplementary Note 39 or 40, in which:
$U_i$ is a horizontal axis coordinate $\lambda_{0,i}$ at a zero-crossing point, which is an intersection between the evaluation function $f_i$ and the horizontal axis;

$V_i$ is a gradient $g_{0,i}$ of the evaluation function $f_i$ at the zero-crossing point;
$W_j$ is $\lambda_j$-$z_{ij}$ where $z_{ij}$ is a horizontal axis coordinate at a point on the evaluation function $f_j$ matching $g_{0,i}$ in the gradient; and
the control procedure includes activating or shutting down the function block $B_i$ depending on a result of comparison between $S_i = \Sigma(\lambda_j - z_{ij}) - \lambda_{0,i}$ and zero.

Supplementary Note 42

A program according to Supplementary Note 39 or 40, in which:
each of $U_i$ and $V_i$ is $df_i/d\lambda_i$;
$W_j$ is $df_j/d\lambda_j$; and
the control procedure includes controlling the function block $B_i$ by following $d\lambda_i/dt = K_1(df_i/d\lambda_i - df_j/d\lambda_j)$.

Supplementary Note 43

A program according to any one of Supplementary Notes 39 to 42, in which the program further causes the computer to:
transmit $V_i$ to each of a plurality of other state control devices $C_{j1}, C_{j2}, \ldots, C_{jm}$ (j1, j2, ..., jm are natural numbers other than i, and $2 \le m \le n$); and
receive $W_{j1}, W_{j2}, \ldots, W_{jm}$ respectively from the plurality of other state control devices $C_{j1}, C_{j2}, \ldots, C_{jm}$.

Supplementary Note 44

A program according to Supplementary Note 43, in which the control procedure includes carrying out control based on one equation defined depending on $U_i$ and $W_{j1}$, control based on one equation defined depending on $U_i$ and $W_{j2}$, . . . , and control based on one equation defined depending on $U_i$ and $W_{jm}$ successively for the function block $B_i$ in a random order.

Supplementary Note 45

A program according to Supplementary Note 43, in which the control procedure includes controlling the function block $B_i$ by following one equation defined depending on $U_i$ and $W_{j1}, W_{j2}, \ldots, W_{jm}$.

Supplementary Note 46

A program according to any one of Supplementary Notes 39 to 45, in which the evaluation function relates to an efficiency of a corresponding one of the function blocks.

Supplementary Note 47

A program according to any one of Supplementary Notes 39 to 46, in which the program further causes the computer to control the function block based on one evaluation function selected depending on a predetermined condition out of a plurality of evaluation functions.

Supplementary Note 48

A program according to any one of Supplementary Notes 39 to 46, in which the program further causes the computer to execute an evaluation function switching procedure of selecting one evaluation function depending on a predetermined condition out of a plurality of evaluation functions.

Supplementary Note 49

A program according to any one of Notes 39 to 48, in which the program further causes the computer to execute:
a procedure of measuring a value corresponding to a value of the evaluation function; and
a procedure of correcting the evaluation function based on the measured value.

Supplementary Note 50

A program according to any one of Supplementary Notes 39 to 49, in which:
the system includes a node serving as a start point when a transmission delay amount is acquired; and
the program further causes the computer to control the function block $B_i$ based on an evaluation function defined depending on a performance of the function block $B_i$, and the transmission delay amount generated by data communication carried out between the start point node and the function block $B_i$.

Supplementary Note 51

A program according to Supplementary Note 50, in which the start point node is an input/output terminal provided in a network system.

Supplementary Note 52

A program according to any one of Supplementary Notes 39 to 51, in which:
each of the function blocks $B_i$ is a computer; and
$\lambda$ is a workload assigned to the computer.

Supplementary Note 53

A program according to any one of Supplementary Notes 39 to 51, in which:
each of the function blocks $B_i$ is a computer; and
$\lambda$ is a power consumption of the computer.

Supplementary Note 54

A program according to any one of Supplementary Notes 39 to 51, in which:
each of the function blocks $B_i$ is a storage device; and
$\lambda$ is a data amount stored in the storage device.

Supplementary Note 55

A program according to any one of Supplementary Notes 39 to 51, in which:
each of the function blocks $B_i$ is a generator; and
$\lambda$ is a power generation amount of the generator.

Supplementary Note 56

A program according to any one of Supplementary Notes 39 to 51, in which:
each of the function blocks $B_i$ is an actuator; and
$\lambda$ is a force generated by the actuator.

REFERENCE SIGNS LIST $B_1, B_2, \ldots, B_i, \ldots B_n$ function block (server, generator, storage, muscle, and the like, n is a natural number of 2 or more, $1 \le i$, $j \le n$, and $i \ne j$)
$C_1, C_2, \ldots, C_i, \ldots, C_n$ state control device
$30C_i$, $40C_i$, $50C_i$, $60C_i$ state control device
$31C_i$, $41C_i$, $61C_i$, $65C_i$ evaluation function processing part
$32C_i$, $42C_i$, $62C_i$ communication part
$33C_i$, $43C_i$, $53C_i$, $63C_i$ control signal generation part
$44C_i$, $64C_i$ monitoring part
70, 90 data center
91 evaluation function switching part
100 network system
100-1, 100-2, ..., 100-N data center (N is a natural number of 2 or more)
110 storage center
$120C_i$ state control device
$121C_i$ evaluation function correction part
130 redundant musculoskeletal system
131-136 muscle
137, 138 joint
139, 140 link This application claims priority from Japanese Patent Application No. 2012-075657, filed on Mar. 29, 2012, the entire disclosure of which is incorporated herein by reference.

The invention claimed is:

1. A state control device, wherein a system comprises n (n is a natural number of 2 or more) function blocks B1, B2, ..., and Bn, the function block B1 comprises one of the state control device C1, the function block B2 comprises another one of the state control device C2, ..., and the function block Bn comprises another one of the state device Cn, wherein i and j are arbitrary natural numbers satisfying relationships of $1 \le i$, $j \le n$, and $i \ne j$, a state control device Ci comprising:
a circuit configured to acquire a state $\lambda_i$ representing a state of the function block $B_i$ from the function block $B_i$;
a circuit configured to acquire a function $U_i$ and a function $V_i$ based on an evaluation function $f_i$ for the function block $B_i$, the evaluation function $f_i$ being defined in advance depending on a performance of the function block $B_i$;
a circuit configured to transmit the function $V_i$ to a state control device $C_j$;
a circuit configured to receive a function $W_j$ acquired based on an evaluation function $f_j$ for a function block $B_j$ from the state control device $C_j$, the evaluation function $f_j$ being defined in advance depending on a performance of the function block $B_j$ corresponding to the state control device $C_j$; and
a control circuit configured to control the function block $B_i$ so that a sum of a variation in the state $\lambda_i$ and a variation in a state $\lambda_j$ is zero depending on the function $U_i$ and the function $W_j$,
wherein:
each of the function $U_i$ and the function $V_i$ comprises $df_i/d\lambda_i$;
the function $W_j$ comprises $df_j/d\lambda_j$; and
the control circuit controls the function block $B_i$ by following $d\lambda_i/dt = K_1(df_i/d\lambda_i - df_j/d\lambda_j)$, wherein K1 is a coefficient corresponding to a gain of a state change, and
wherein a result of the control of the function block $B_i$ is used in at least one of a data center, a network system, a storage center, or a redundant musculoskeletal system to improve load balancing, energy efficiency, or processing performance.

2. The state control device according to claim 1, wherein when the evaluation functions $f_i$ and $f_j$, and the states $\lambda_i$ and $\lambda_j$ are generally referred to as an evaluation function f and a state $\lambda$, respectively, the evaluation function f is such a function that a curve plotted while the state $\lambda$ is assigned to a horizontal axis and a value of the evaluation function f is assigned to a vertical axis is convex upward or downward.

3. The state control device according to claim 1, wherein the state control device is configured to:
   transmit the function $V_i$ to each of a plurality of other state control devices $C_{j1}$, ($C_{j2}$, ..., $C_{jm}$(j1, j2, ..., jm are natural numbers other than i, and $2 \le m \le n$); and
   receive functions $W_{j1}$, $W_{j2}$, ..., $W_{jm}$ respectively from the plurality of other state control devices $C_{j1}$, $C_{j2}$, ..., $C_{jm}$.

4. The state control device according to claim 3, wherein the control circuit carries out control based on one equation defined depending on the function $U_i$ and the function $W_{j1}$, control based on one equation defined depending on the function $U_i$ and the function $W_{j2}$, ..., and control based on one equation defined depending on the function $U_i$ and the function $W_{jm}$ successively for the function block $B_i$ in a random order.

5. The state control device according to claim 3, wherein the control circuit controls the function block $B_i$ by following one equation defined depending on the function $U_i$ and the functions $W_{j1}$, $W_{j2}$, ..., $W_{jm}$.

6. The state control device according to claim 1, wherein the evaluation function relates to an efficiency of a corresponding one of the function blocks.

7. The state control device according to claim 1, wherein the state control device controls the function block based on one evaluation function selected depending on a predetermined condition out of a plurality of evaluation functions.

8. The state control device according to claim 1, further comprising an evaluation function switching circuit configured to select one evaluation function depending on a predetermined condition out of a plurality of evaluation functions.

9. The state control device according to claim 1, further comprising:
   a circuit configured to measure a value corresponding to a value of the evaluation function; and
   a circuit configured to correct the evaluation function based on the measured value.

10. The state control device according to claim 1, wherein:
    the system comprises a node serving as a start point when a transmission delay amount is acquired; and
    the state control device controls the function block $B_i$ based on an evaluation function defined depending on a performance of the function block $B_i$, and the transmission delay amount generated by data communication carried out between the start point node and the function block $B_i$.

11. The state control device according to claim 10, wherein the start point node comprises an input/output terminal provided in the network system.

12. The state control device according to claim 1, wherein:
    each of the function blocks $B_i$ comprises a computer; and
    $\lambda$ comprises a workload assigned to the computer.

13. The state control device according to claim 1, wherein:
    each of the function blocks $B_i$ comprises a computer; and
    $\lambda$ comprises a power consumption of the computer.

14. The state control device according to claim 1, wherein:
    each of the function blocks $B_i$ comprises a storage device; and
    $\lambda$ comprises a data amount stored in the storage device.

15. The state control device according to claim 1, wherein:
    each of the function blocks $B_i$ comprises a generator; and
    $\lambda$ comprises a power generation amount of the generator.

16. The state control device according to claim 1, wherein:
    each of the function blocks $B_i$ comprises an actuator; and
    $\lambda$ comprises a force generated by the actuator.

17. A function block, comprising the state control device according to claim 1.

18. A network system, comprising the function block according to claim 17 as a node.

19. A method of controlling each of n (n is a natural number of 2 or more) function blocks B1, B2, and Bn to construct a system by using a state control device, wherein the function block B1 comprises one of the state control device C1, the function block B2 comprises another one of the state control device C2, ..., and the function block Bn comprises another one of the state device Cn, wherein i and j are arbitrary natural numbers satisfying relationships of $1 \le i$, $j \le n$, and $i \ne j$, the method comprising:
    acquiring, by a state control device $C_i$ comprising a processor, a state $\lambda_i$ representing a state of the function block $B_i$ from the function block $B_i$;
    acquiring, by the state control device $C_i$, a function $U_i$ and a function $V_i$ based on an evaluation function $f_i$ for the function block $B_i$ the evaluation function $f_i$ being determined in advance depending on a performance of the function block $B_i$;
    transmitting, by the state control device $C_i$, the function $V_i$ to a state control device $C_j$;
    receiving, by the state control device $C_i$, a function $W_j$ acquired based on an evaluation function $f_j$ for a function block $B_j$ corresponding to the state control device $C_j$ from the state control device $C_j$, the evaluation function $f_j$ being determined in advance depending on a performance of the function block $B_j$;
    controlling, by the state control device $C_i$, the function block $B_i$ so that a sum of a variation in the state $\lambda_i$ and a variation in a state $\lambda_j$ is zero depending on the function $U_i$ and the function $W_j$, and
    using a result of the controlling of the function block $B_i$ in at least one of a data center, a network system, a storage center, or a redundant musculoskeletal system to improve load balancing, energy efficiency, or processing performance,
    wherein:
    each of the function $U_i$ and the function $V_i$ comprises $df_i/d\lambda_i$;
    the function $W_j$ comprises $df_j/d\lambda_j$; and
    the control circuit controls the function block $B_i$ by following $d\lambda_i/dt = K_1(df_i/d\lambda_i - df_j/d\lambda_j)$, wherein K1 is a coefficient corresponding to a gain of a state change.

20. A non-transitory computer-readable medium having a program stored therein, the program for controlling each of n (n is a natural number of 2 or more) function blocks B1, B2, ..., and Bn to construct a system, wherein the function block B1 comprises one of the state control device C1, the function block B2 comprises another one of the state control device C2, ..., and the function block Bn comprises another one of the state device Cn, wherein i and j are arbitrary natural numbers satisfying relationships of $1 \leq i$, $j \leq n$, and $i \neq j$, the program when executed by a processor of a state control device $C_i$, causing the state control device $C_i$ to perform operations comprising:

acquiring a state $\lambda_i$ representing a state of the function block $B_i$ from the function block $B_i$;

acquiring a function $U_i$ and a function $V_i$ based on an evaluation function $f_i$ for the function block $B_i$, the evaluation function $f_i$ being determined in advance depending on a performance of the function block $B_i$;

transmitting the function $V_i$ to a state control device $C_j$;

receiving a function $W_j$ acquired based on an evaluation function $f_j$ for a function block $B_j$ corresponding to the state control device $C_j$ from the state control device $C_j$, the evaluation function $f_j$ being determined in advance depending on a performance of the function block $B_j$;

controlling the function block $B_i$ so that a sum of a variation in the state $\lambda_i$ and a variation in a state $\lambda_j$ is zero depending on the function $U_i$ and the function $W_j$, and using a result of the controlling of the function block $B_i$ in at least one of a data center, a network system, a storage center, or a redundant musculoskeletal system to improve load balancing, energy efficiency, or processing performance, wherein:

each of the function $U_i$ and the function $V_i$ comprises $df_i/d\lambda_i$;

the function $W_j$ comprises $df_j/d\lambda_j$; and the control circuit controls the function block $B_i$ by following $d\lambda_i/dt = K_1(df_i/d\lambda_i - df_j/d\lambda_j)$, wherein $K1$ is a coefficient corresponding to a gain of a state change.

21. The state control device according to claim 1, wherein each function block communicates with adjacent function blocks only.

22. The method according to claim 20, wherein each function block communicates with adjacent function blocks only.

* * * * *